United States Patent [19]

Mathews

[11] Patent Number: 5,475,944
[45] Date of Patent: Dec. 19, 1995

[54] TROT LINE REEL WITH HOOK HOLDERS

[76] Inventor: Ray E. Mathews, P.O. Box 100, White Cloud, Kans. 66094

[21] Appl. No.: 74,052

[22] Filed: Jun. 1, 1993

[51] Int. Cl.⁶ ................................................. A01K 91/18
[52] U.S. Cl. ........................ 43/57.3; 242/407; 242/397.1
[58] Field of Search ................................. 43/54.1, 57.3; 242/407, 614, 397.1

[56] References Cited

U.S. PATENT DOCUMENTS

| | | | |
|---|---|---|---|
| 2,041,322 | 5/1936 | Cantini | 43/57.3 |
| 2,474,752 | 6/1949 | Montgomery | 43/57.3 |
| 2,804,716 | 9/1957 | Adkison | 43/57.3 |
| 2,857,706 | 10/1958 | Skains | 43/57.3 X |
| 3,600,839 | 8/1971 | Waller | 43/57.3 |
| 3,660,924 | 5/1972 | McGee | 43/57.3 |
| 4,366,641 | 1/1983 | Price | 43/54.1 |
| 4,453,843 | 6/1984 | Martyniuk | 43/57.3 |
| 4,862,636 | 9/1989 | Doskocil | 43/57.3 |
| 4,930,250 | 6/1990 | Carson | 43/57.3 |

Primary Examiner—Mark Rosenbaum
Assistant Examiner—Jeanne M. Elpel

[57] ABSTRACT

A trotline fishing device. The device for storing fish hooks on both sides of a trotline reel and discharging the hooks from both sides of a trotline reel in any directions, rapidly, with safety, and having control through out the fishing cycle. A preferred embodiment including hook or article holders (53A, 53B) releasably mounted on either side of the reel and fitting snug over a rod, the rod bound to the reel by elastic lacing. The rod held in hinge fashion by the elastic lacing so as to lean and direct the discharge of hooks from the holders when tension is put on the stage line. The holders releasing the hooks to discharge them clear of the reel when the main line is cast or discharged in any direction. The holders having the ability to lean favorably to direct a clear, clean discharge of the hooks rather than lean directly toward the pull of the stage line. Further embodiments include stage line control guides and a main line fluke anchor.

13 Claims, 61 Drawing Sheets 5,475,944

TROT LINE REEL WITH HOOK HOLDERS

FIELD OF THE INVENTION

A directional release apparatus for controlled discharge of a trotline. The trotline having a main line and a plurality of stage lines attached thereto, and each of the stage lines having a device or article for hooking a fish, hereafter simply referred to as a hook. The apparatus having hook holders that lean and roll away from an original position as the stage lines are pulled and the hooks are flipped from the hook holders as the hook holder returns to its original position.

SUMMARY OF THE INVENTION

A trotline multiple line directional release device which stores and discharges hooks from both sides of a trotline reel in all directions from the reel. The trotline having a main line and stage lines attached thereto.

The directional release device having hook holders attached to the trotline reel, the hook holders able to lean and direct the discharge of the hooks when under tension from pull of the stage line. The hook holders biased to return to an original position wherein the return causes the hooks to be flipped away from the reel.

The invention further including guides for guiding the main line and attached stage lines, and a main line fluke anchor.

DESCRIPTION OF THE PREFERRED EMBODIMENTS

Figure 1A:
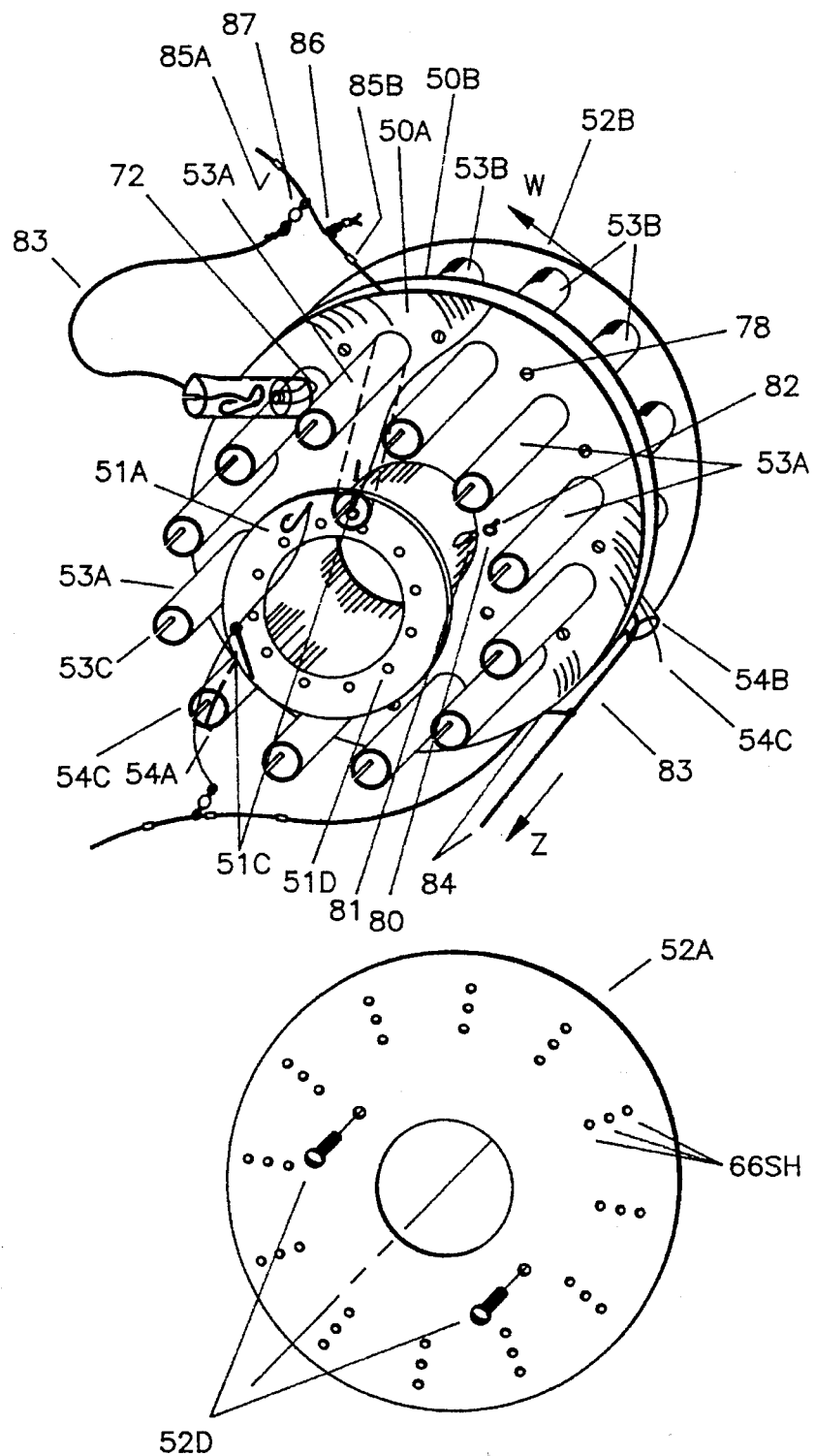
FIGS. 1A–C are perspective views of the trotline reel with attached holders and shields.
Figure 1B:
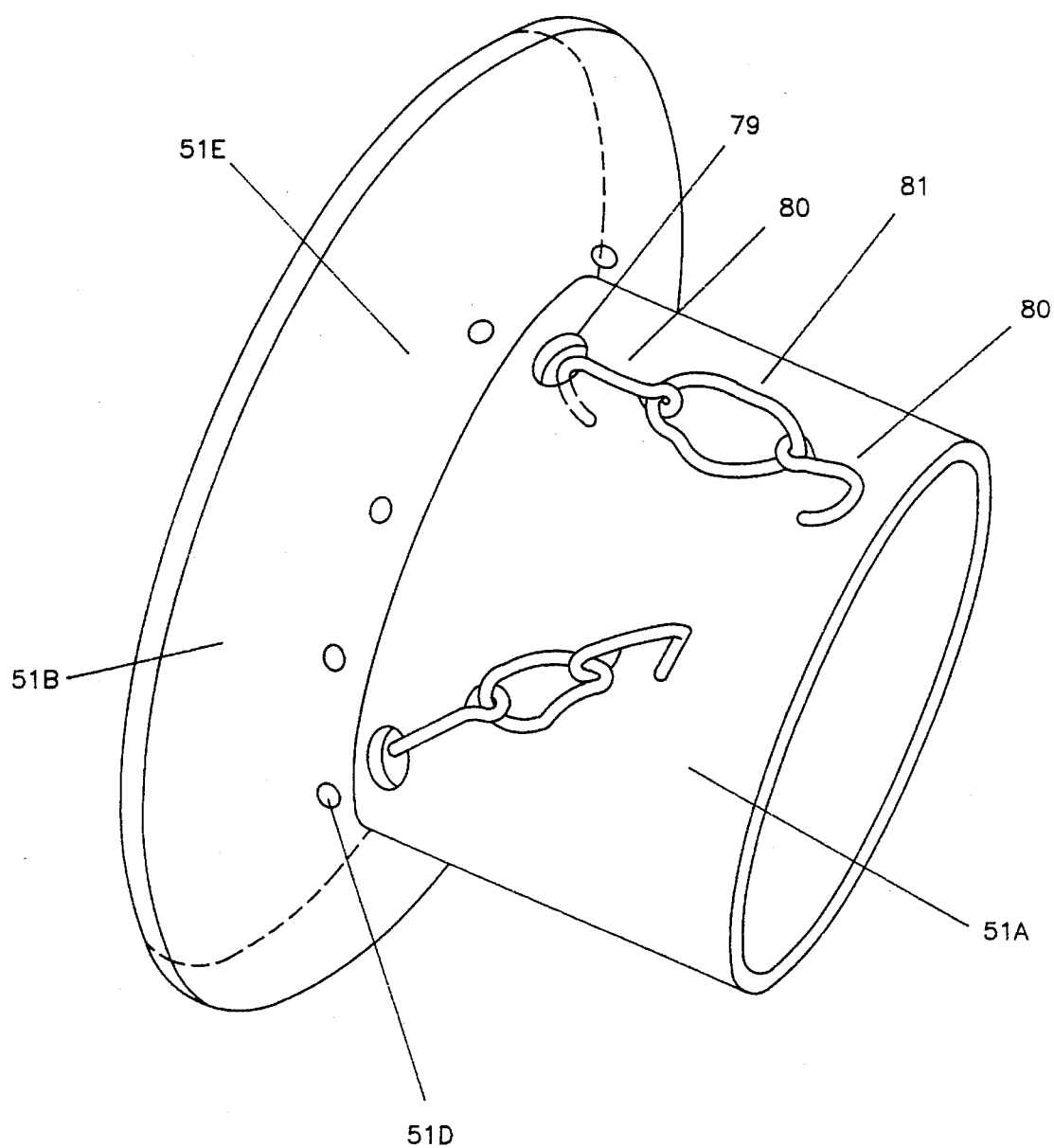
Figure 1C:
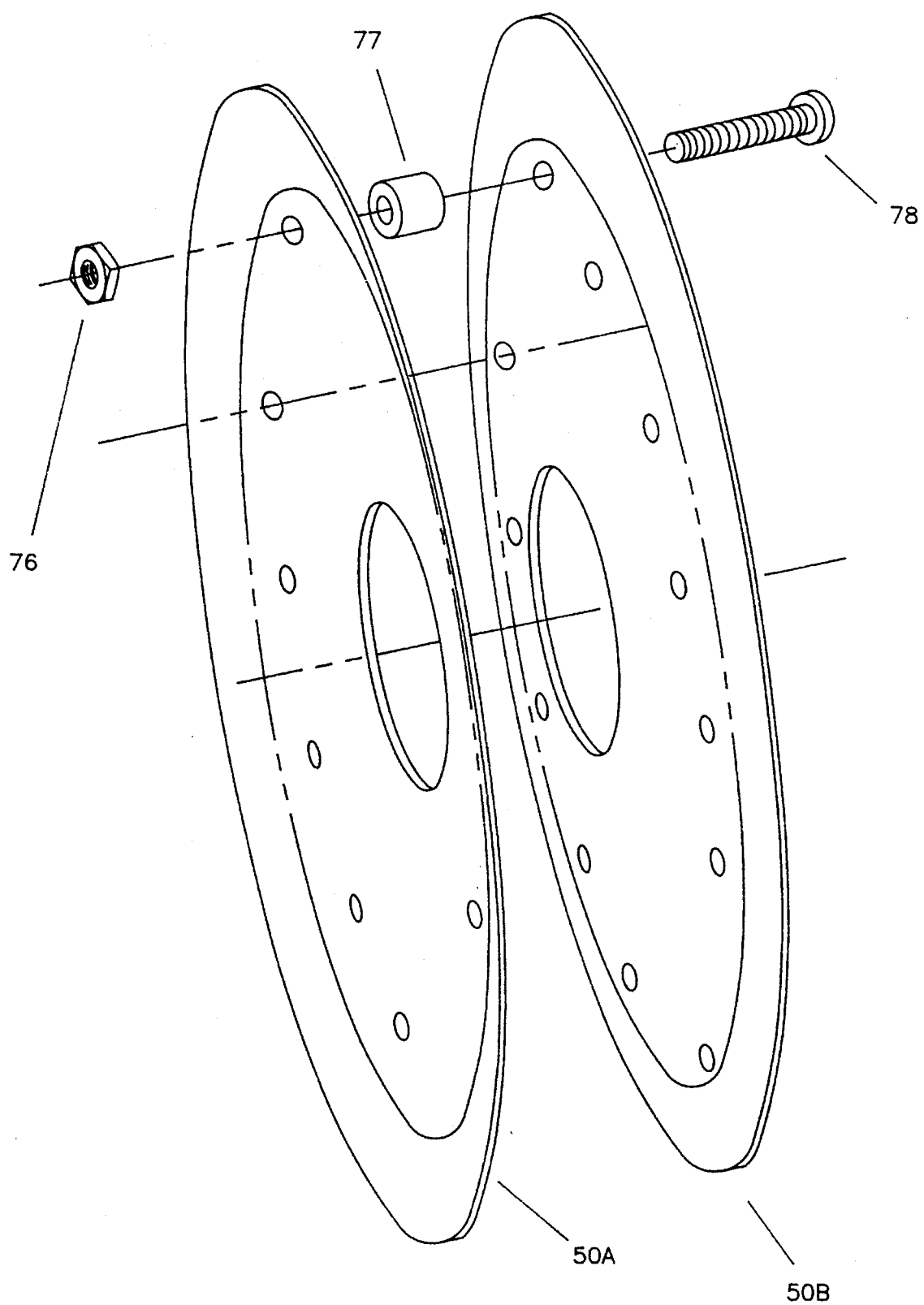

FIGS. 1A–C is a perspective view of numerous parts embodiments for a selectable directional discharge of a multiple line having a circular reel in these particular embodiments of the total device invented herein. A main line communicating with stage lines at intervals having articles including fish hooks attached to the stage lines. Fish hooks and articles are stored in compartments holding area. Upon discharge of mainline the holders have particular directional controls to direct the hooks and articles away from other hooks and other compartment fish hook holders.

The reel may be selected to rotary discharge the main line parallel to the reel flanges or perpendicular to the reel flanges as in spin casting. The hook holders automatically discharge the hooks from both sides of the reel regardless of the direction the mainline is discharged from the reel. The hook holders are structured particularly for multiple directional discharge of articles including fish hooks slow or very rapidly in sequence free and clear of other components so the hooks and stage line follows with the main line to go fishing.

Figure 2:
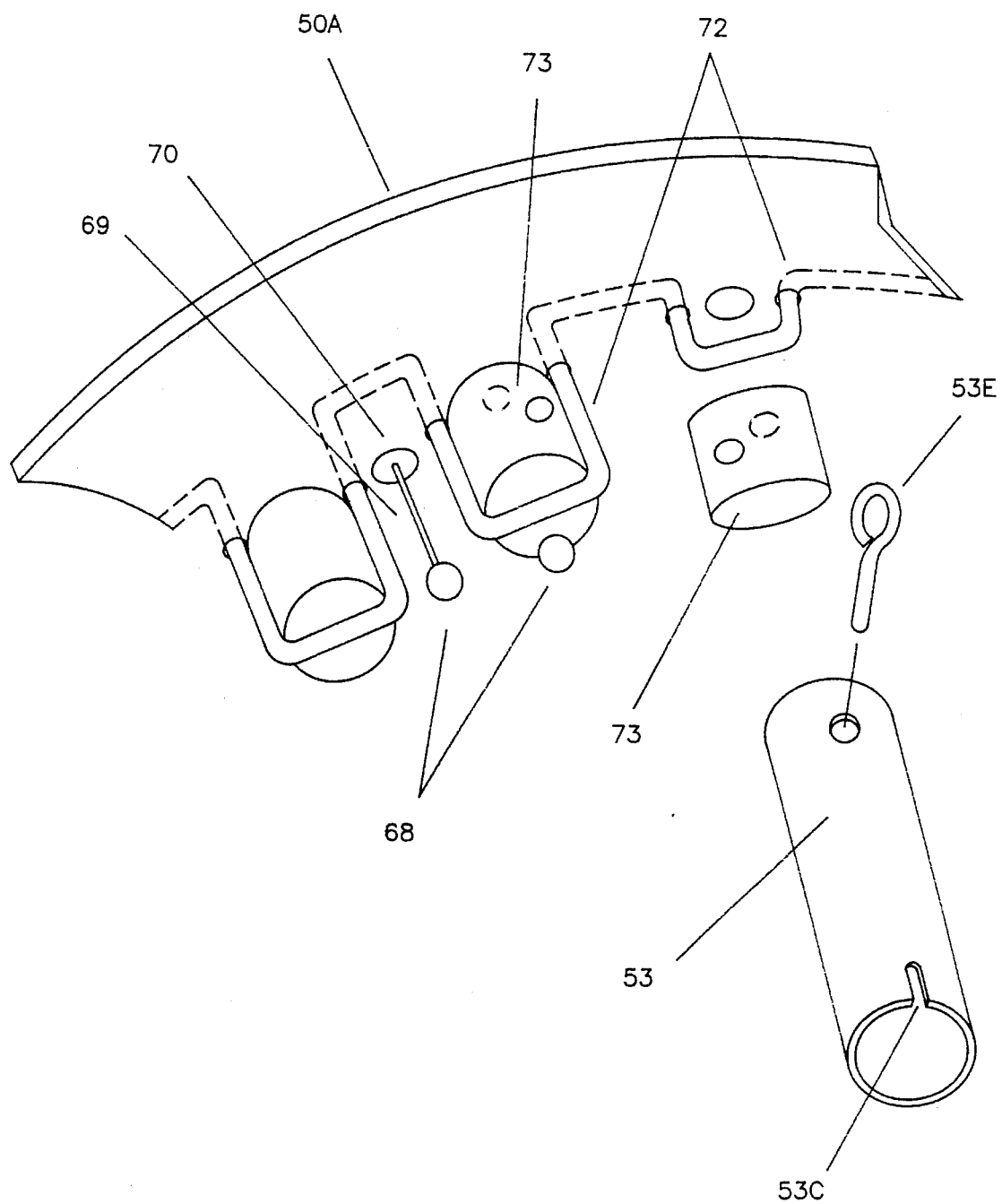
FIG. 2 shows a holder attachment.

FIG. 2 illustrates holder structure. The hook holders are structured to inherently lean to discharge hooks away from the reel flanges and other holders with the significant reality that the holder angle is not always completely directly toward the strain of the pull of the stage line as the holders have a rod 73 held in place by an elastic lacing 72 strapped over the rod and laced through the reel flanges 50A, 50B and extending to hinge other rods 73 for the same purpose. The flexible lacing pulls from two sides of the rod; cause for the rod to have tendency to rock and roll but not totally toward the pull of the stage line. This directional leaning capability prevents the stage line from dragging the holders into other holders with hooks. The holders are consequently directed to discharge the hooks free and clear as one embodiment holder 53A has a slit or notch 53C in the outward open end of the transparent, tubular, flexible plastic article holder 53A. The stage line 83 has an obstruction such as a knot, bead or as in FIG. 1A a trigger pin 51C dimensioned on the stage line to fit inside the hook holder behind the slit 53C as the stage line is slid and wedged in the slit or notch 53C. The pull by stage line 83 pulls the hook holder at increasing angle as the main line 84 is discharged from the reel in this embodiment. The rod 73 s pulled from two sides by elastic lacing 72 as the stage line 83 pulls and assist leaning the hook holder 53A. The rod being circular about it's plane laying flush to reel flange. When the stage line pulls the rod due to it's seating begins to lean and roll slightly favorably toward the reel flange rather than to lean toward the exact direction of the pull of the stage line when the main line is discharged for fishing with the stage lines and fish hooks. When the angle of the hook holder increases to a point for clear discharge of the hook the trigger pin 51C, or knot, or bead on the stage line allows the stage line to slide out the end of the slit due to the change in angle of the holder holding hooks and/or articles. The hook comes out of the holder rapidly and the elastic lacing slaps the holder back to its original location noted by dotted lines in FIG. 1A, 53A on rotary discharge of main line arrow X. Also as the hook travels out of the holder, the holder slings the hook directly out and away from the reel flanges 50A, 50B, and away from other hook holders on the reel flanges to send the hooks fishing clear with the stage line and main line 84.

The article holders are transparent flexible plastic tubular material that are manually forced over rod 73 and elastic band or surgical tubing lacing 72 for conveniently allowing the operator to observe the articles and/or hooks in the holders 53A. The elastic lacing allows the operator to bait the hooks while on the reel prior to fishing. The article holders constructed in this manner makes it convenient for the operator to pull off the holders from the rod for cleaning the holders and if the operator selects another embodiment the change is convenient and quick to place other embodiments on the reel flanges. The convenience, speed and particularly safety of baiting the hooks on the reel before casting or laying out the main line to fish is very rewarding and prevents multiple problems including main line direction as the main line can travel out straight as desired at several miles per hour in speed and accuracy in a safe manner.

FIG. 1A, 87 illustrates swivels may be used along with swivel stops 85A, 85B on the main line 84 in conjunction with stage line 83. A swivel slide stop 86 being a rubber sleeve fitting snug around the main line slides when adjusting location of the stage line communicating with the main line if and when the adjustment be needed. Some main line having stretch may affect the location of a stage line in relation to location to an available hook holder and the adjustment also can be used to take up slack in the stage line for smooth casting or discharge of the lines.

Figure 42:
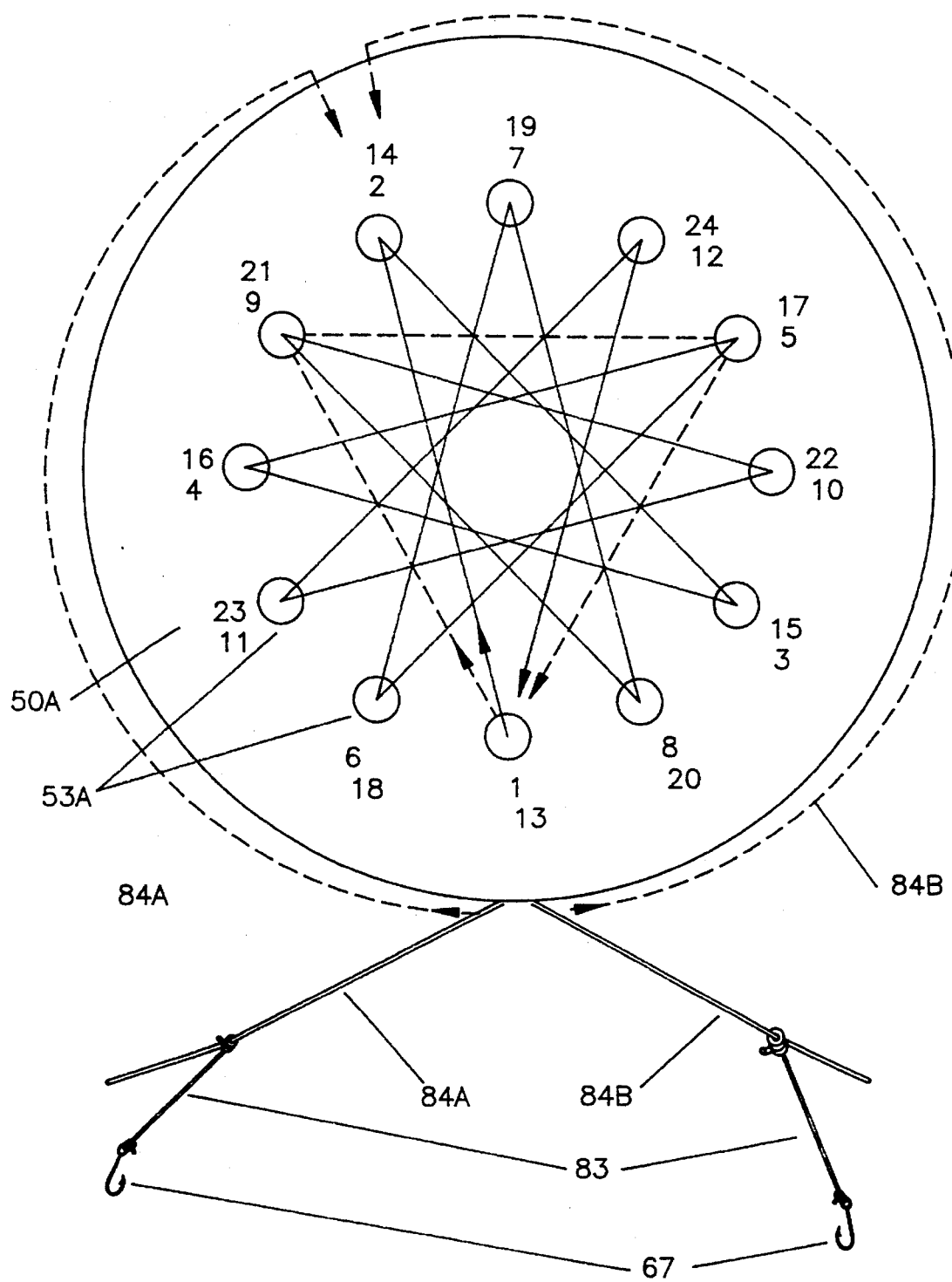
FIG. 42 shows one possible order of storing stage line and hooking devices.
Figure 42A:
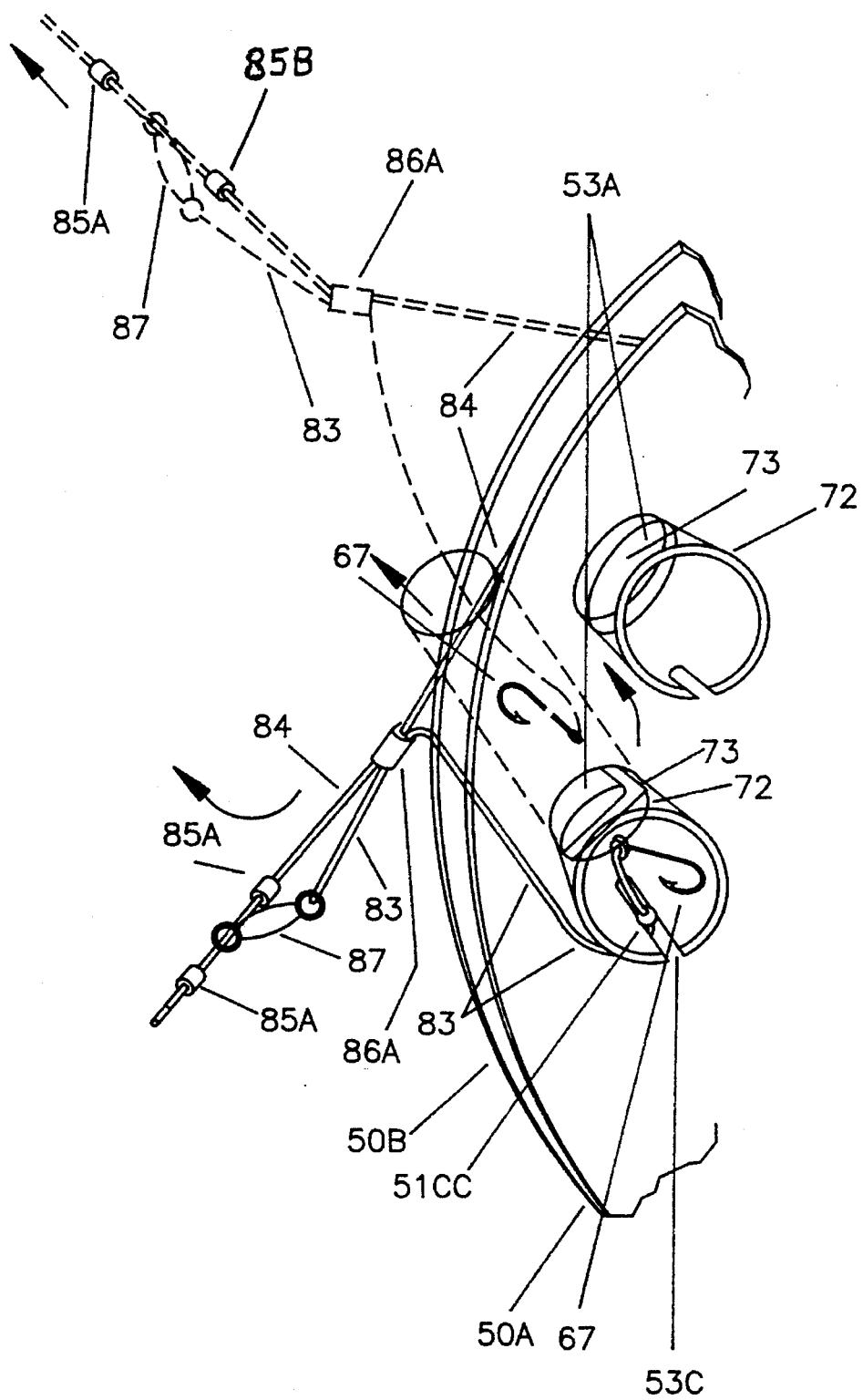
FIG. 42A shows hook holders attached to a reel flange substantially as FIG. 1 and further including main line slide stops and stage line slide stops.

FIG. 42A illustrates another style of this embodiment referred to as 86A. The swivel 87 fits between main line stops 85A and 85B. The stage line slide stop 86A differs from swivel slide stop 86 as 86A fits on the main line and over the stage line and particularly toward the reel rather than the outer end of the main line so as to pull the stage line with minimum sliding of the stage line slide stop when casting out the main line. A fish caught on the hook can pull and slide the stage line slide stop giving the fish more stage line to play. FIG. 42A dotted outline illustrates the movement of the hook holder 53A in relation to the reel flanges 50A and 50B preparing to toss the hook 67 from the holder as the main line with the stage line slide stop 86A pulls the hook attached to stage line 83 from hook holder compartment 53A. The rod 73 and flexible lacing 72 are not illustrated. A bead on the stage line is referred to as 51CC simply replaces a knot or obstruction on the stage line to fit behind the notch 53C to pull and lift the hook holder at an angle for releasing the hook in the proper direction clearly.

FIGS. 1A–B illustrates a rotary shield 52A removed from it's location on 51A trigger shield. An extra trigger shield 51A is also illustrated. On the reverse side of the reel, shields identical to 51A and 52A are in place. The reference 51B and 52B are the reference for the shields on the back side of the reel. For convenience of quickly removing the shields eye screws 79, hook wires 80, rubber band 81, and eye bolt 82 are used on trigger shield 51A and 51B. The rotary shield 52A is illustrated with screws 52D for securing rotary shield to trigger shield for simplicity. However wire hooks and rubber bands can well hold the shield to the reel in general for quick removal as being used for the trigger shield in this illustration. The rotary shield is used to keep the hooks inside of hook holders 53A and 53B when the hooks and mainline are being discharged in a rotary mode of the reel parallel to the real flanges 50A and 50B.

When discharging the main line perpendicular to the reel flanges as in common spin casting the reel need not rotate and the rotary shield is removed from the reel. The trigger shield 51A remains on the reel.

The primary purpose for the trigger pin 51C is to hold the hook holder 53A down behind the trigger shield as demonstrated by the dotted outlines thus shielding the hook from falling out of the hook holder. When the main line is cast perpendicular to the reel flanges, note arrow Y, the trigger pin 51C is pulled by the stage line from trigger pin chamber 51D. The approximate angle of slope is indicated on trigger shield 51A by dotted line 51E for fitting closely to mouth of hook holders 53A to keep hooks 67 from falling out of the end of the holders.

When the trigger pin is pulled by the out bound main line, note arrow Y, the elastic lacing noted in FIG. 2 causes the hook holder to very rapidly jump free and clear of the trigger shield pitching the hook out of the holder free and clear to follow the stage line and main line to go fishing when the hook 67 is baited which normally would have already been done by the fisherman operator while the hook was on the reel or when the hook had previously been reeled in.

The very rapid return of the holder to it's original position can cause some wobble or rocking motion of the hook holder and if close tolerance of distance between the trigger shield lip and the hook holder mouth occur then a shock absorber is used and constructed of a vibration dampener line 69, dampener bead 68, and dampener button 70 all three tied together as illustrated in FIG. 2. The button is inserted into the reel flange 50A through a button slot 71. The line 69 is dimensioned to allow bead to be placed firmly over inside edge of rod 73 and is secured when holder is manually force fit over rod 73 and elastic lacing 72. Consequently the wobble action will not occur as the line 69 prevents any rocking action instantly as the rod with its hook holder seats flush soon as the hook is tossed and pulled from the hook holder compartment. When reeling in on a return cycle the hook can be baited and placed in the hook holder. The holder then pressed into position, as dotted line indicates, and the trigger pin on the stage line pushed through the trigger chamber and inside of the hook holder and a discharge cycle is ready to respond again. Hooks can all be placed in holders and be baited on the reel later at operators convenience as well.

FIG. 1B shows also a pair of reel flanges 50A and 50B removed for observation. This embodiment illustrated is nothing more than two plastic dinner plates in saucer form having holes for elastic lacing, button hole slots, eye bolt holes, an axle hole centered and holes for the twelve bolts 78, nuts 76 and spacer 77 for the main line to ride on when reeled and the bolts 78 hold the reel flanges apart by the spacer 77 dimensioned to accept the amount of main line for the reel.

FIG. 2 shows a safety key 53E to safety a hook holder to a rod 73 but normally the tight fit of the hook holder over the rod and over the elastic lacing 72 is adequate and not using the safety key at all allows quick change and selection of embodiments and services to perform for this selectable multiple duty fishing device by selective means.

Figure 15:
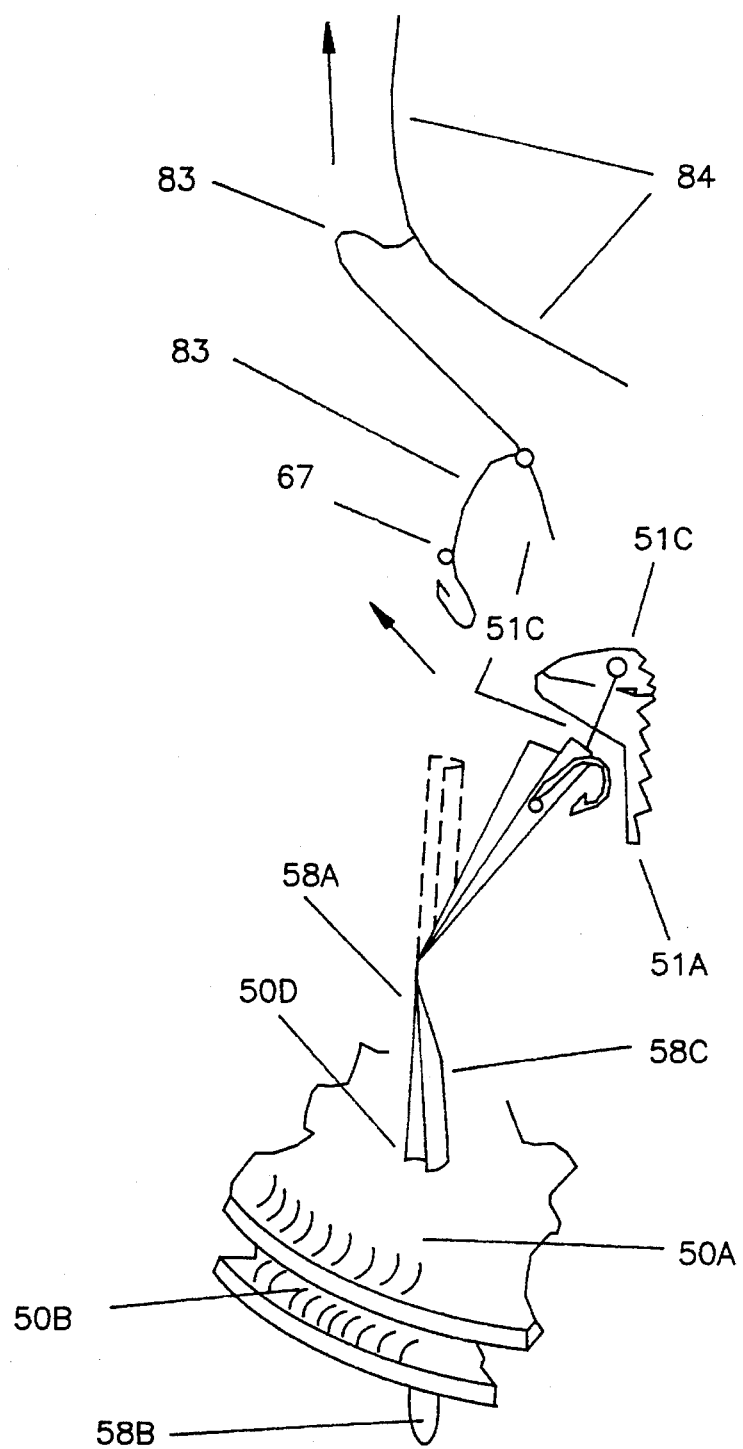
FIG. 15 shows the strip of FIG. 14 extending through the reel and dispensing a stage line.

FIG. 15 shows the use of metal strips of particular form using a trigger shield style of discharge to illustrate embodiments further selectable. Rotary shield on front, 52A must be removed for another embodiment of hook holders 54A and 54B.

FIG. 1 illustrates a hook holder 54A having a fine spring steel wire referred to as hook securing directional wire 54C. The back side of the reel illustrated has the identical, 54B and wire 54C. Arrow Z shows the hook holder operating to thrust the hook in a perpendicular cast so the hook will cast over the reel flanges forward from the back side. Also this 54A and 54B with wire 54C discharges parallel to reel flanges on rotary reel mode. The wire 54C particular uses include holding the hook firmly in the compartment of the hook holder and when the hook does discharge, the wire 54C carrying the hook eye riding over the wire directs the hook out and away far from the reel flanges for a clean clear release of the hook. The spring tension also flips the hook even further just at the moment the hook slips off the end of the wire 54C. The wire is dimensioned for guiding by a slight bend at outer end and slightly extends out from inside of the tubular hook holder a distance to release the hook directional away from the reel. This embodiment is quick and easy to install on the reel as the wire fits inside of hook holder tube between the rod 73 and the holder 54A and 54B.

Figure 4:
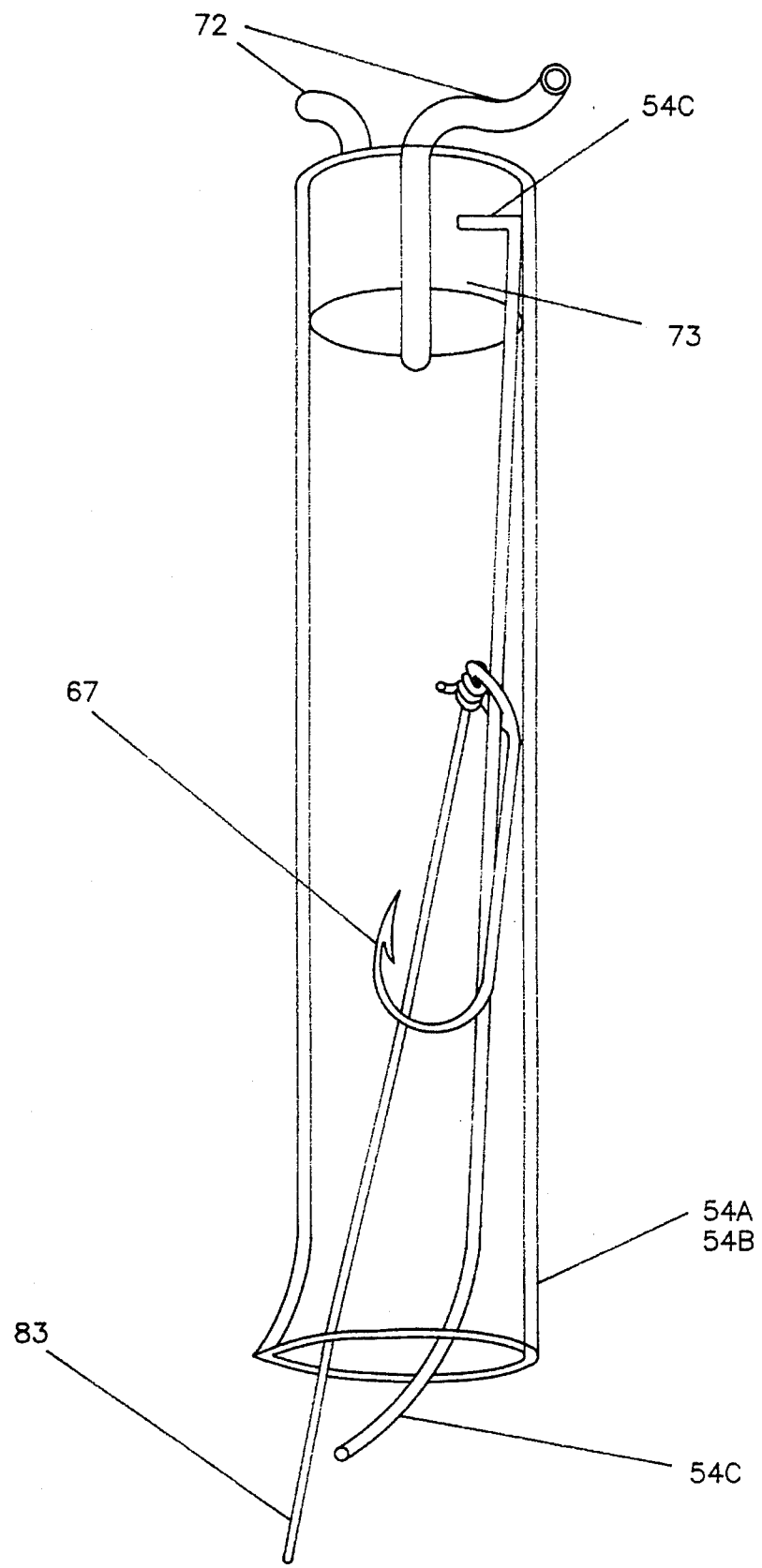
FIGS. 4, 4A show a hook securing wire inside of a holder.
Figure 4A:
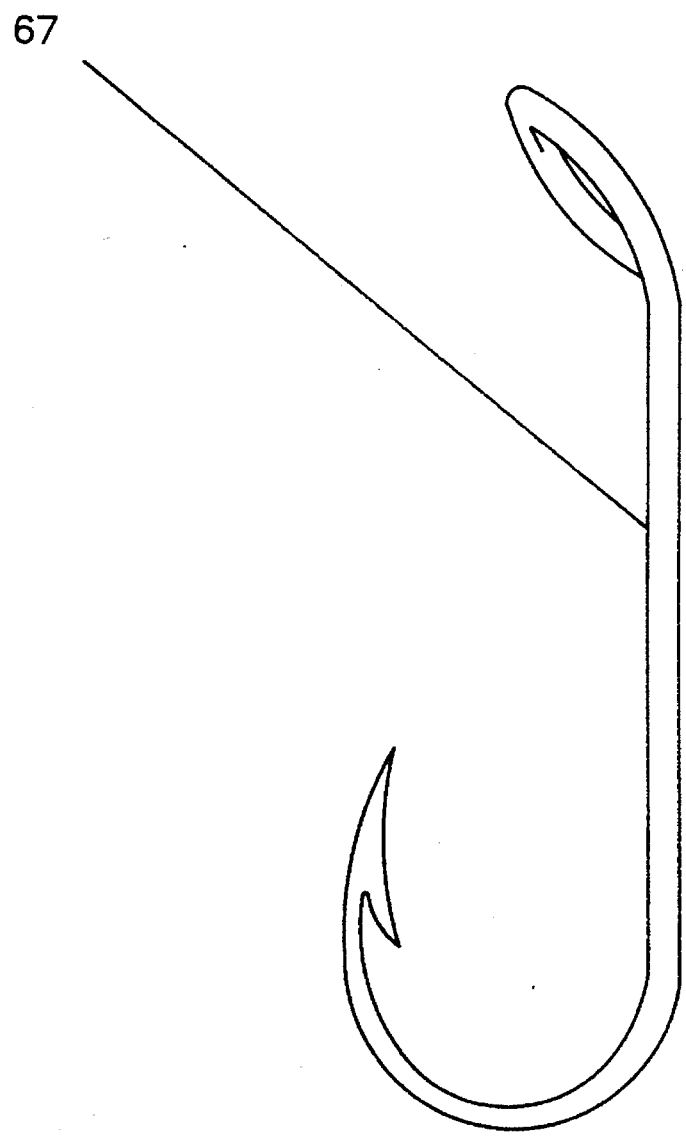
Figure 5:
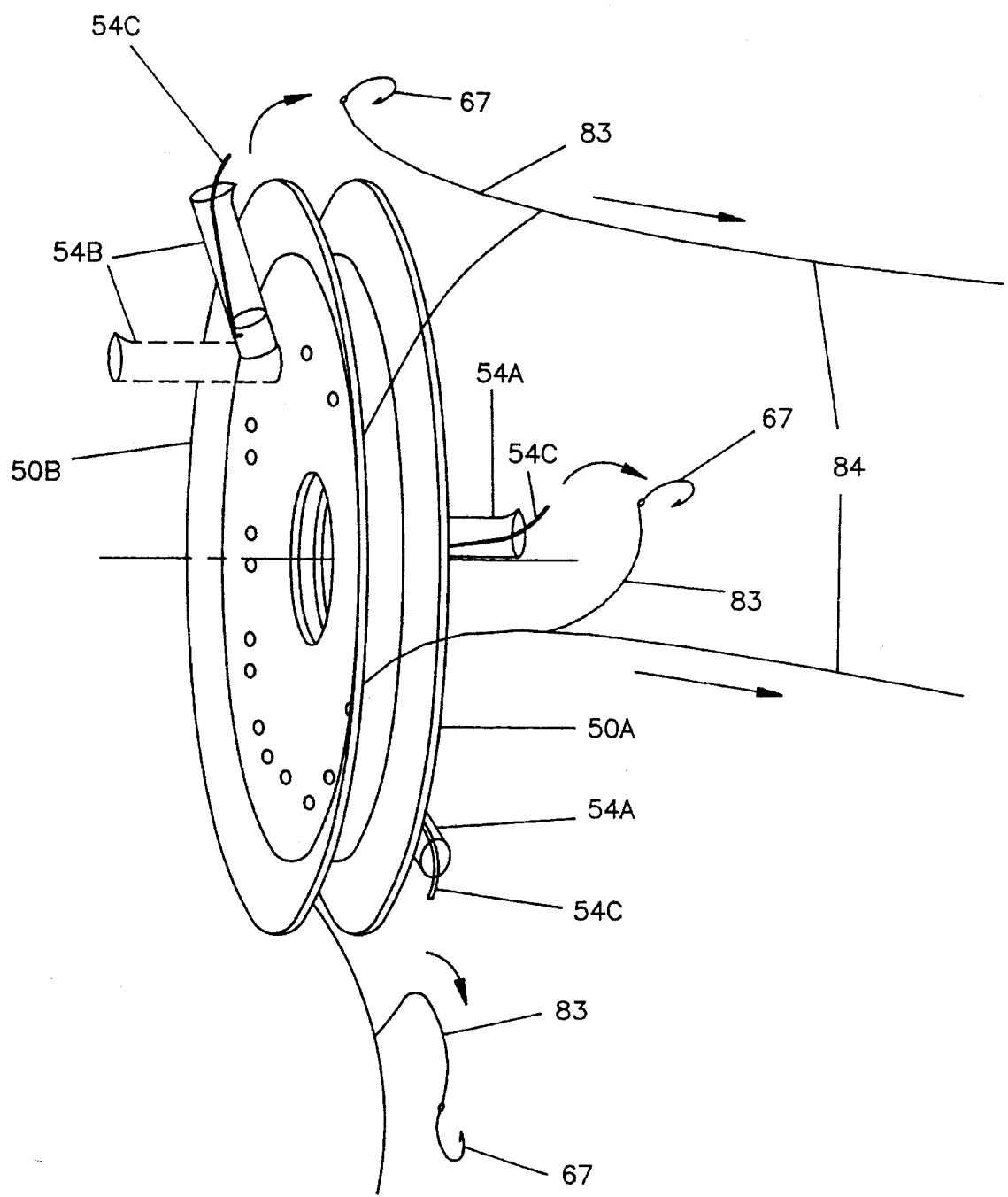
FIG. 5 shows directional discharge of the hooks.
Figure 21:
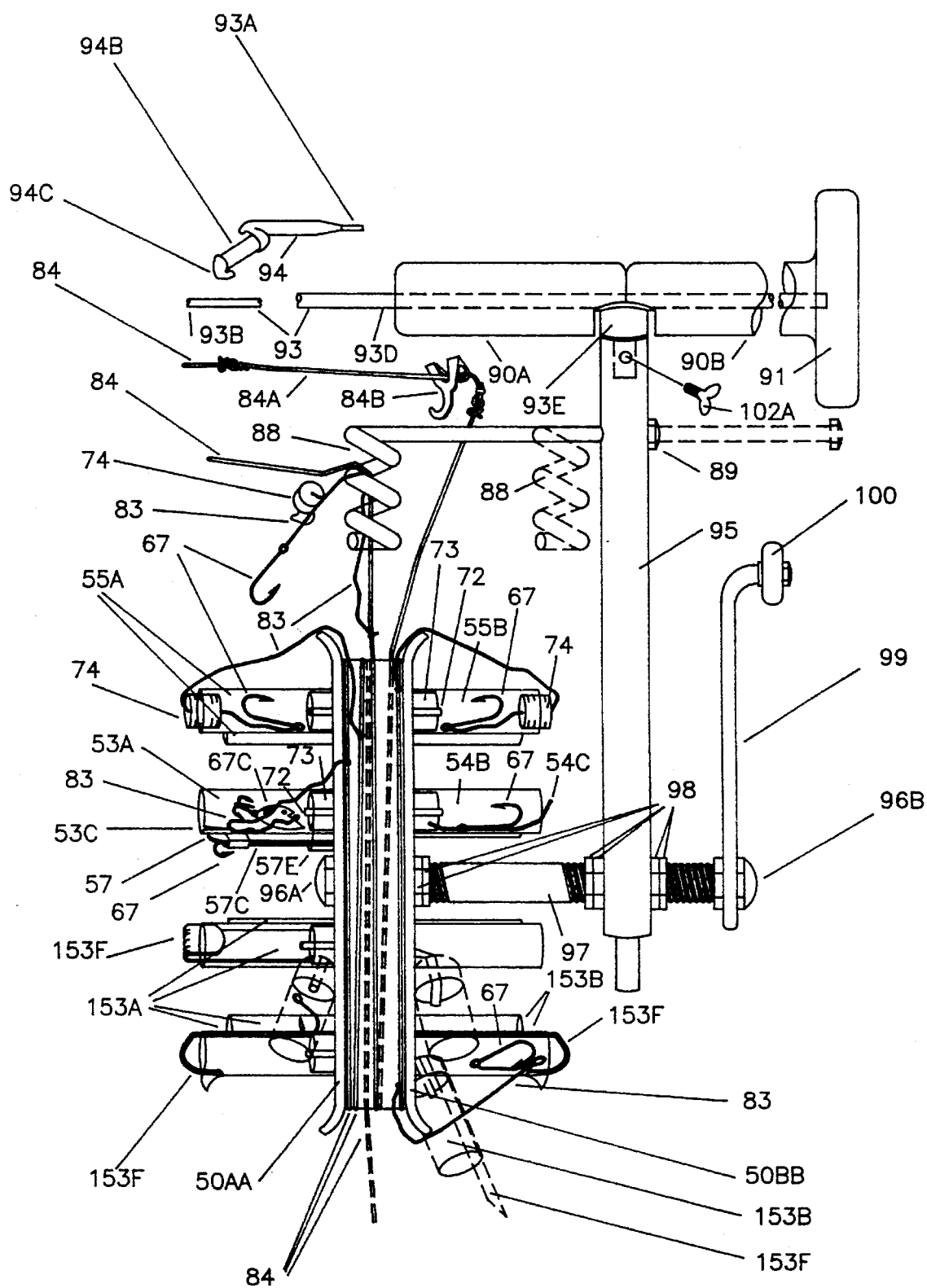
FIGS. 21, 22, and 23 show a discharge reel in combination with a fishing pole with line control guide and reel support stand.

Note FIGS. 4, 4A illustration of 54A, 54B construction flared end. The inside end of wire 54C has a barb at a ninety degree to it's length that grabs the rod 73 to help keep the wire in place even though the compression of the hook holder over the rod holds the wire firm. The force of the wire along it's length exerts pressure on the fish hook eye against the length of the inside of the holder keeping the hook from falling out. When the stage line pulls the hook the wire causes a slight drag on the hook eye and the hook holder begins leaning. When the angle is directed by the hook holder for casting the fish hook eye slides along on the wire and the hook is directional discharged away from the reel. The convenience of having this embodiment that does not require any shield to keep the hooks from falling out of the compartment of hook holders make a very favorable embodiment included in this fishing invention. FIG. 4, FIG. 5, and FIG. 21 illustrate the embodiment 54A and 54B and the embodiment is understandably suitable for use in illustration in FIG. 24 and FIG. 28 for directional discharge of fish hooks. Holder 54B outer lip should be flared in a curve to allow hook smooth release.

Figure 6:
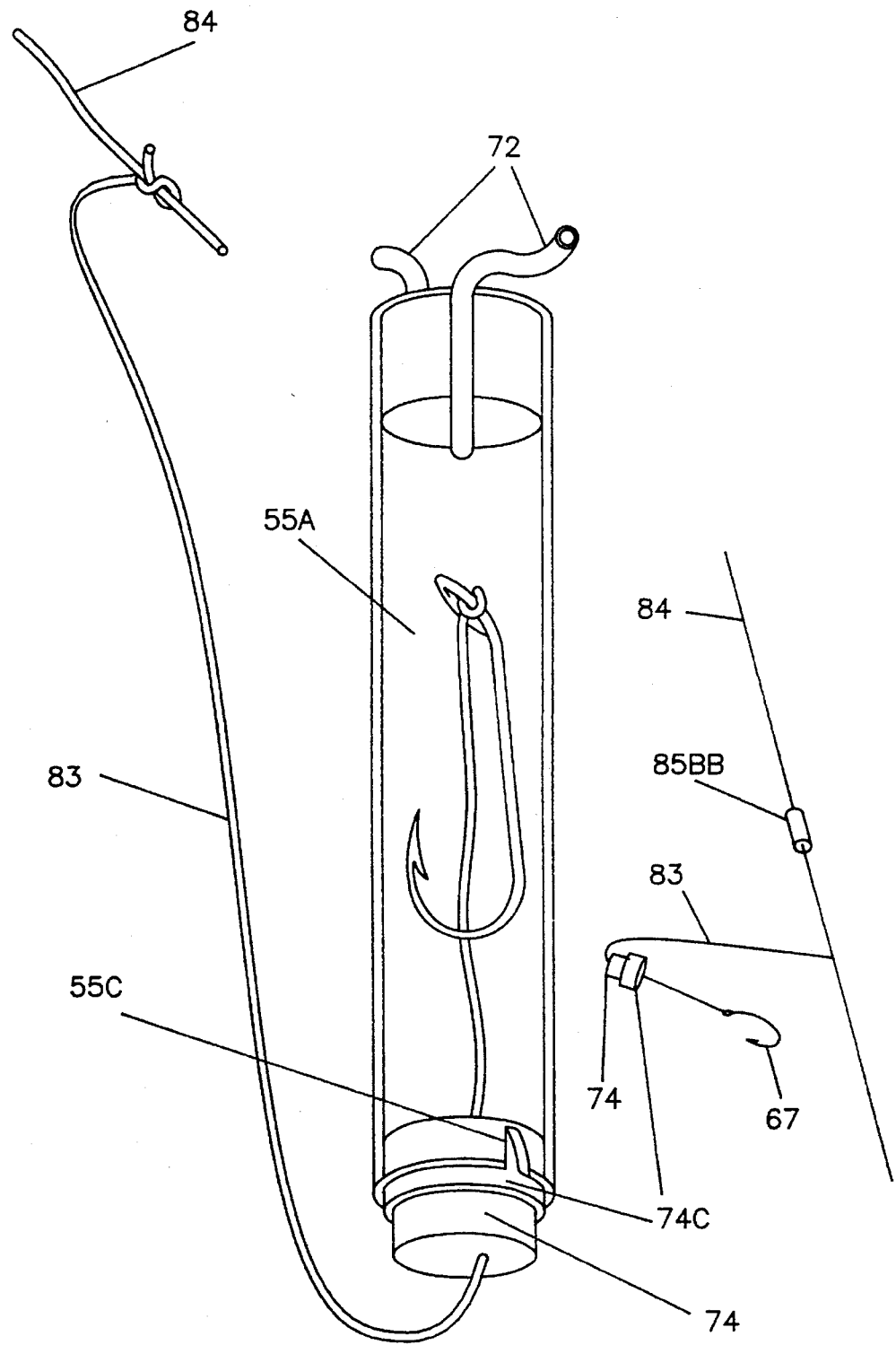
FIG. 6 shows a plug on a stage line inserted in a holder.
Figure 7:
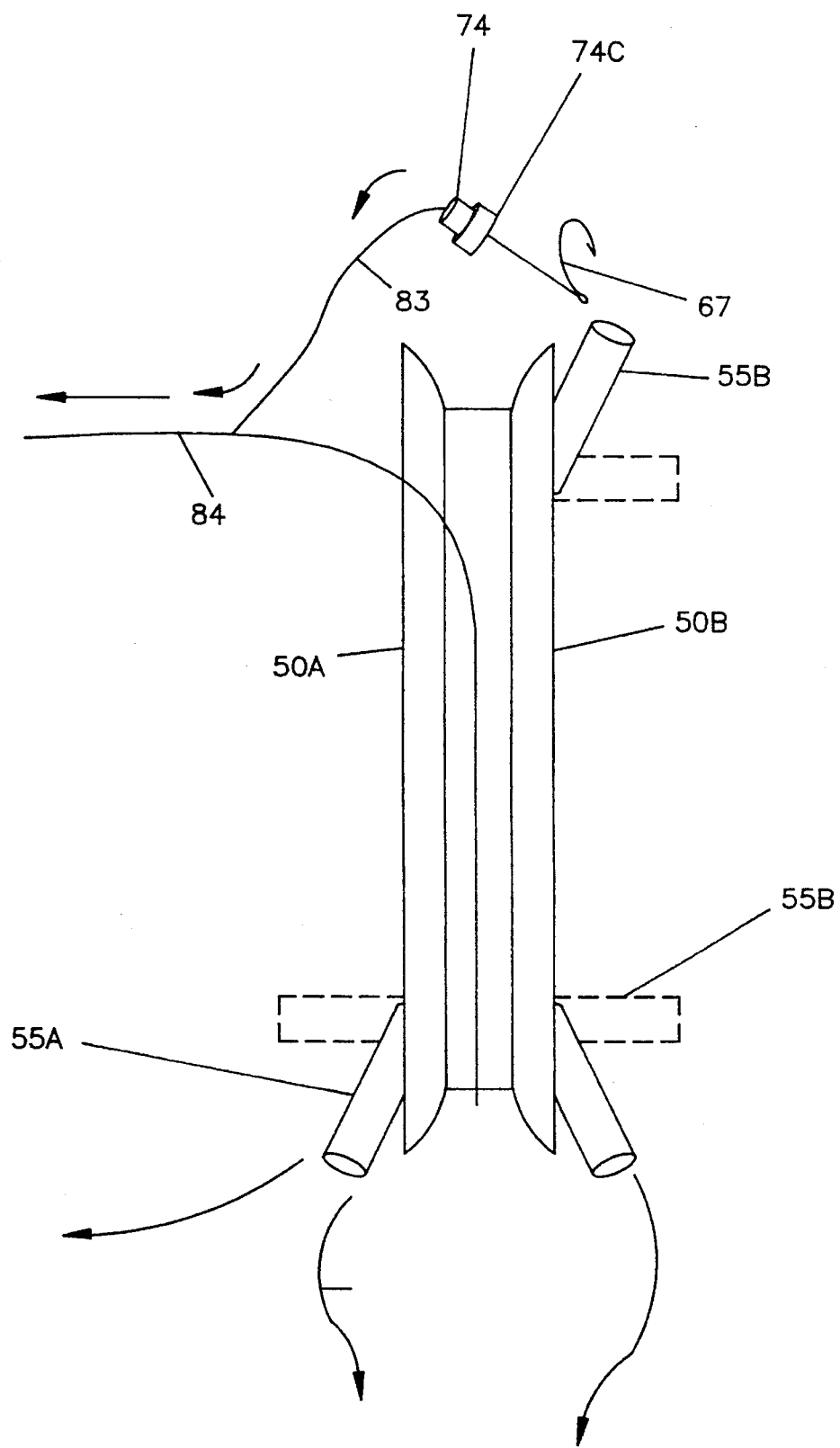
FIG. 7 shows dispensing of the hooks from the embodiment of FIG. 6.

Though shields lend some safety factor in preventing accidental release of fish hooks slipping out of holders and snag, another embodiment in FIG. 6, 55A illustrates a fish hook holder not requiring a shield as a plug 74 keeps the fish hook and/or articles including bait in the holder compartment.

FIG. 6, FIG. 7, FIG. 8 and FIG. 21 illustrate plugs being used. The plug must be dimensioned to fit only firm enough to require a gentle tug to remove and must be protruding well out of hook holder tube to give the stage line leverage, particularly when casting the main line perpendicular to the reel flanges releasing plugs from the back side of the reel which is flange 50B. Pulling at an angle on the plug requires that the plug extends out of the tube a ways to give the stage line some leverage to lean the plug rather than pulling the plug back further into the tubular hook holder compartment.

Figure 8:
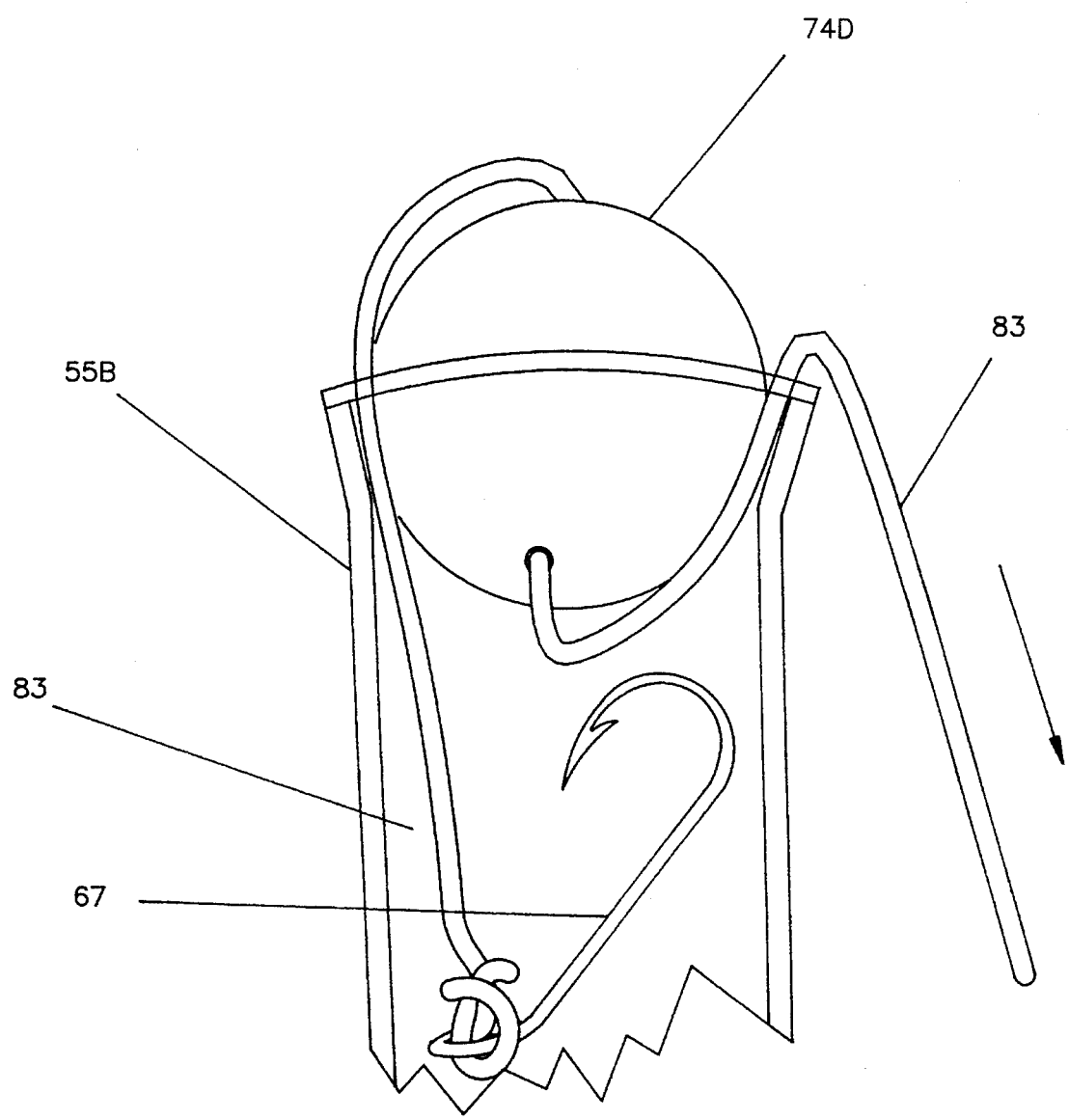
FIG. 8 shows a round plug on a stage line inserted in a holder.

FIG. 8 illustrates a round plug. By placing the stage line leading to the main line inside the holder under the plug and the end of stage line with the attached hook leading from outside the holder forth in and under the plug. This embodiment causes the plug to roll and pop out of the holder cleanly. Otherwise if the plug is put in reverse to this procedure the round plug has a tendency to roll and wedge pulling the plug further down into the tubular holder when casting the lines out from the back side 50B and 50BB reel flanges when casting perpendicular as in common spin casting.

When using plugs 74 and 74D the plugs release well rotary parallel discharge, as well as perpendicular from front flanges 50A and 50AA without any particulars other than simply not having the plug too firmly seated but simply enough pressure to retain the plug which keeps the hook from falling out of the hook holder thus requiring no shield on the reel to keep hooks in their holders. Consequently plugs cast out from front and back side of reel in all directions.

The plugs 74 and 74D may be floats, weights or neutral buoyancy as selected by the operator to fulfill the mission of retaining neutral, sink the lines with the main line or float the fish hooks just up off from the bottom of the fishing waters depending on the fishing circumstances determined by the fisherman. Plugs may easily be built for quick change and selection not illustrated for consideration of brevity.

Figure 3:
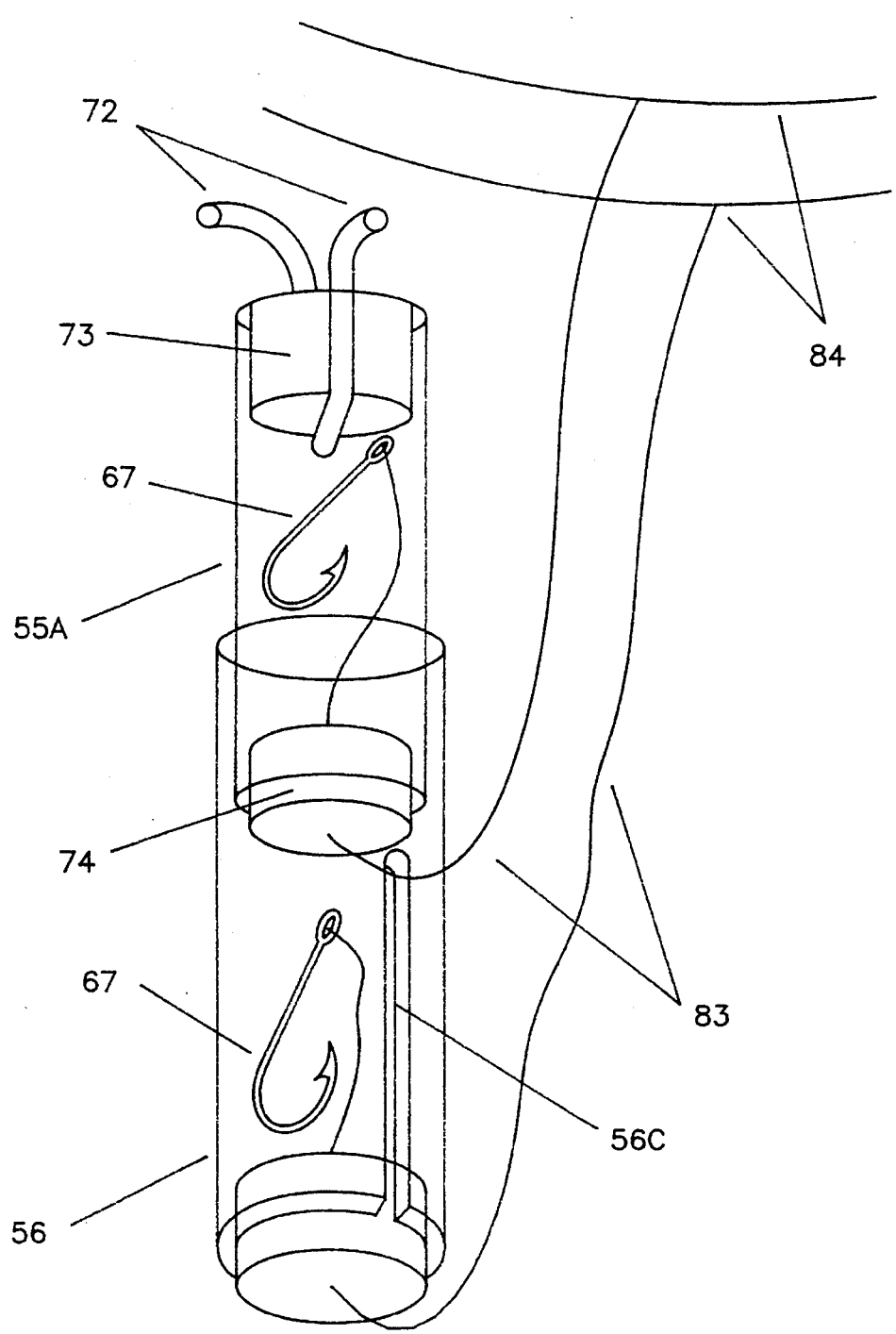
FIG. 3 shows holders in series.

FIG. 3, 56 illustrates a series plug hook holder allowing double the number of hooks and stage lines on reel flanges. Holder embodiment 56 fits over holders 55A and 55B. Holder 56 has a split notch reaching to near plug 74 and holder 55A, as illustrated, to prevent stage line 83 from being tangled with hook 67 inside of holder 56. Holder 56 must necessarily be constructed out of material suitable to hold it's shape well enough to support a plug 75 when having a longer slit than holder 53A. Holder 55A in FIG. 6 may have a short slit 55C to allow a plug to enter and discharge easily but not necessarily always. Plugs also may use 74C rubber band over the plug for further secure means of seating plugs 74 and 75 but a small amount of flex by the holder mouth opening is normally capable of securing the plug. FIG. 6 shows a main line weight 85BB to sink the main line 84 while the stage line 83 has a plug to float the hook 67 up off the bottom in water so the bait suspends visibly.

Figure 9:
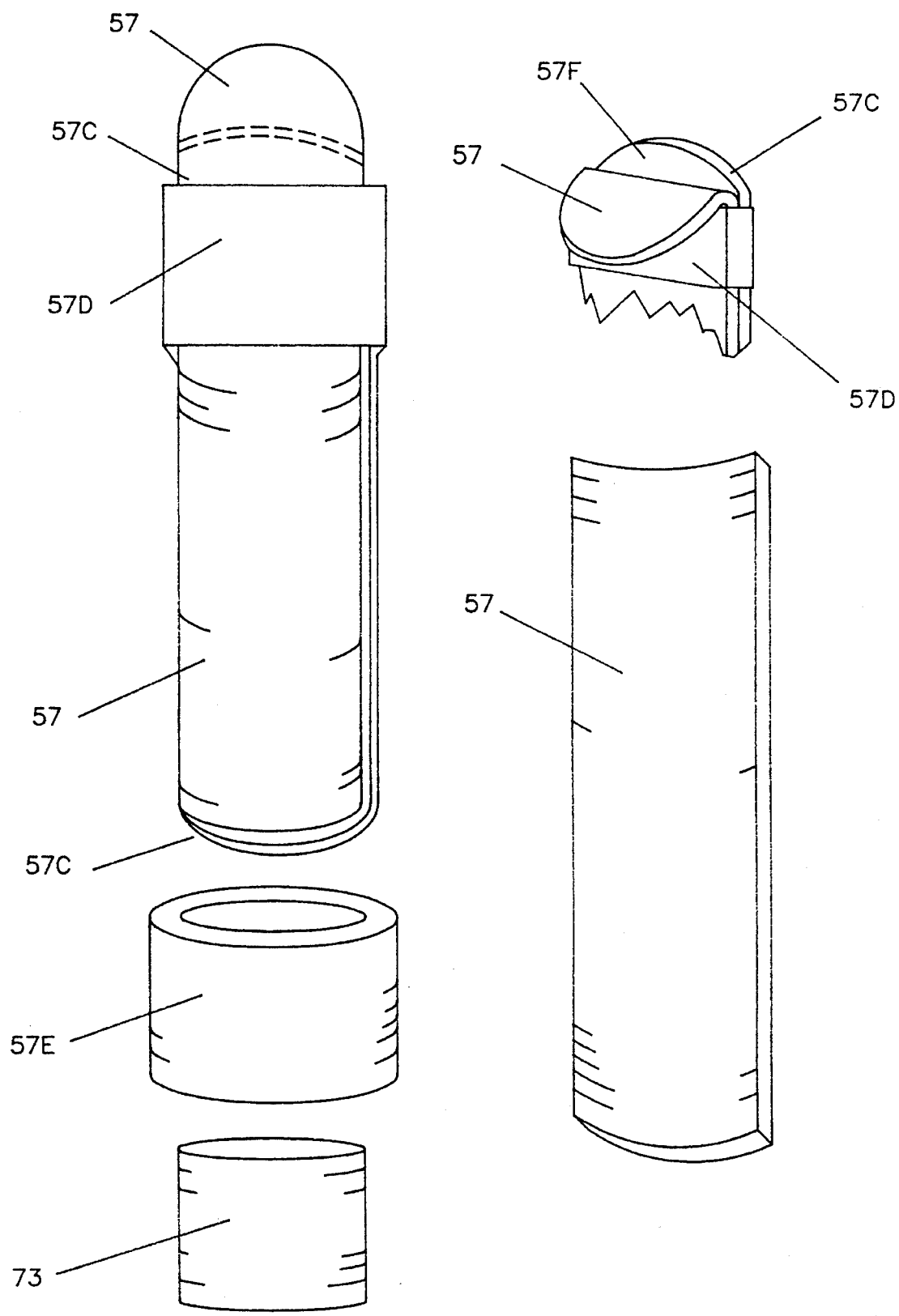
FIG. 9 shows an alternative embodiment utilizing a flexible concave strip, like that of a tape measure, to toss the hook.
Figure 10:
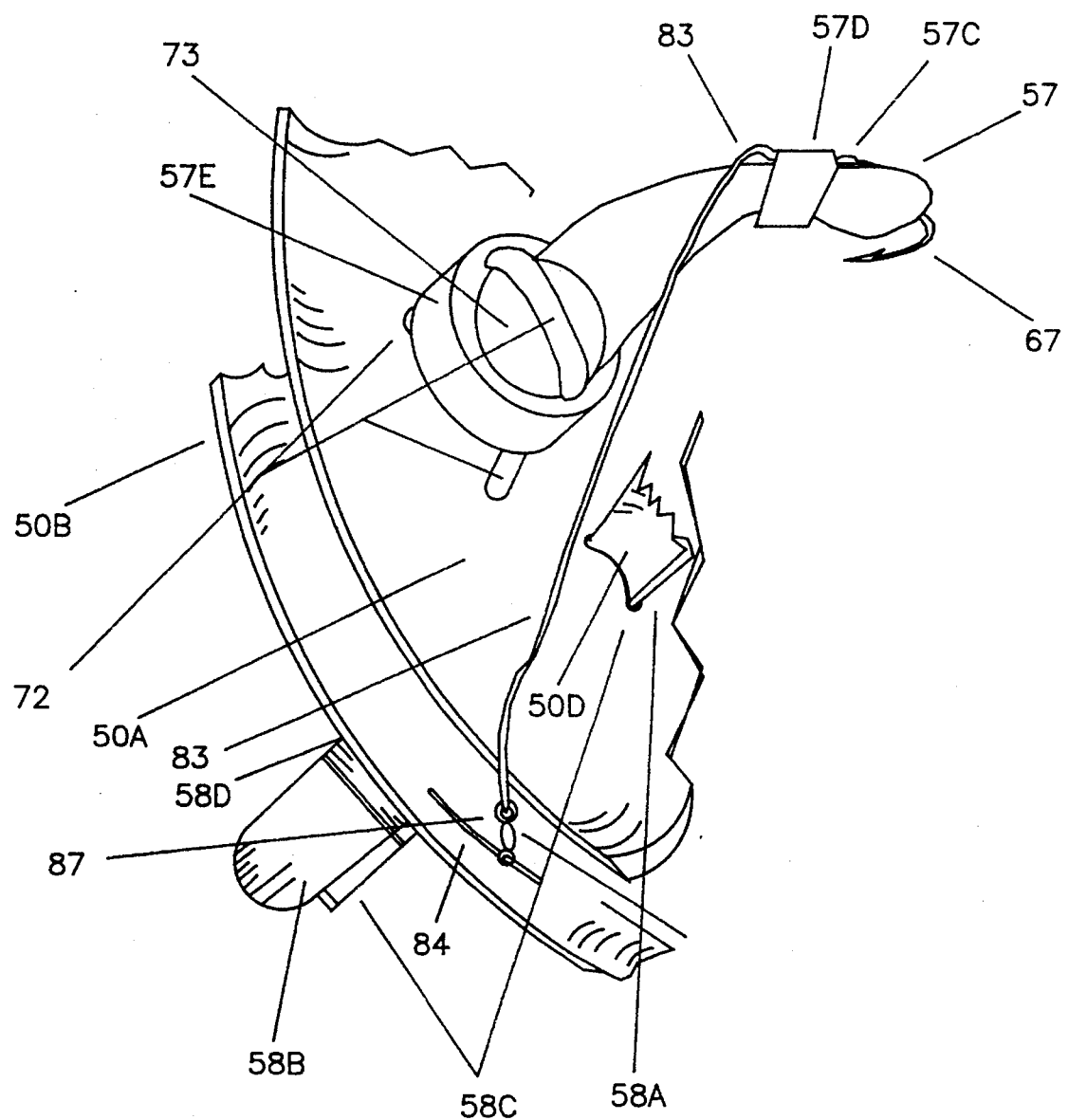
FIG. 10 shows the flexible strip attached to a reel flange.
Figure 11:
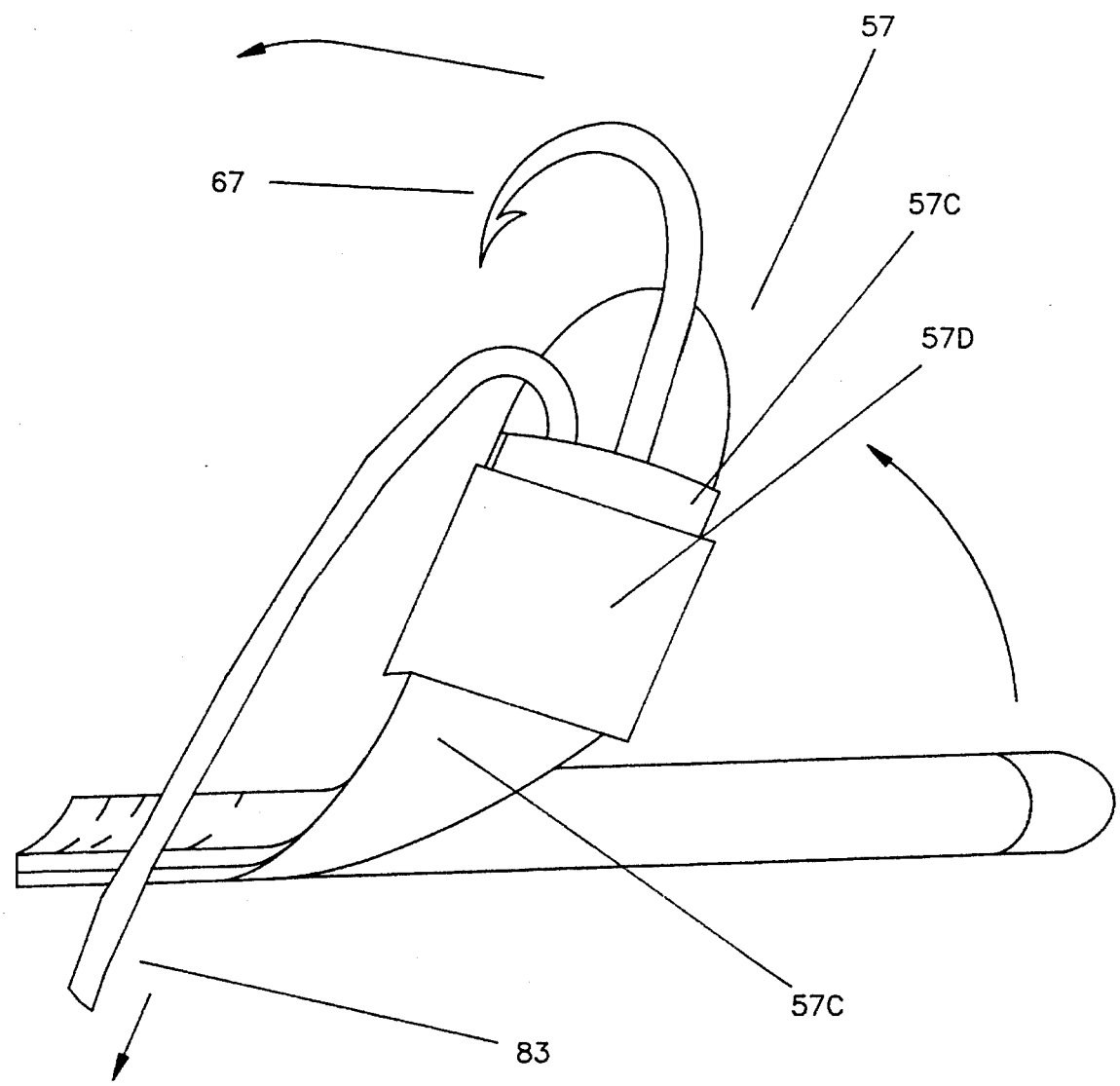
FIG. 11 shows flexing of the strip.

FIG. 9, FIG. 10, and FIG. 11 illustrate a directional discharge portion of the embodiments utilizing reel flanges 50A and 50B when selecting to use fish hook externally on directional discharge holder for rapid access of baiting the hooks. Tubular hook holders, as fore mentioned, may be quickly pulled off from rod 73 and replaced quickly with flexible sleeve 57E. Metal strips of common retractable measuring ruler material which carpenters throw away for trash when a portion of the length gets damaged is ideal for this directional discharge control embodiment. This common material has a curvature across the width with a concave surface on one side and convex surface on opposing side. One inch wide ruler material will work well for many embodiments as width depends some on hook size. Length is coordinated with reel flanges so as to release hooks clear away from obstructions on the reel.

The material is not limited to steel as many plastics for durability are suitable. It also has very strong elasticity and flexibility. Formed with a convex and concave surface across the width, as common retractable measuring rulers, plastic also supplies suitable material for this embodiment as the material tends to rule direction of bending rather than completely directly follow in stage line pull.

Referring to the material as ruler, the ruler holder 57 is constructed in FIG. 9 with two strips of ruler material. One strip dimensioned a bit longer than the other to allow a fish hook to be inserted easily between the two strips. Notice FIG. 9 in parts showing that when one concave strip is folded back it no longer remains concave but becomes flat and the other strip remains concave thus creating a slight chamber allowing the fish hook to be inserted in the chamber 57F of FIG. 9, releasing locks in hook.

The outer limit, or nearly so, of the shortest strip and the longest strip are both wrapped together with common electrical plastic tape which weathers well and has some flexibility. The two strips of ruler material fit together and are manually forced between rod 73 and flex sleeve 57E which secures the strips in place. The elastic lacing 72 shown in FIG. 2 as well as FIG. 10 fits over rod 73. The elastic lacing is also snug fit inside of 57E sleeve so that the rod can pivot in hinge fashion on reel faces 50A, 50B, the front and back flanges of the reel. Electrical plastic tape is illustrated as 57D, 58D and 59D in these embodiments but many materials are also suitable for holding the ruler material together so as to carry the fish hooks secure between the ruler stripe with the fish hook barbs external for baiting on the reel.

This embodiment using ruler or similar material in FIG. 9, FIG. 10, FIG. 11, FIG. 12, FIG. 13, FIG. 14, FIG. 15, FIG. 16, FIG. 16A–F, FIG. 17, FIG. 18, FIG. 19, FIG. 19A, FIG. 20 and FIG. 21 has, of importance, an inherent nature to bend in a direct hinge manner very near it's seated base when at first stress is put on the outer limit of the strips of ruler type material, as opposed to a round spring wire that simply bends rather evenly throughout it's length.

The inherent nature for concave and convex strips to produce their own hinge effect while the rest of the material remains more rigid and then able to suddenly twist and change directions lends it's ability to start out lifting the fish hook toward the outer reel flange and not exactly toward the pull from the stage line. Then when the hook held between the ruler strips is lifted away from adjacent hook holders and hooks the ruler material only then suddenly twist and rolls directing the bend toward the pull of the stage line. When a desired angle is reached where the ruler strips are close to parallel with the pulling stage line, the hook abruptly discharges from the holder made from ruler material or likeness. The hook then does not immediately follow the stage line directly as the spring in the ruler material flips the fish hook out away from the reel flanges as the ruler material fish hook holder rapidly returns to original shape and position while the fish hook then follows the stage line and main line to go fishing provided the hook were already baited while on the reel.

Ruler material is basically one embodiment though dozens of ways exist including illustrations listed herein.

Figure 13:
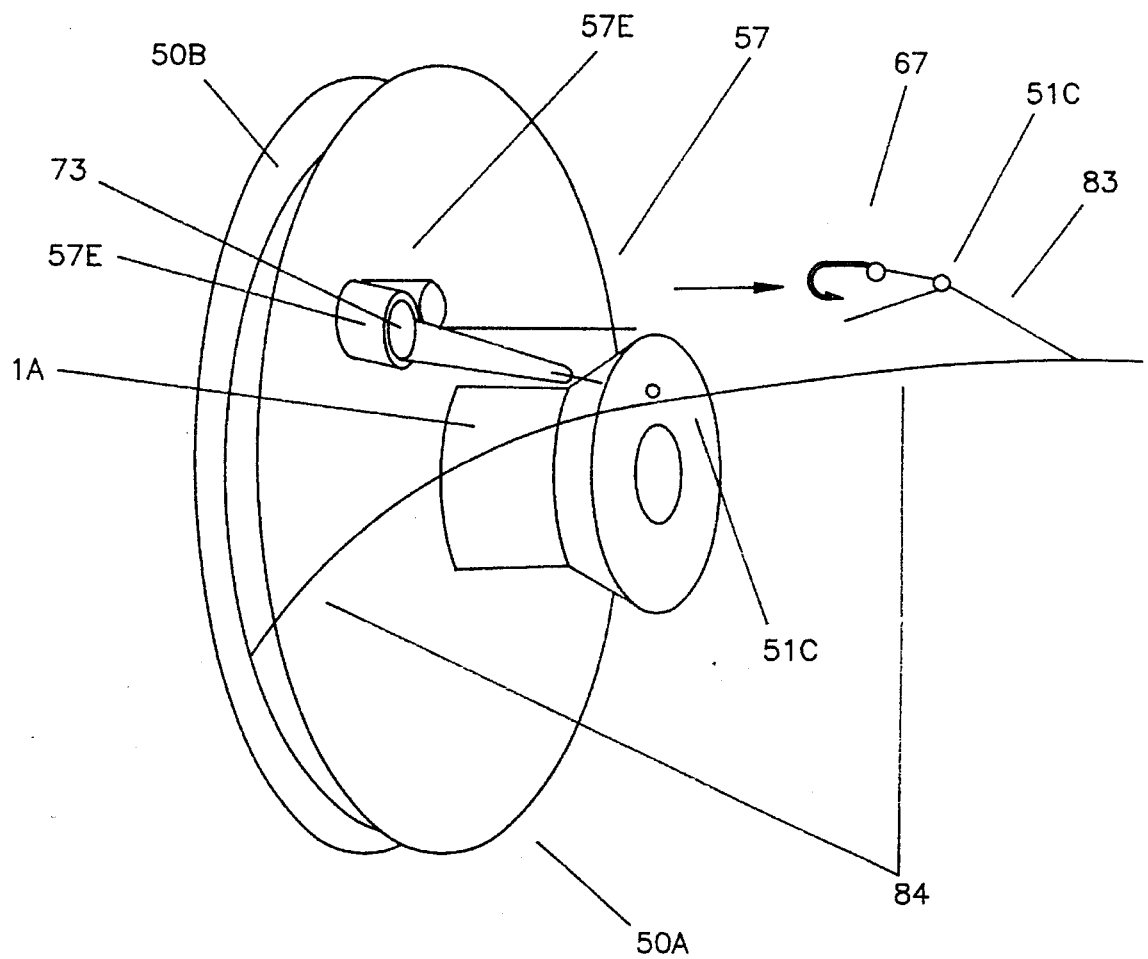
FIG. 13 shows flexing of the strip and a trigger pin in a trigger shield.

FIG. 13 and FIG. 15 show this embodiment will work with trigger shield 51A and trigger pin 51C if selected.

Figure 14:
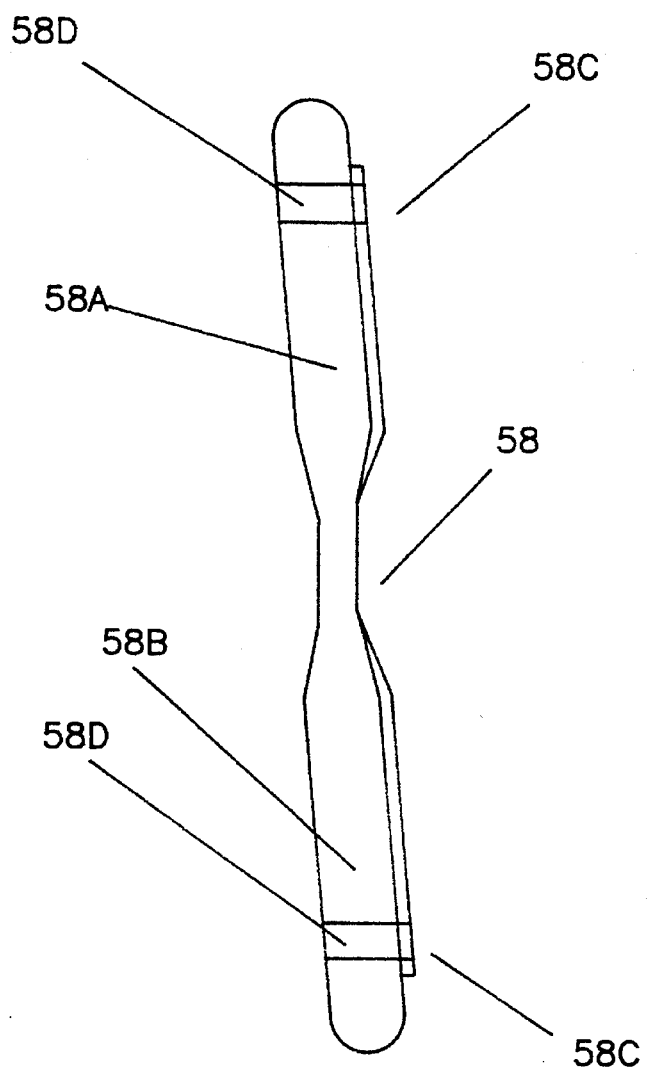
FIG. 14 shows a flexible strip of a length to extend through both sides of the reel.

FIG. 14 and FIG. 15 illustrates one piece extending completely through both reel flanges 50A, 50B with a second ruler strip also through flanges below the other strip. FIG. 10 also illustrates the same and 50D shows a sharp curvature slot through the reel flange face for the ruler material to slide through to service both sides of the reel to hold hooks. A sharp curvature of 50D slot folds the ruler material sharper causing it to hinge action further away from flange in FIG. 15.

FIG. 16, FIGS. 16A–16F, FIG. 17, FIG. 18, FIG. 19, FIG. 19A and FIG. 20 illustrates several different lengths and methods of two strips of ruler material taped together whereby fish hooks are inserted between the two ruler strips.

Ruler strips are mounted several ways on the reel flanges by means of bolts as well as by using rod 73 and elastic lacing 72 with flexible sleeve 57E securing the rod and elastic lacing in FIGS. 16A–F the same way as in FIG. 10.

Figure 16:
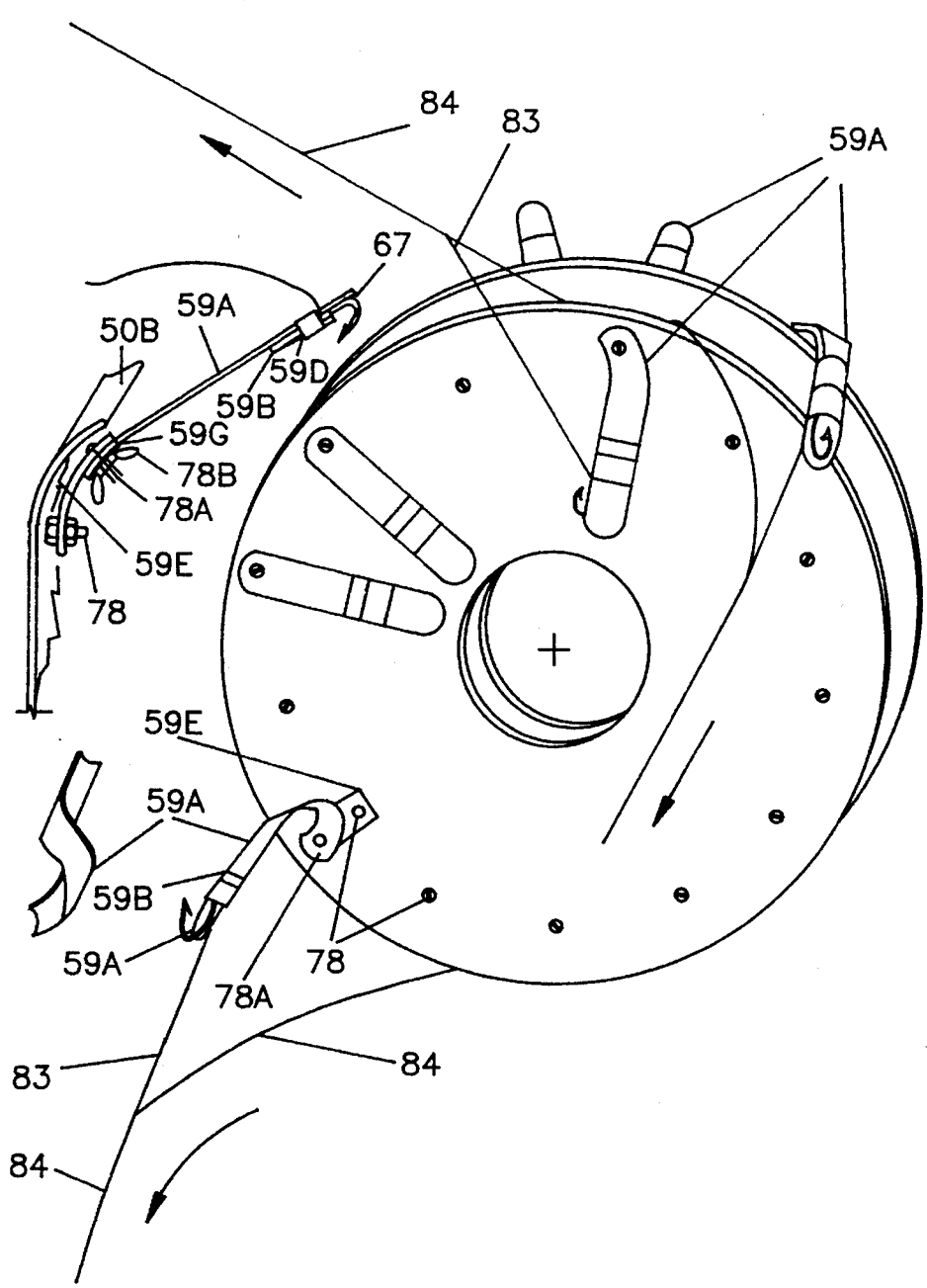
FIGS. 16, 16A–F, 17, 18, 19, 19A, and 20 show arrangements utilizing the flexible strip.
Figure 16A:
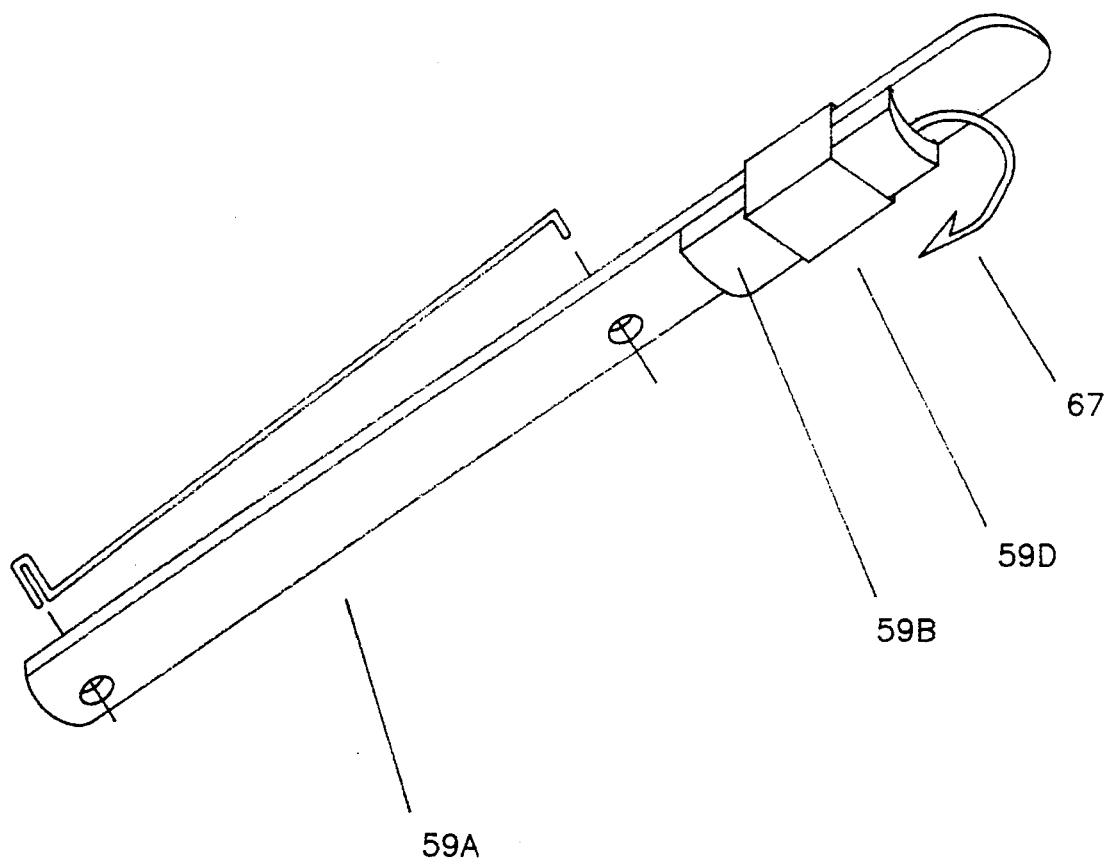
Figure 16B:
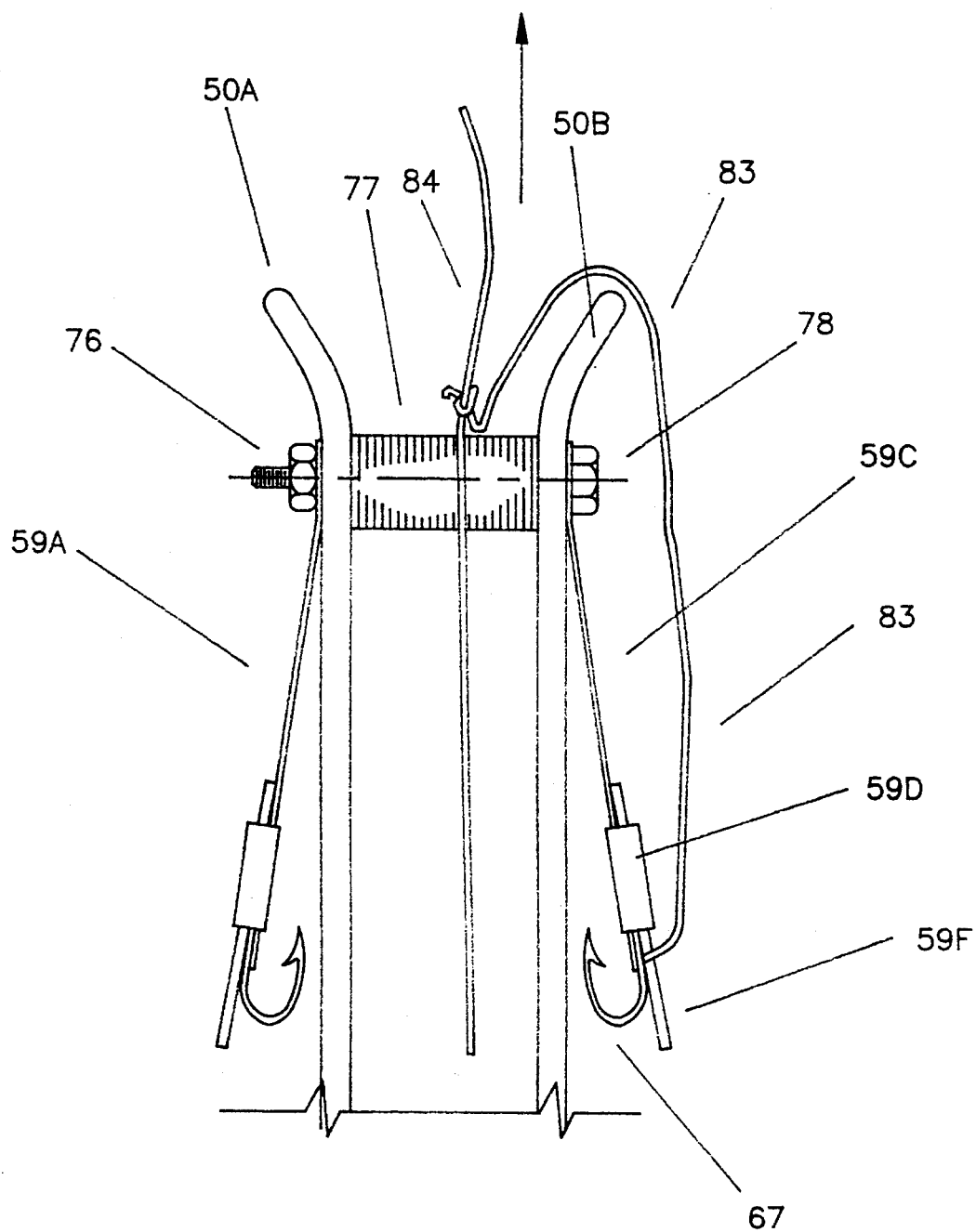
Figure 16C:
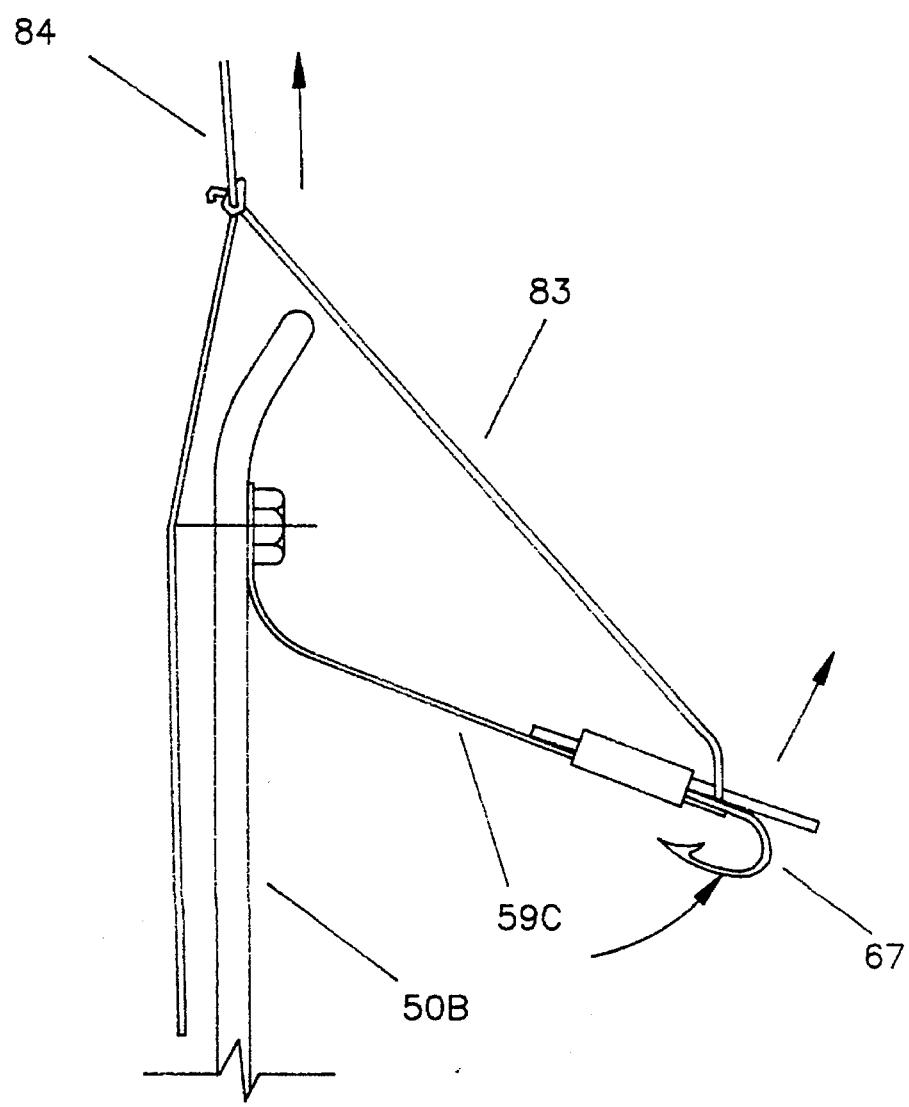
Figure 16D:
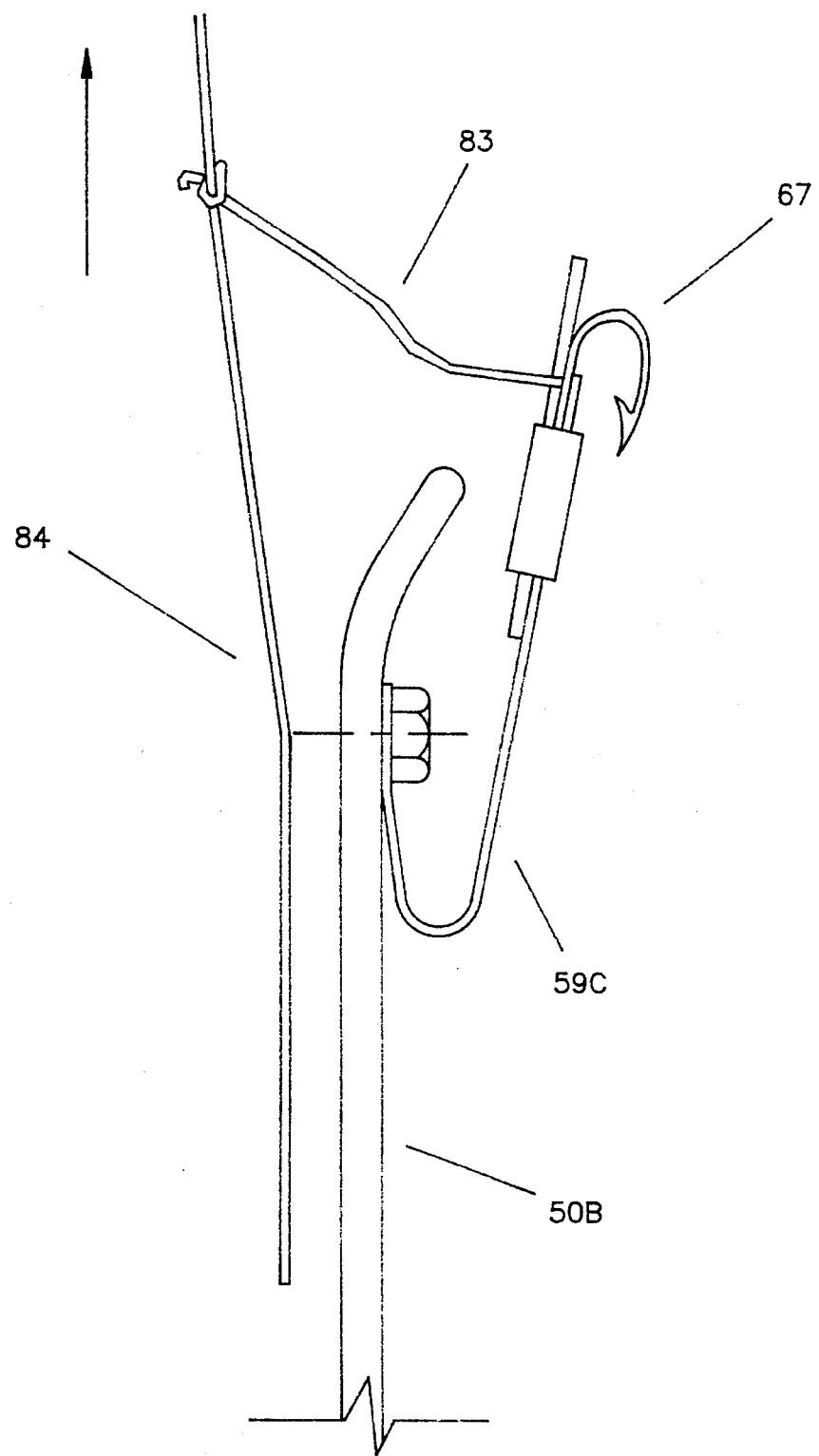
Figure 16E:
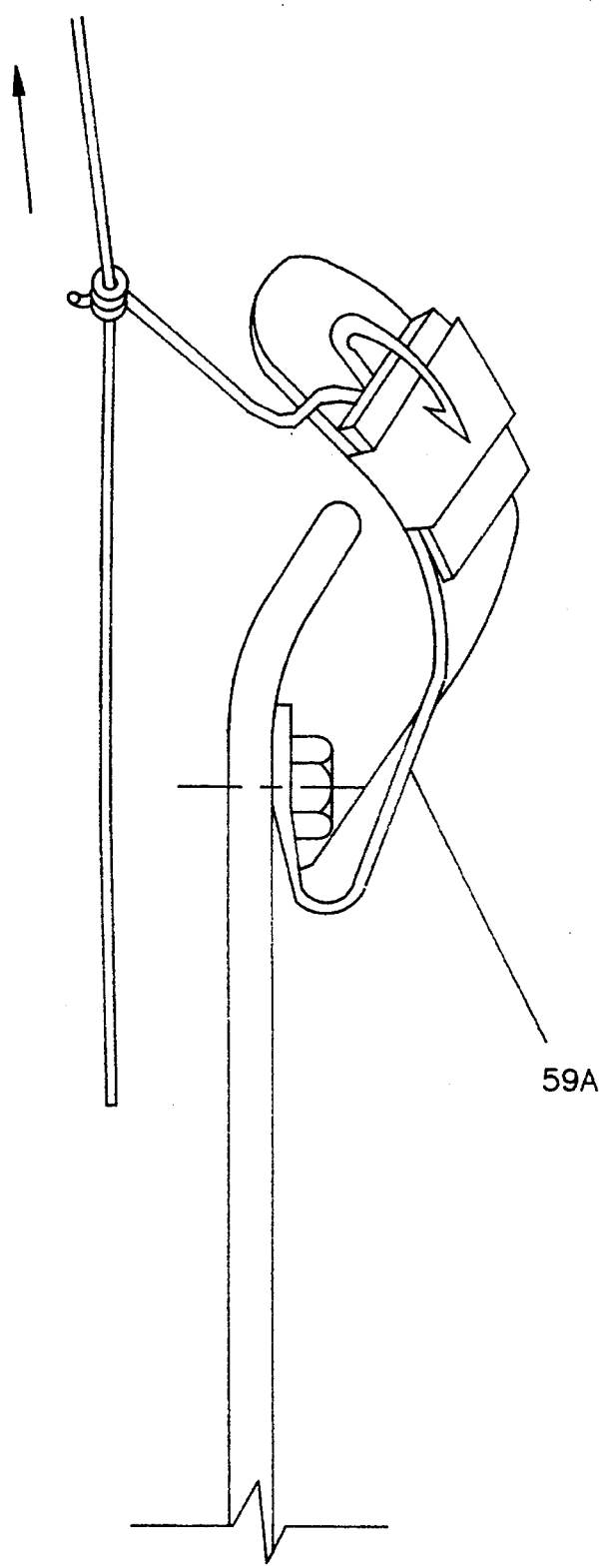
Figure 16F:
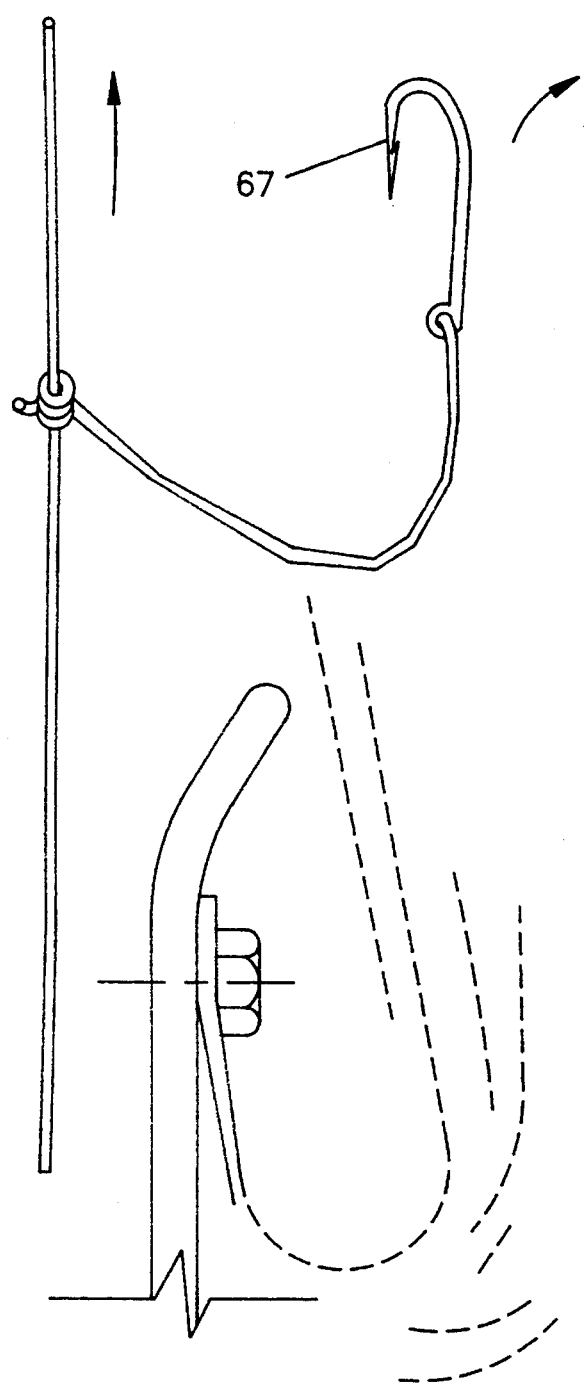

FIG. 16A illustrates ruler banding strip material 59A and 59B held together by electrical tape 59D, along with a stiff steel wire 59L that has a short ninety degree bent barb. Ruler strip 59A has a hole to accept wire 59L toward outer end of 59A. FIG. 16AA illustrates, by dotted line, that wire 59L fits in the concave side of the ruler strip 59A, but does not extend as far as shorter strip of ruler material designated 59B. The wire 59L and strip 59A fit firm inside of flex sleeve 57E and outside of rod 73 with one end barb of wire 59L sticking into rod 73 for security. The general purpose for stiff leg wire 59L is to have the strip 59A to remain stiff the length of wire 59L and strip 59A to bend ninety degree near the end of this hook holder embodiment so that the holder as illustrated in FIGS. 16A–F using rod 73 and elastic lacing 72 will cast fish hook from the rear flange 50B clear over and beyond both reel flanges 50A and 50B. FIGS. 16A–F has dotted line also showing that rod 73 will return to original position rapidly as the hook is discharged from this fish hook holder embodiment.

FIGS. 16A–F illustrates ruler material hook holders in a series of actions when bolted to the reel flanges. The series action illustrates the ruler material has inherent tendency to bend as a hinge action at a given location near the base seated and only bends toward the outer end containing fish hook near end of casting cycle. The hook holder tosses the hook then very rapidly returns to lay flat against reel flange making a compact reel with directional control hook storage and inherent directional discharge of one or multiple stage lines with fish hooks and/or other materials including line weights and floats.

Figure 17:
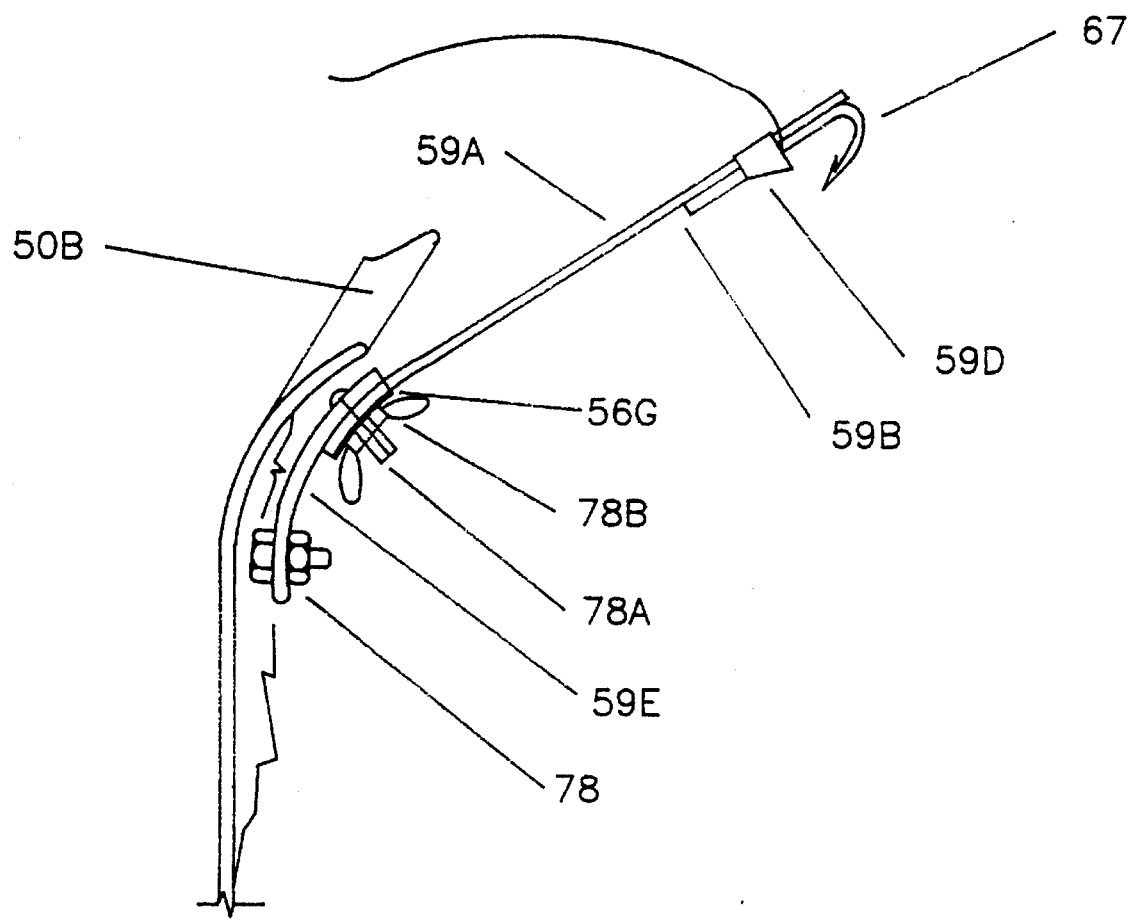
Figure 18:
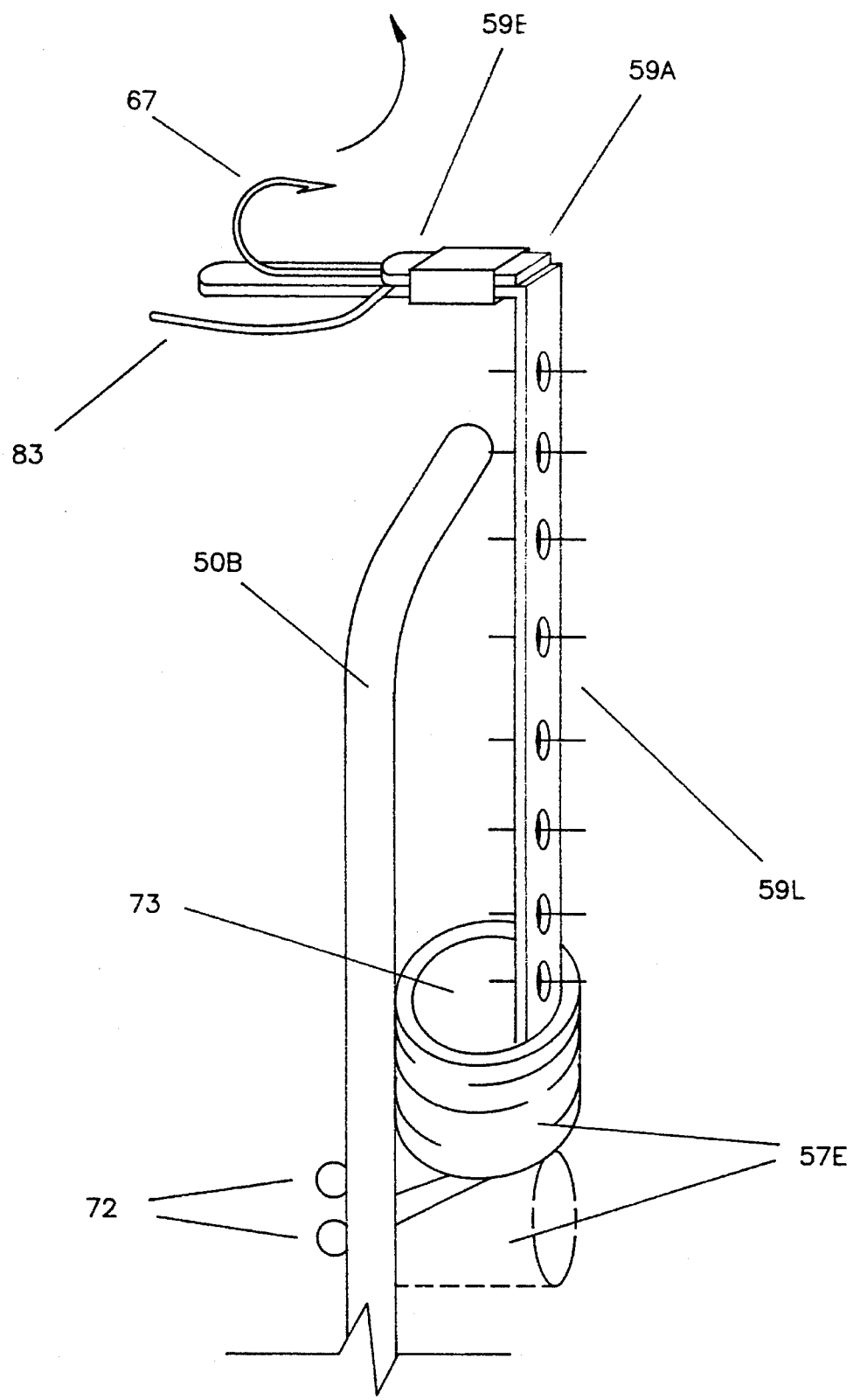

FIG. 17 and FIG. 18 illustrate methods for mounting ruler material to reel flanges. FIG. 17 illustrate a method to mount hook holders on the 50B rear reel flange to easily cast from rear over the total reel clearly. Also very note worthy that ruler holder mount bracket 59E works very favorable when bent to hold hook holder at an angle of ninety degree to the reel flanges casting all directions. FIG. 18 shows a ruler material hook holder on 50A reel flange and this illustrated method with the hook inward of reel flanges cast both parallel and perpendicular to reel flanges. Rotating the reel allows the parallel discharge. Perpendicular casting of main line the reel need not rotate.

Figure 19:
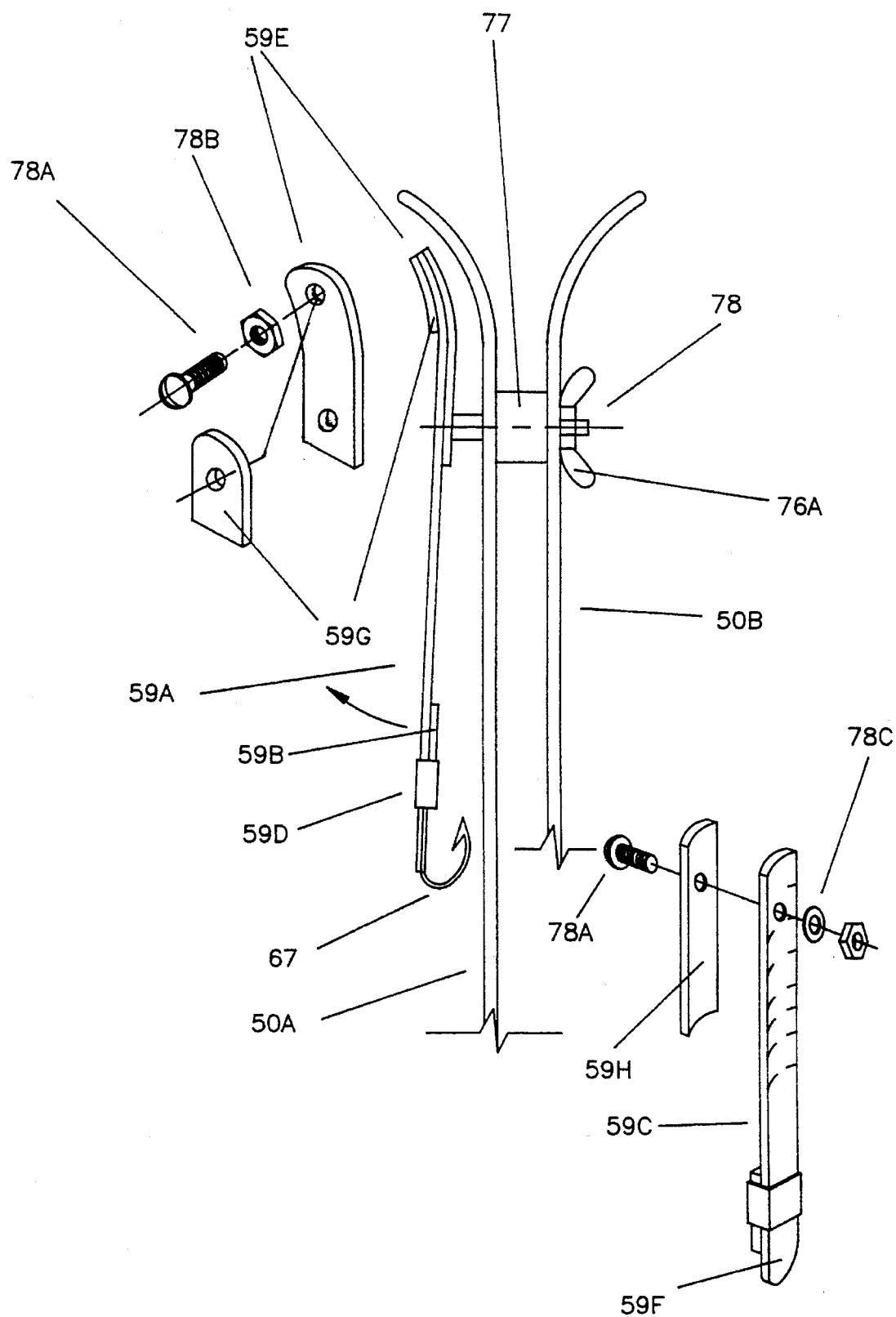
Figure 19A:
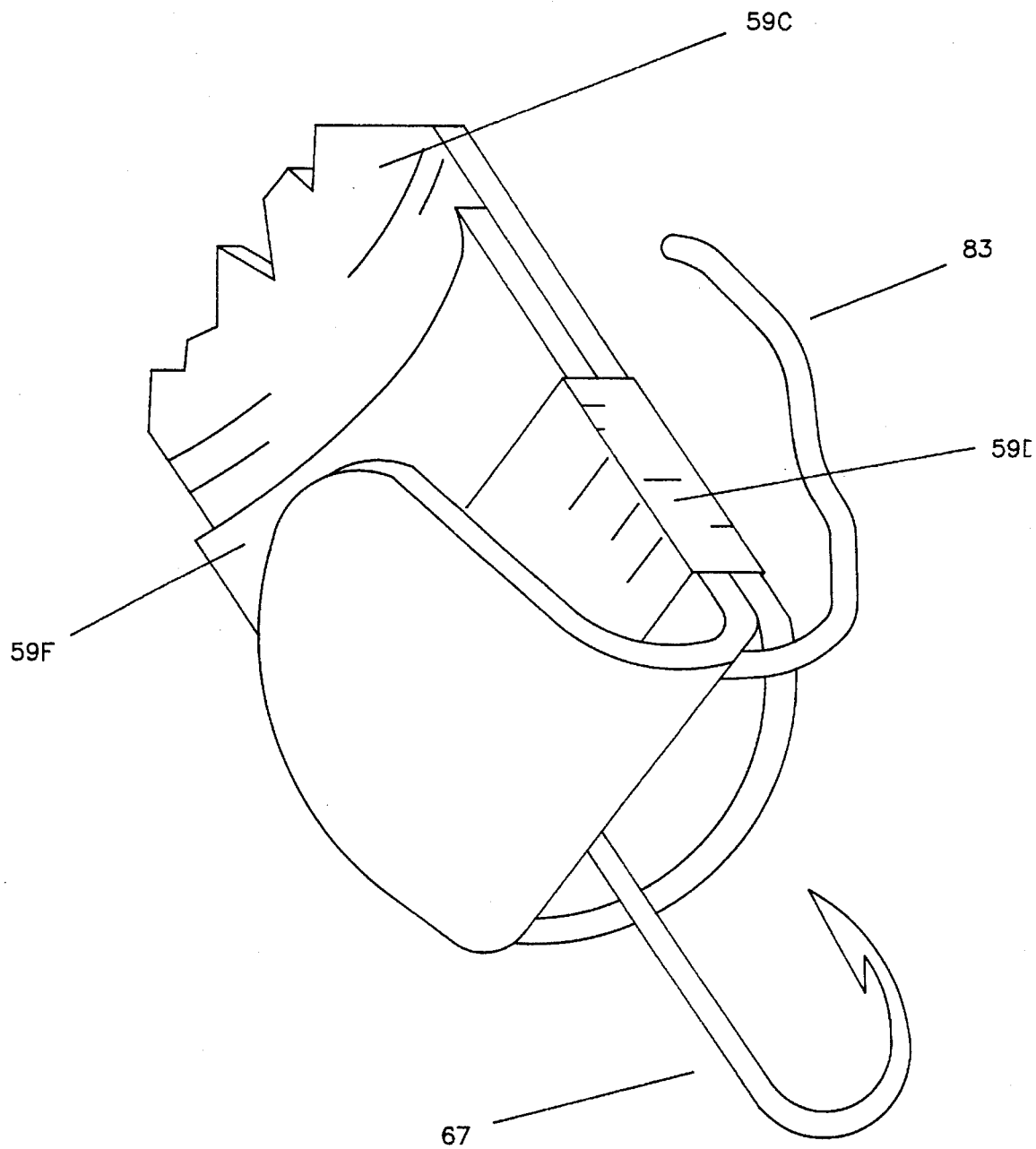

FIG. 19 shows an extension structured concave designated as 59H to extend the hook holder at a degree of angle. This 59H extension also allows, with the aid of a bolt, nut and a rubber washer to fold toward the center of the reel for storage or for forward, as parallel casting of fish hooks.

Folded upward and out from the reel flanges makes ready to cast from the rear reel flange over both reel flanges forward. The rubber washer and the concave extension 59H allows the manual movement and seating of the two position just stated.

Figure 20:
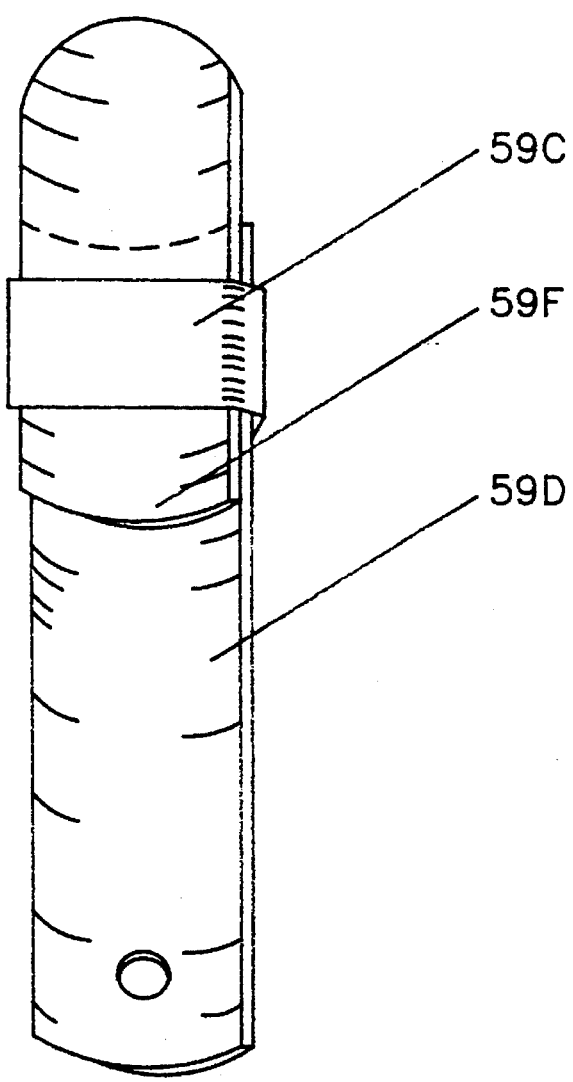

FIG. 20 shows two strips of ruler material taped together; one shorter strip on top. Folding the top one back as in FIG. 19A creates a natural opening to insert fish hook and when releasing the ruler material the material snaps back into straight formation securing the hook.

FIG. 16 shows one of dozens of ways of mounting ruler material to reel flanges 50A and 50B. Also shown is the flexibility of ruler material when discharging hooks following the cast of a main line with stage lines.

FIG. 21 illustrates all directional control discharge of material articles including fish hooks from holders on a reel supporting main line with stage lines as fore mentioned.

Very noteworthy is holder style 153A identical to 153B. This style cast all directions from either side of the reel. Rod 73 and surgical tube rubber lacing 72, seated on reel flanges 50AA and 50BB, have flexible transparent plastic tubes press fit over them securely. A strip of ruler type material 153F is firmly tight fit inside of plastic cylinder tube 153A and 153B fitting against the outside curvature of rod 73. The ruler strip is longer than the compartment holder 153A and 153B. Consequently, as illustrated in FIG. 21, the ruler material 153F folded back inside of transparent compartment hook holder crates a door closed as the spring action of the ruler material causes the folded back ruler material to press fit and remain folded back inside of compartment 153A and 153B. The plastic tubes have been heated and formed before cooling to form build a curved lip at the outer end of hook holders 153A and 153B. While the hooks are kept secure from falling out of the holder compartments the hooks easily discharge from the holders by a slight pull of the stage line 83. Rapidly the ruler door 153F opens straight out when the stage line is pulled by the main line as noted by dotted line outlining the action in FIG. 21. This favorable action of 153F creates a rapid clean opening for the discharge for baited fish hooks and important as no shields are required to keep the hooks in the compartments. Consequently 153F is referred to as the name implied ruler door.

FIG. 21 illustrates a guide 94 detached from a fishing pole 93. The pole is detachable from reel mount 95 which has two reel flanges 50AA and 50BB withholding main line 84 which as illustrated will cast out the articles including fish hooks in a rotary parallel direction or as a perpendicular spin style casting either as selected by the operator. Arrows indicating all directional discharge as illustrated. Note FIG. 39 guide 94.

A guide 88 is a coil spring steel in line for reeling in the main line and slides out of the way for casting as indicated by dotted lines. Perpendicular reeling in requires this guide. Parallel reeling in may be done with or without guide 88. When the stage line 83 connection to main line 84 travels through the inside of coil, the hook 67 is swung around coil guide 88 as arrows indicate so the hook may be place in holders.

For casting out an anchor attached to the outer end of main line a cable trigger 84B may be selected to comfort the operator. The cable trigger slides adjustable on the main line in likeness to a common animal snare wire lock. The trigger slides freely outward but locks on the main line cable portion when pulled by operators finger holding main line.

Figure 22:
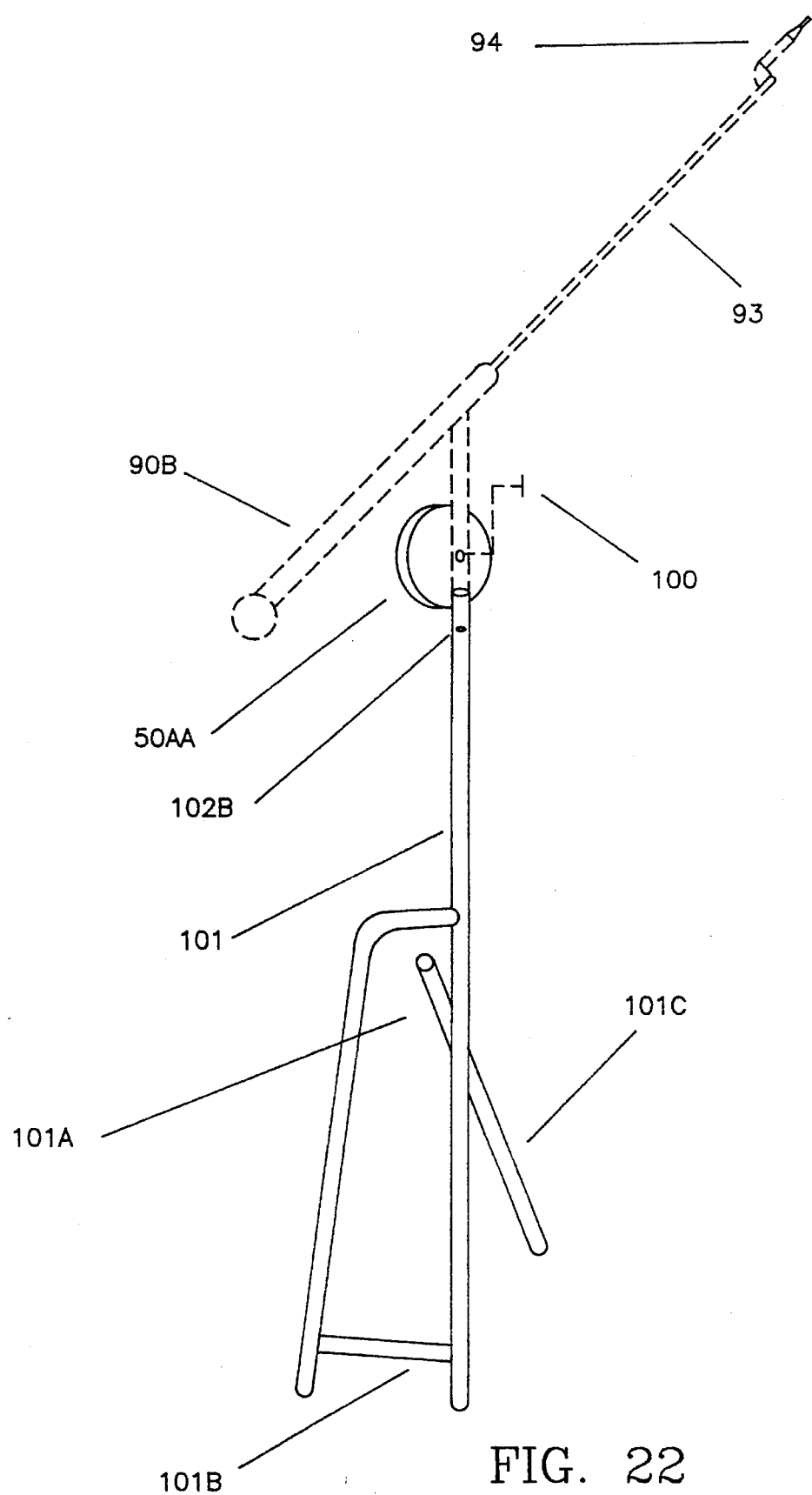
Figure 23:
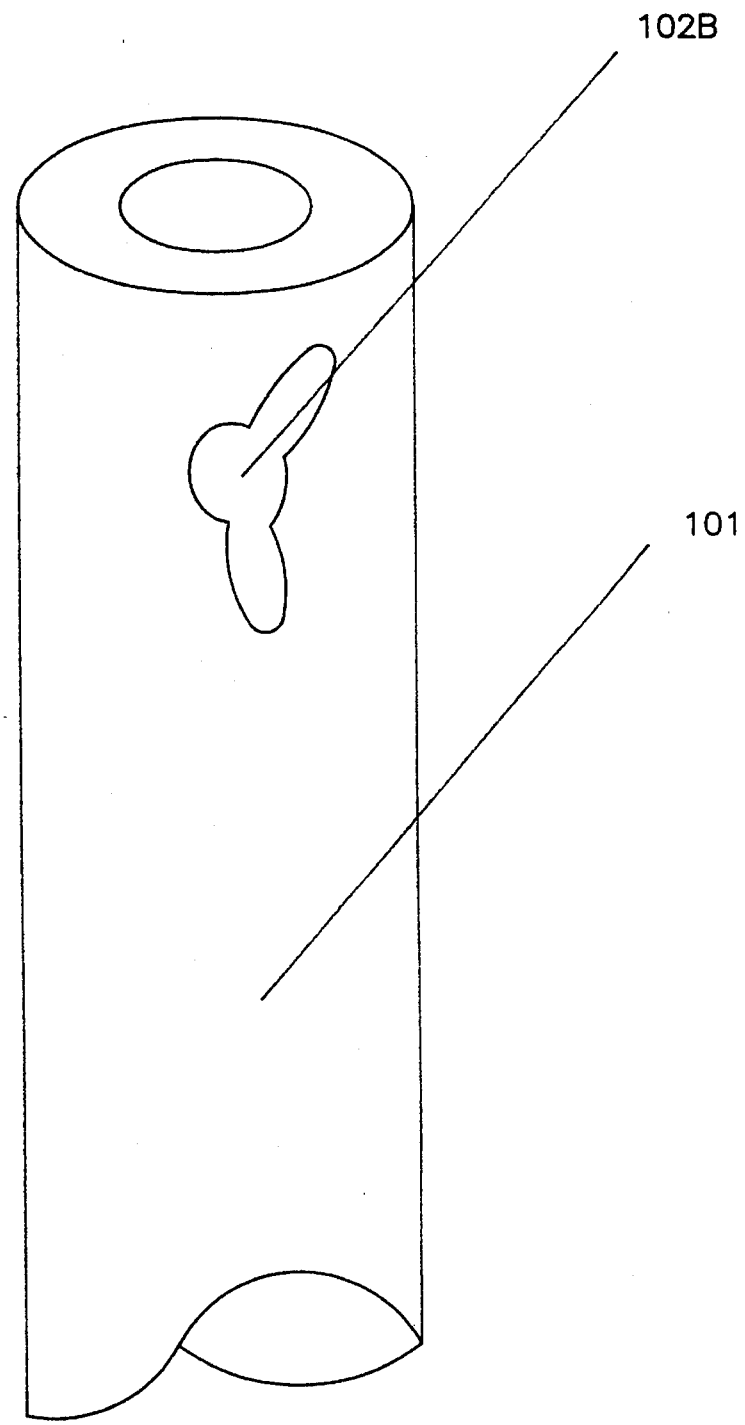

The reel mount 95 may be seated in a reel support stand 101 illustrated in FIG. 22 and FIG. 23.

The operator may elect to seat the reel on the reel support stand and remove the fishing pole from the reel mount so the operator with the pole is free from the reel, holding the pole by the fore and aft handle 90A and 90B. The pole having pole guide 94, illustrated in FIG. 21 and FIG. 39, FIG. 40, FIG. 41 allows the operator to grasp the pole with both hands and cast a weight 92 as far as operators energy permits. The operator may then seat the pole back on the reel mount and reel support stand.

Figure 44:
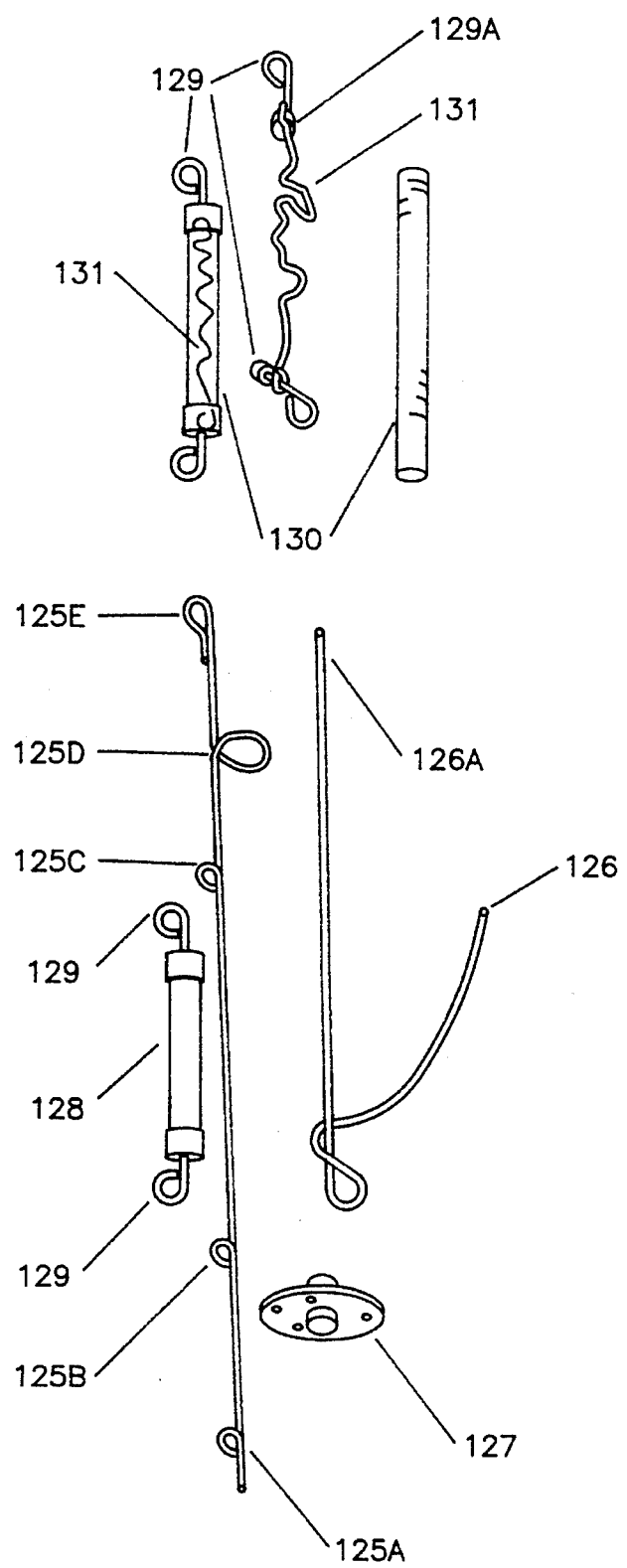
Figure 45:
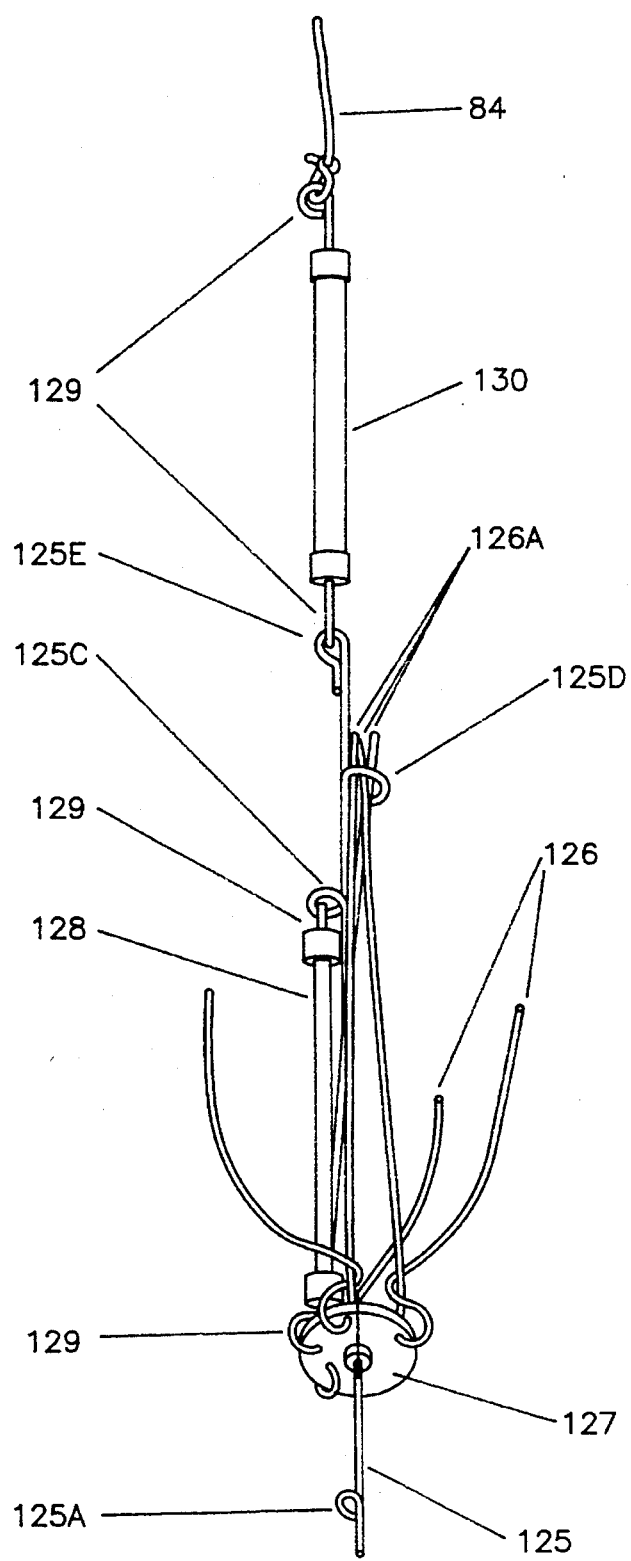
Figure 46:
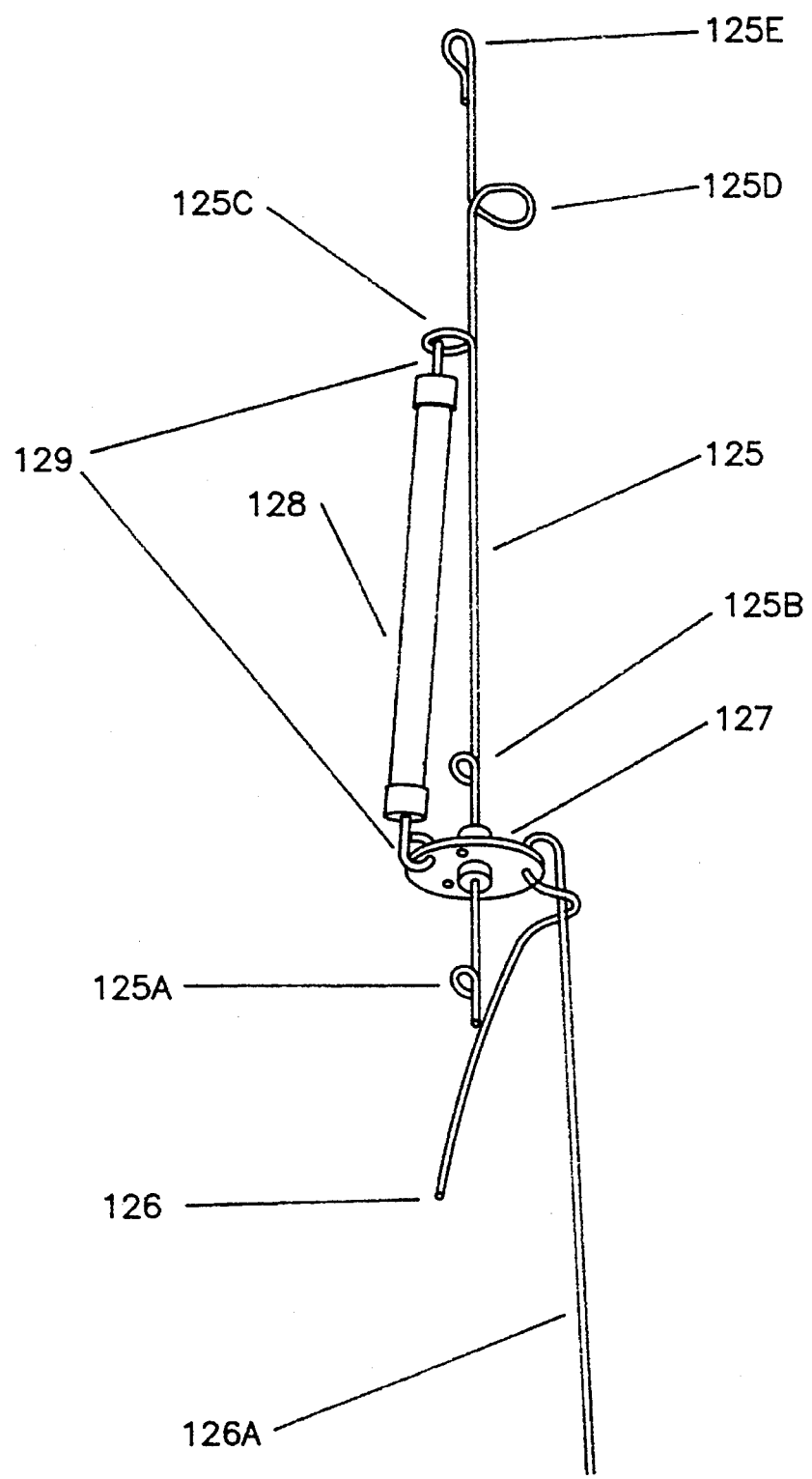

The operator may select to use anchor illustrated in FIG. 44, FIG. 45, FIG. 46 to cast out with the mainline rather than a simple weight as weight 92. The very important advantage of a single main line pressure release anchor illustrated in FIG. 45 is to allow the strength of the operators pull to release the grip of the anchor flukes 126. The operator pulling on the main line, in excess of fishes capability, causes the trigger tension tube 128 to stretch, thus the anchor shank fluke slide sleeve 127 slides along on the anchor shank 125 and in doing so pulls the fluke shank 126A out of anchor shank trigger eye 125D. When the fluke shank releases it allows the fluke to reverse point direction thus allowing the operator to reel in the main line and anchor as the flukes will no longer grab until the operator resets the fluke shank in the anchor shank trigger eye.

FIG. 21 illustrate a fish lure 67C inside of a transparent holder 53A for clarity, although suitable, a holder 153A having a ruler door 153F for securing the fish lure inside of transparent holder 153A is an advantage when casting and moving the reel about.

A weight may be cast from the guide 94 on end of pole 93 and one or more lures 67C will travel from the reel at a distance from the weight depending on the number of wraps of main line 84 between the weight and lure. By utilizing stage line slide stop 86A shown in FIG. 42A the stage line 83 may be wrapped several times around the reel and slide stop 86A slide adjusted to place lure 67C in holder 153A. A fish taking the lure pulls and slides the slide stop 86A giving the fish more stage line to maneuver. This method may be used for trolling. Also the advantage of casting a light weight lure a greater distance by casting a heavy weight utilizing guide 94. FIG. 21 illustrates the prior described holders which all discharge hooks and/or articles from both sides of the reel parallel or perpendicular in all directions as indicated by dotted lines and arrows.

Figure 24:
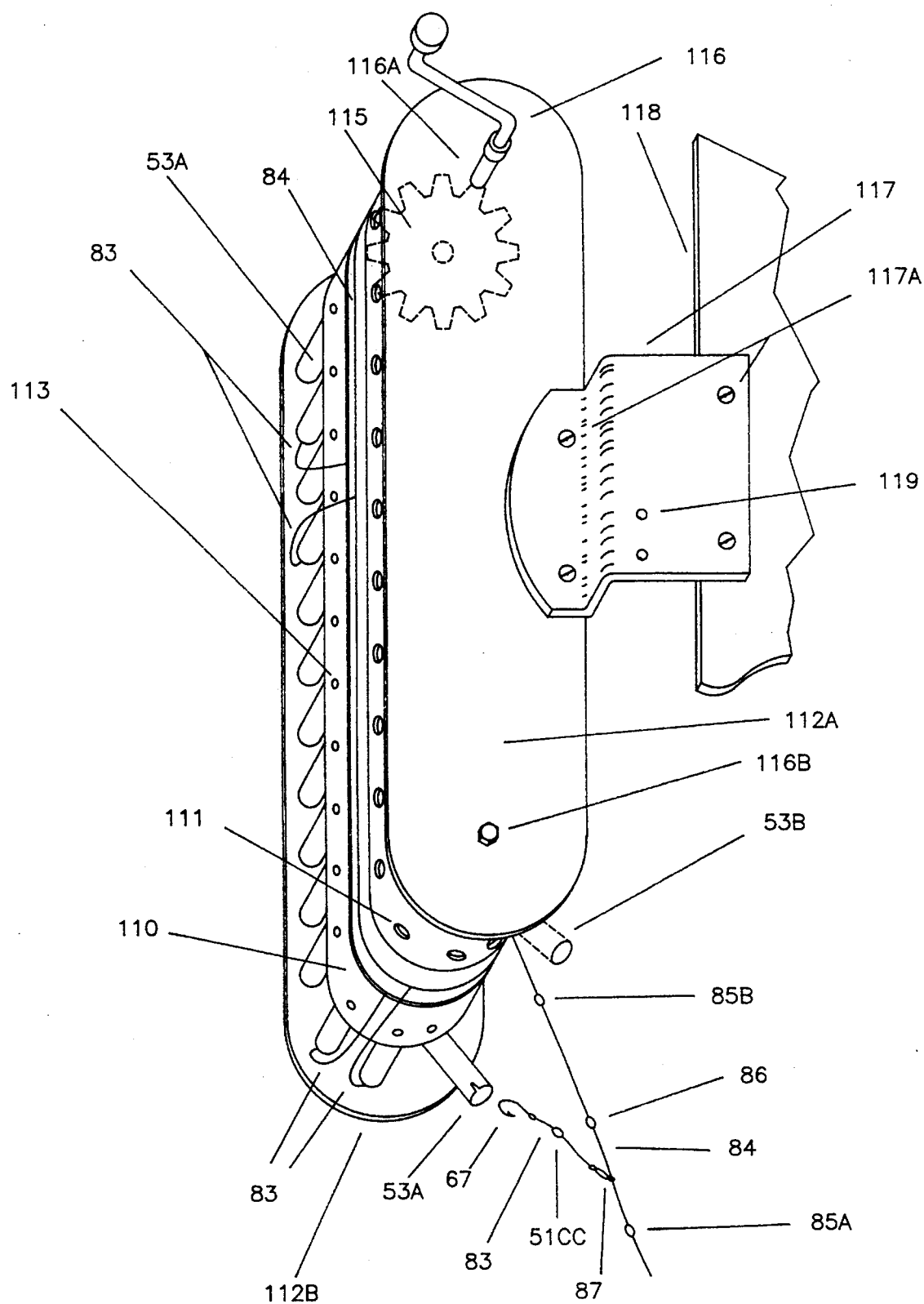
FIG. 24 shows hook holders attached to a belt drive system.

FIG. 24 is a simple illustration of a frame with sprocket driving a belt having fish hook holders mounted on both edges of rotating belt. All holders prior illustrated easily mount to belt. The belt reel as illustrated mounts to a boat gunwale. Action indicated by arrows. Parts are numbered and listed in parts list. A belt drive system allows a lower profile on a ship than a large round reel and operates rotation much likewise. Main line traveling parallel to reel should travel through the guide 121 of this invention for directional selective multiple line reel fishing system device.

Figure 27:
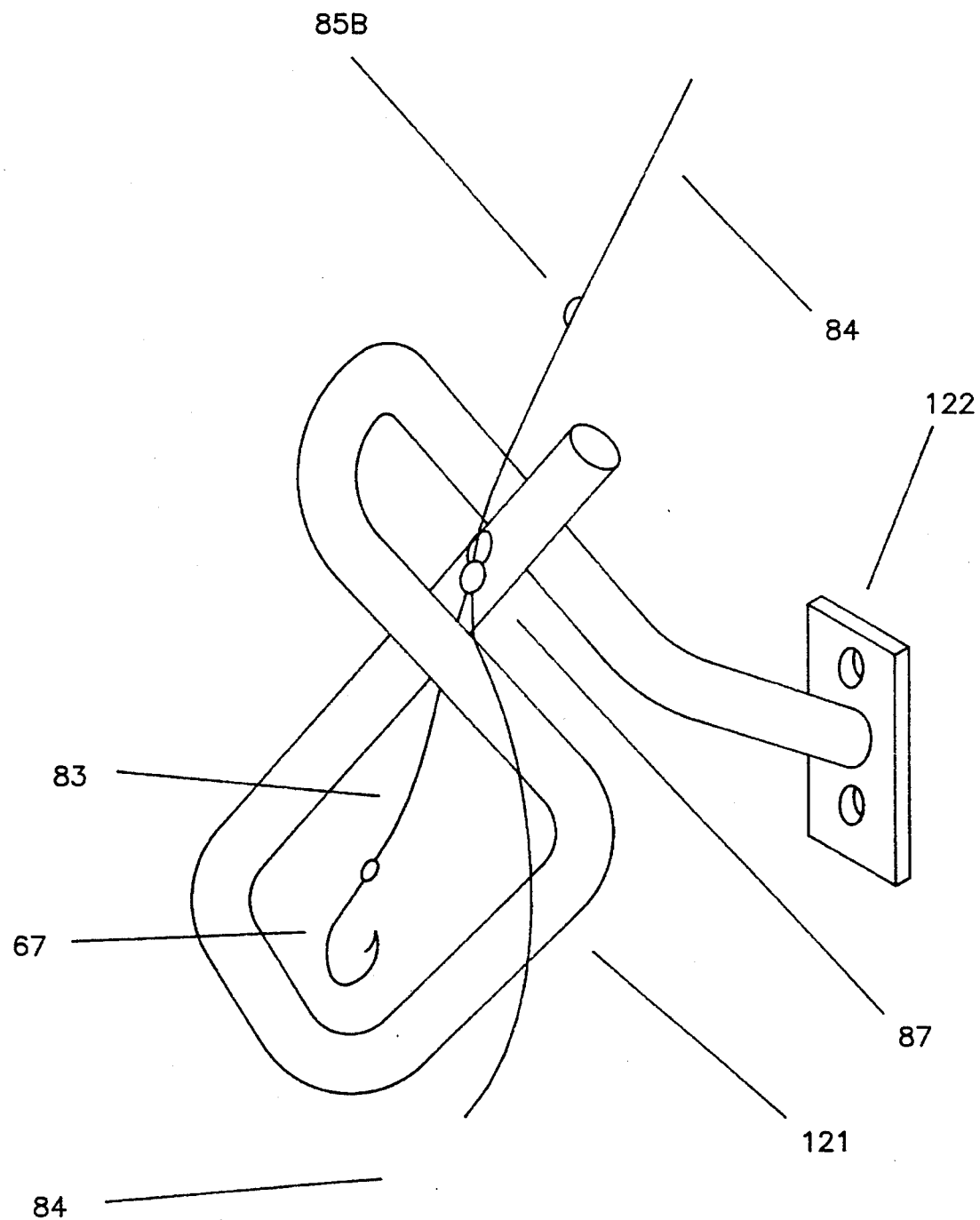

FIG. 27 illustrates guide 121 having separated cross arms that support the main line. The separation of the cross arms allow the stage line and hook to walk around the cross arms preventing the hook from snag on the main line. A horizontal roller or a ring guiding the main line cause the hook to tangle with the main line thus the guide 121 of this invention is submitted.

Figure 25:
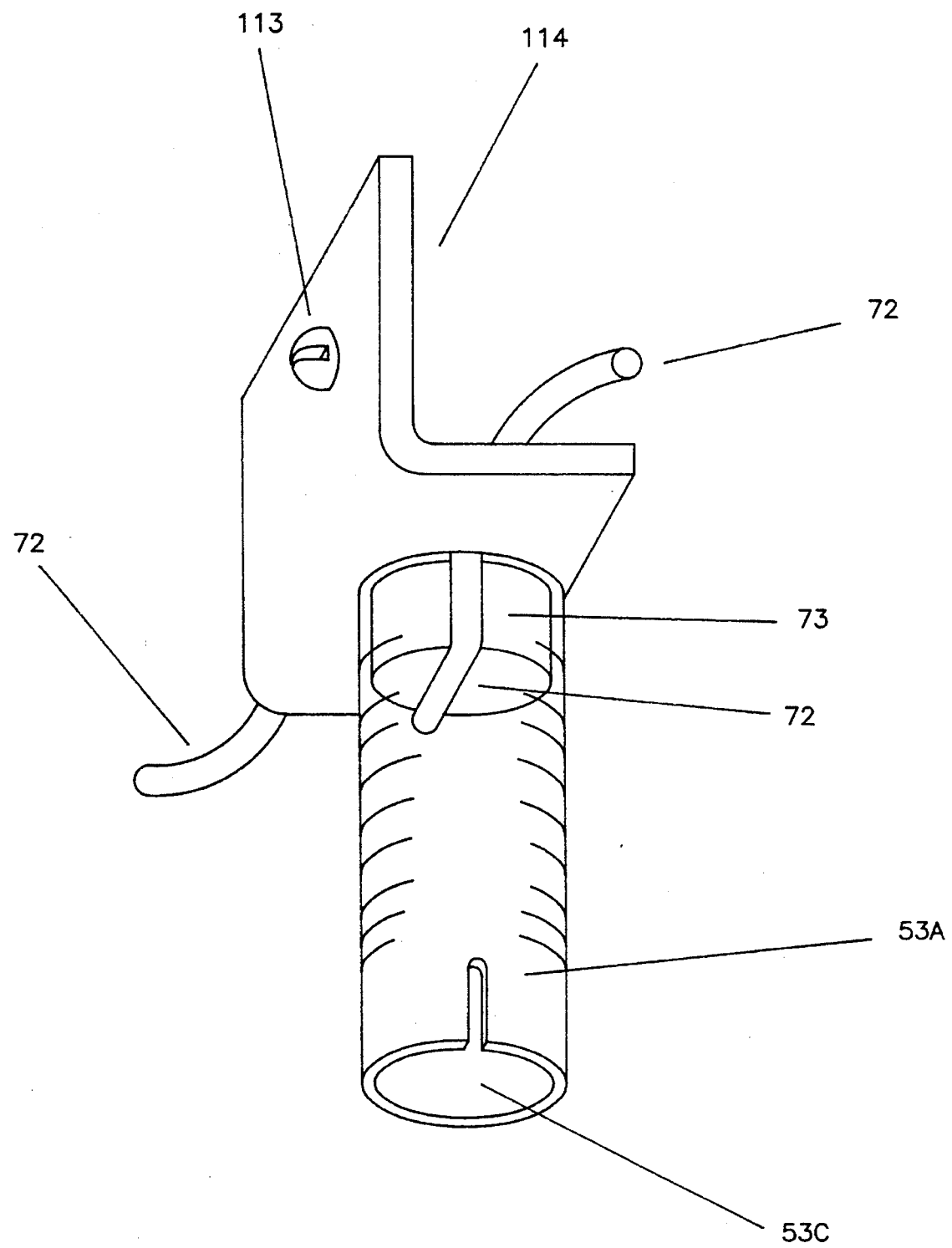
FIG. 25 shows a hook holder attached to a bracket for attaching to the belt of FIG. 24, FIGS. 26 and 27 show a stage line control guide and a bracket for attaching the line guide.

FIG. 25 shows one simple way to attach holder 53A to belt 110 of FIG. 24. All holders of this invention will readily mount to a belt reel. FIG. 24 shows hook holder shield 112A and 112B which help contain the hooks in holders 53A and 53B and is the frame supporting axles and drive sprocket 15 thrusting through belt sprocket holes 111. A hand crank 116 is shown as a power source. A large ship on the high seas handling miles of multiple line utilizing this belt invention dimensioned length and width as well as doubling back in numerous laps to carry a much greater number of hook holders would likely use hydraulic power source. The main line 84 shown in FIG. 24 comes in and departs on bottom but can just as easily be wrapped to enter the reel and depart on top side belt.

Figure 26:
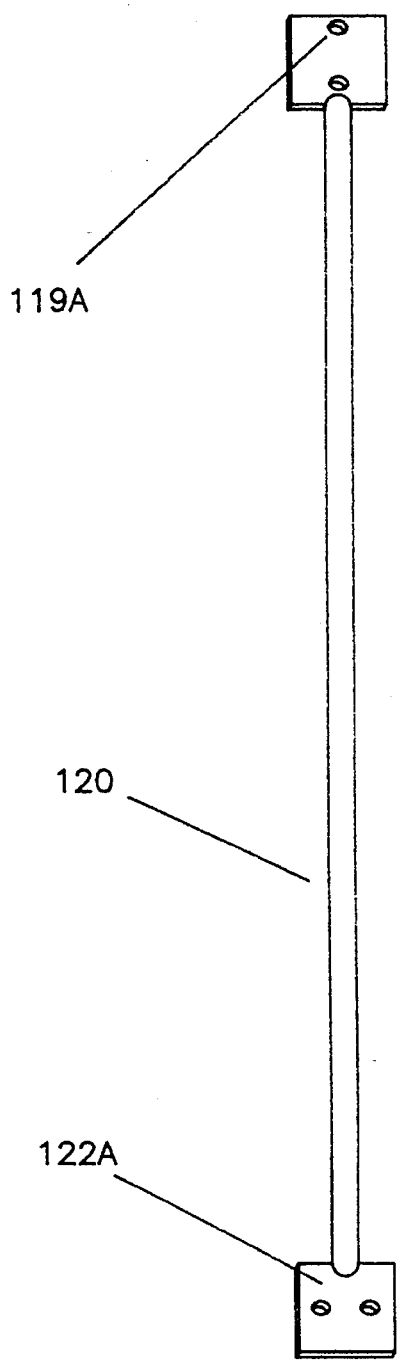

FIG. 26 simply illustrates a guide strut 120 to mount guide 121 to vessel mount bracket 117 to keep the guide in line.

Figure 28:
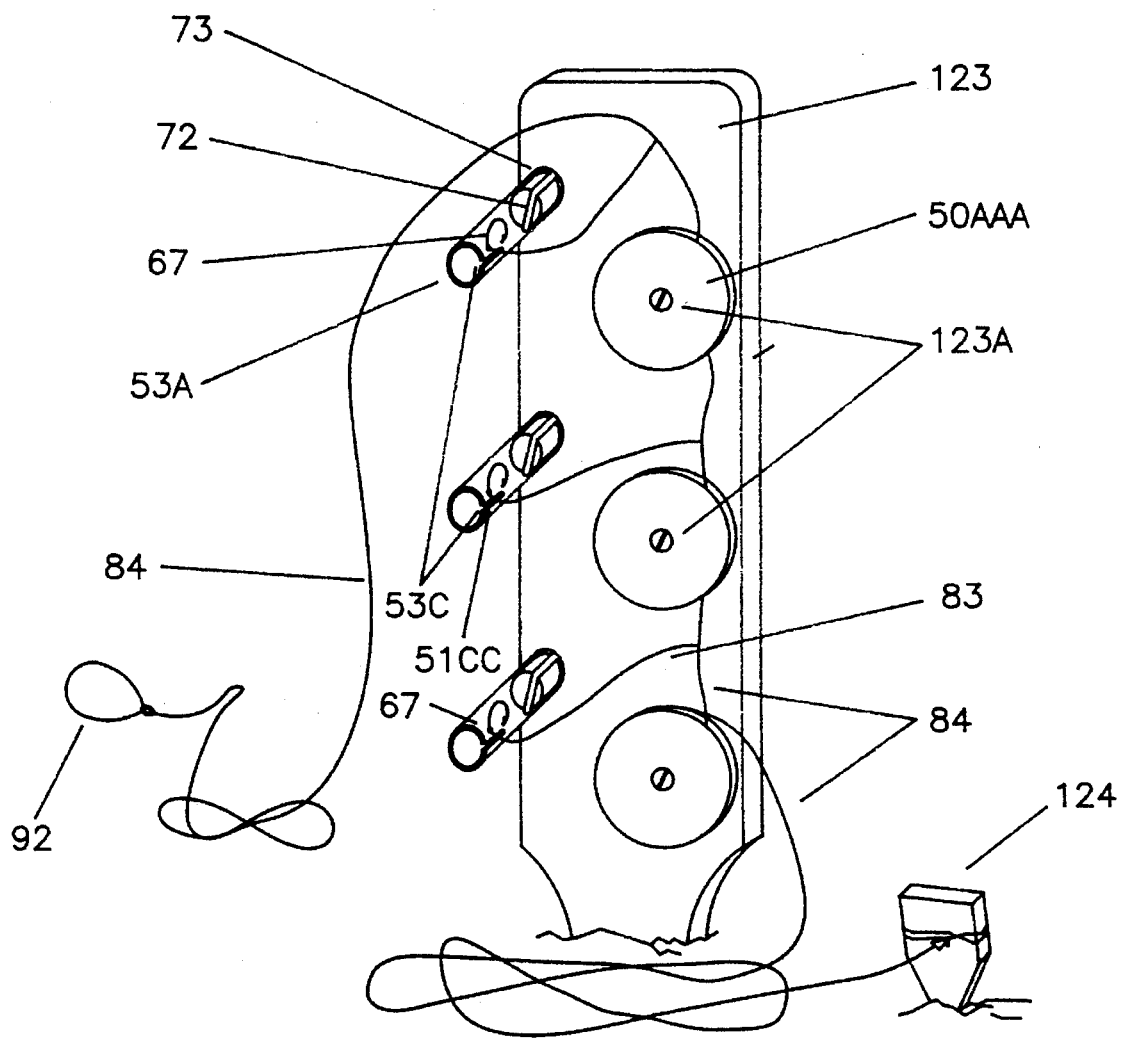
FIG. 28 shows hook holders and reels attached to a reel holder stake.
Figure 29:
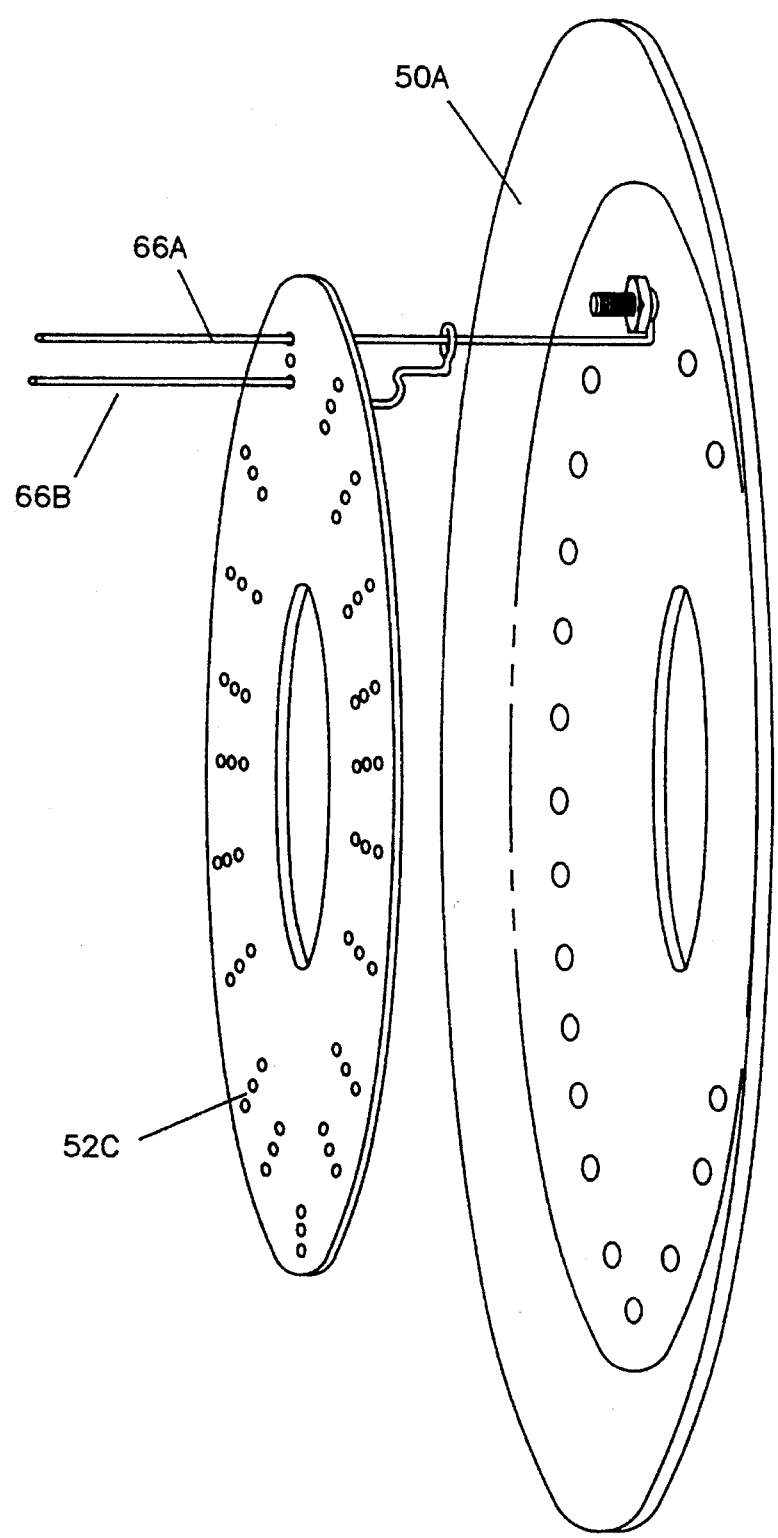
FIGS. 29–32 show a wire travel hook holder which slides under tension of a rubber band on a wire rail.
Figure 30:
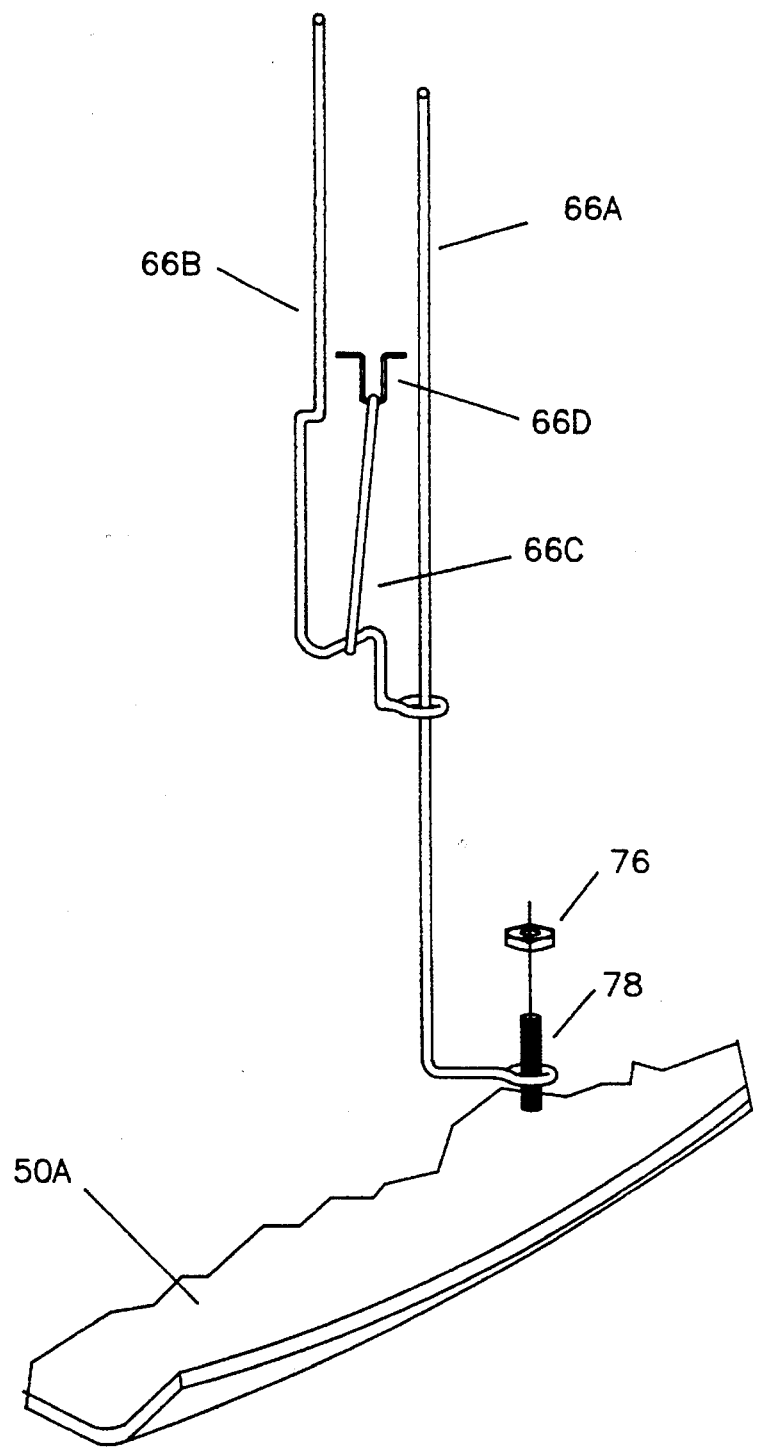
Figure 31:
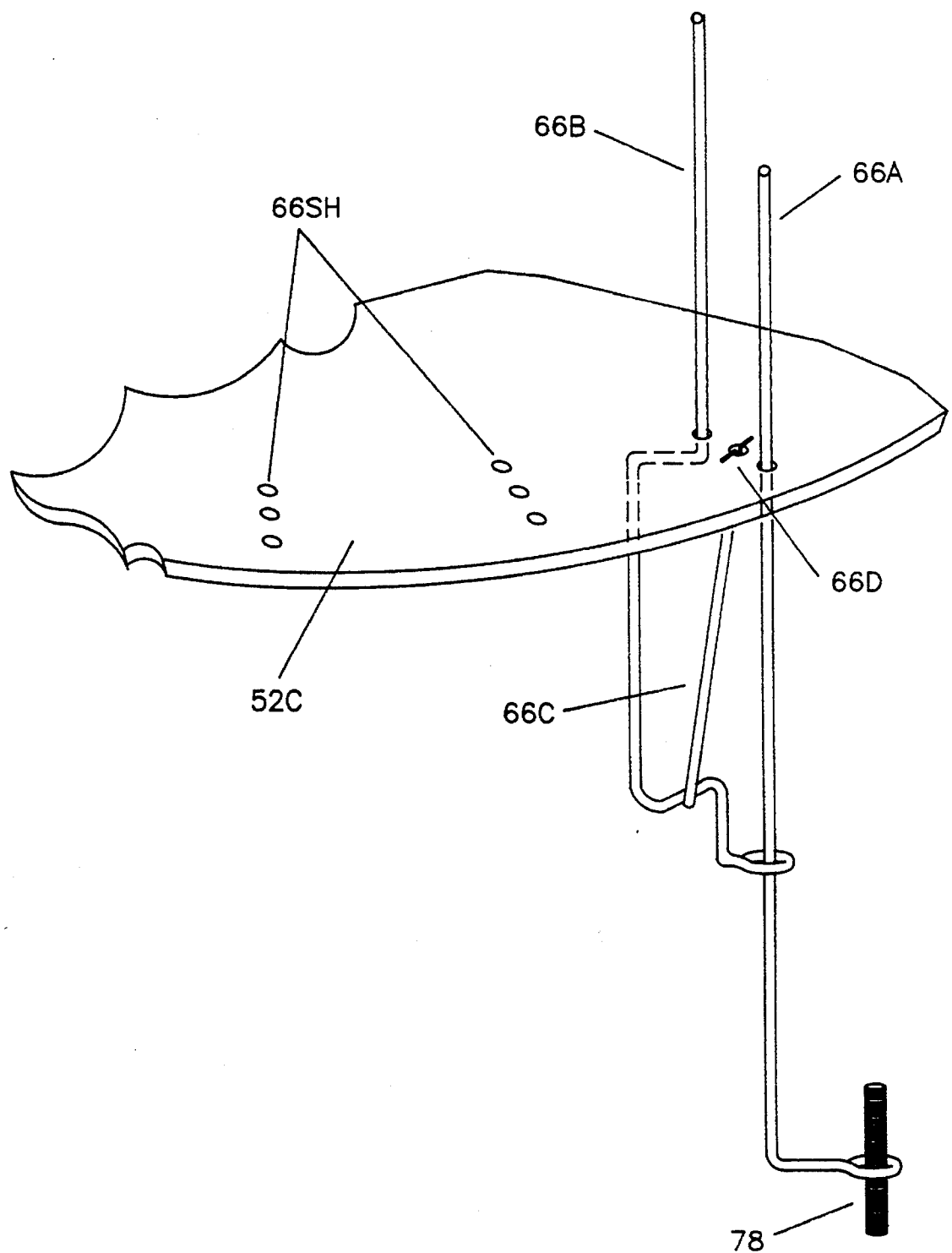
Figure 32:
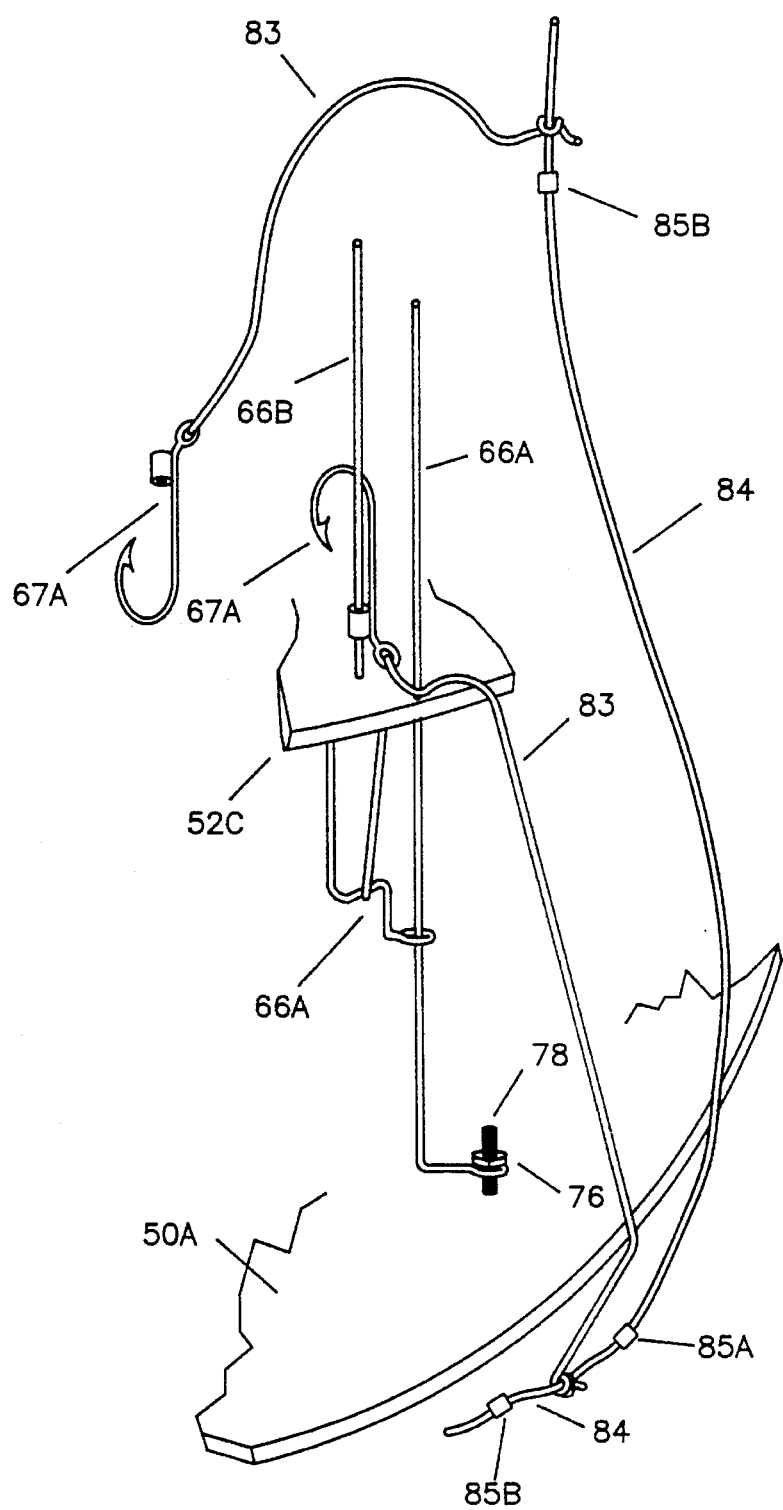

FIG. 28 illustrates a method utilizing this invention to control and cast a throw line with multiple hooks. The illustration showing three hooks can have as many hooks and holders as the weight can be managed by the weight pitchers arm and energy without the frustration and concern of getting tangled up in common throw lines. A bow and arrow, not shown, can be used to launch the main line to cast out more line further than manual toss. Reel flanges 50AAA placed firm on a stake 123 and a main line stake to lay out main line 84 nearby and secured to make a safe manageable fishing device that works well with one or all the hook holders illustrated in this invention.

FIGS. 29, 30, 31, and 32 illustrates a reel same as FIG. 1 with reel flange 50A. A slide shield 52C is used and is identical to rotary shield 52A with only the addition of two holes for each of the twelve hook holders. A wire rail 66A and a wire travel hook holder 66B are carried by the two holes in slide shield 52C. Rail 66A mounts to reel flange 50A by bolt 78. An eye hook holder 66B slides on rail 66A. A rubber band 66C connects to a clip 66D and the other end of the rubber band is stretched and connected to pull hook holder 66B wire forward against the slide shield 52C. The 66B wire referred to as travel hook holder is pulled toward reel flange 50A so the length of stage line with hook 67A, having a sleeve attached to the hook, reaches to allow the sleeve hook 67A to slide on to wire 66B. Releasing the travel hook holder lets the rubber band pull the sleeve hook holder back forward extending the wire thus the length of stage line will not allow the hook to come off from the travel hook holder until the main line and stage line are cast out from the reel perpendicular to the reel flanges preferably.

Figure 33:
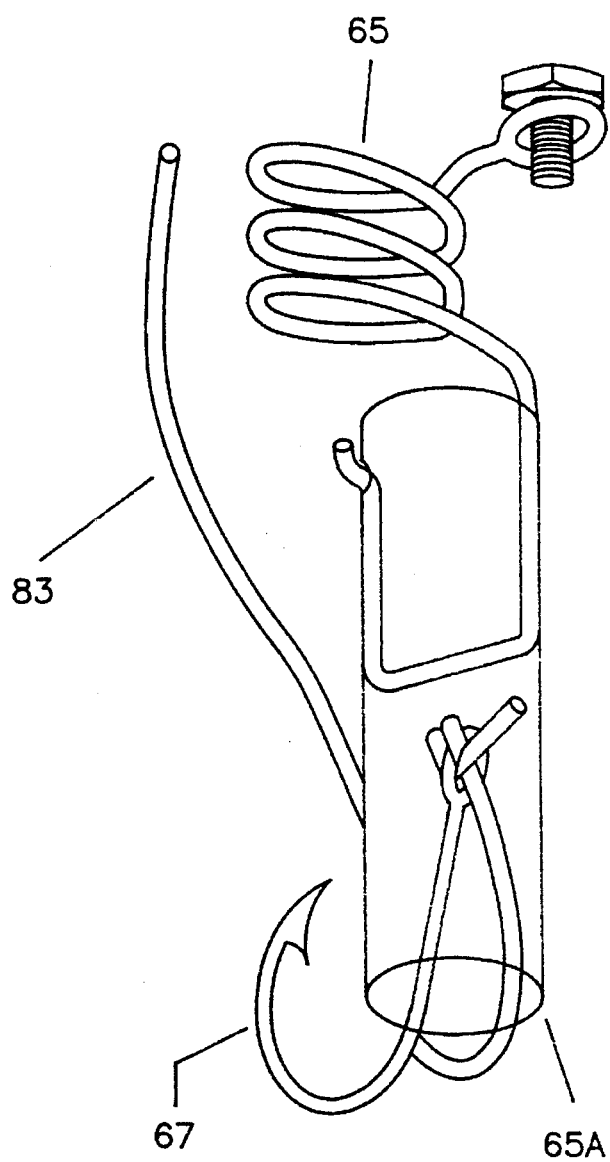
FIG. 33 shows a hook holder biased by a wire coil.
Figure 35:
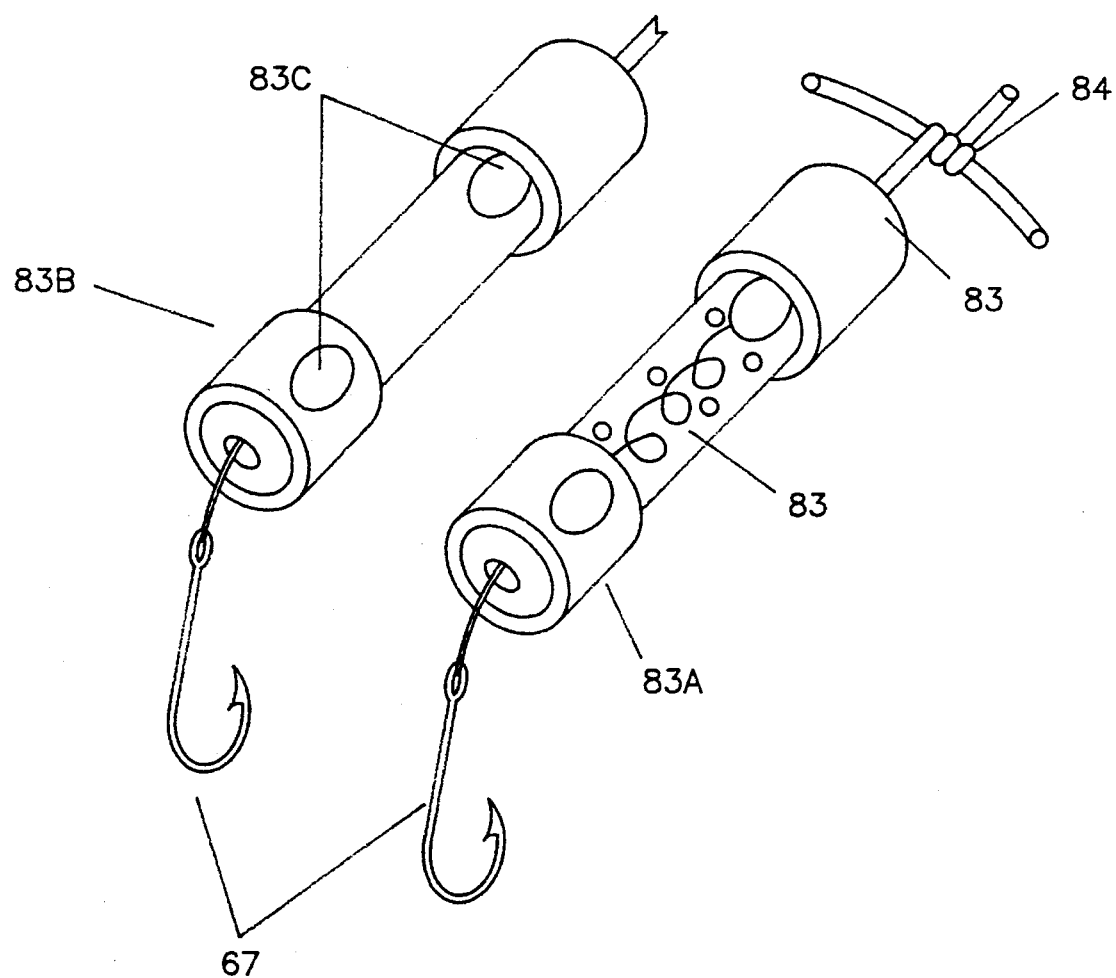
FIG. 35 shows two stage line articles attached to the main line.
Figure 36:
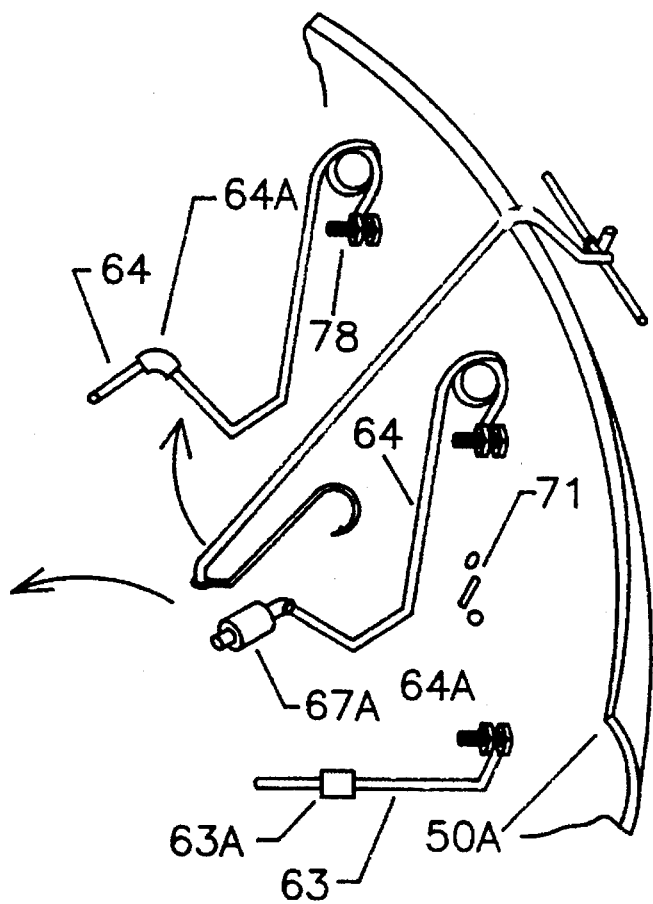
FIGS. 36, 37, and 38 show various wire hook holders and hook attaching devices.

FIGS. 33, 35, and 36 illustrates an inferior fish hook holder of coil spring wire having a flexible plastic tube fitted and dimensioned to accept and hold a fish hook by the hook eye. The wire coil 65 does not have suitable directional control because the spring simply allows the holder to follow straight toward the pull of the stage line and does not direct the hook away from adjacent holders.

Figure 37:
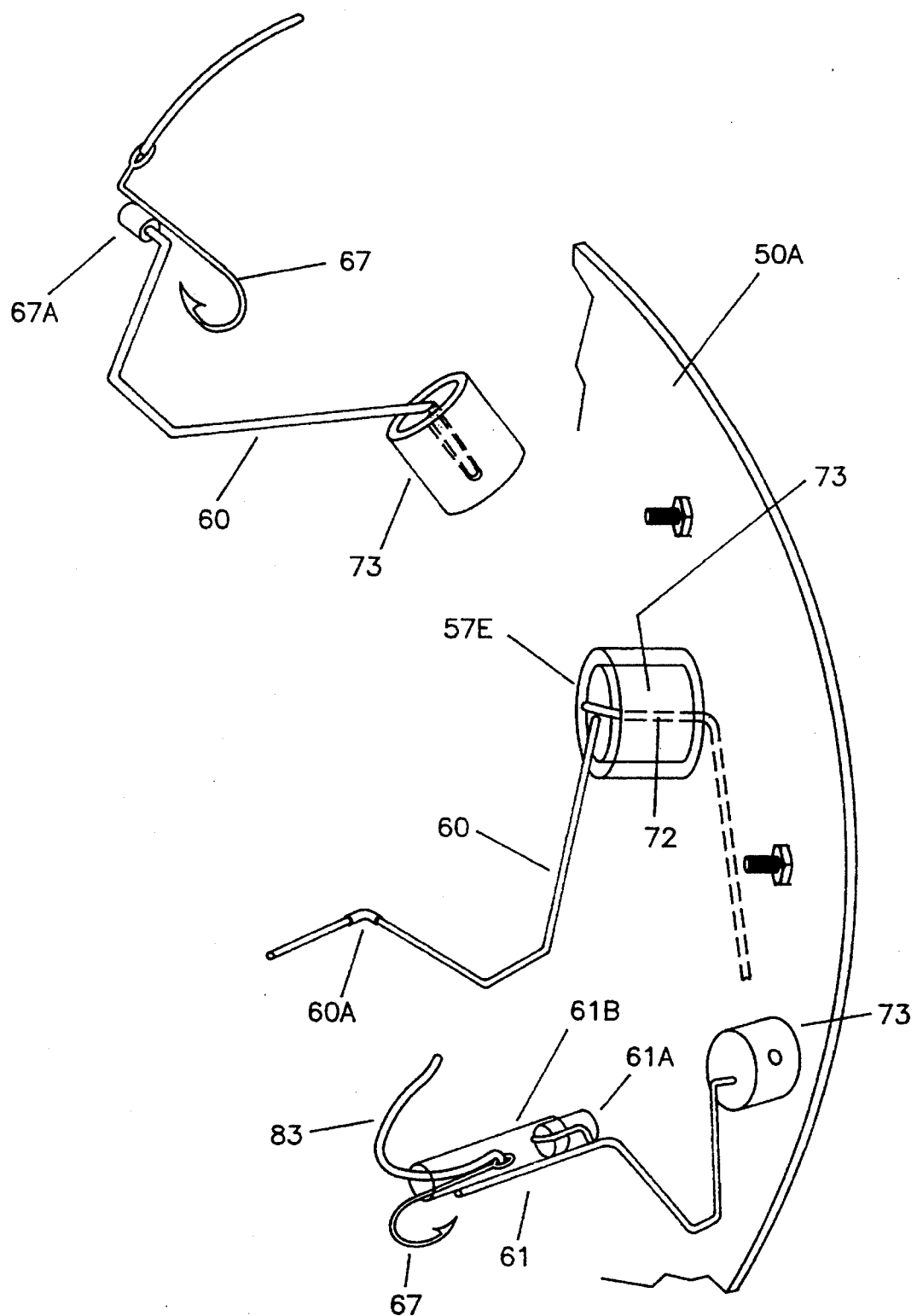

FIG. 37 shows wire hook holders utilizing rod 73, flexible sleeve 57E and elastic lacing 72 which leans and rolls with directional control and not letting the stage line totally control the leaning angle when the hooks are pulled and discharged from the holders at the time of casting out the main line. The attached wire hook holders have a fight fit rubber tube over the wire to prevent hooks from sliding too far onto the wire so referred to as stop sleeve 60A. This FIG. 37 illustrates a fish hook slide on to a wire and another hook slid into a tube fitting the hook eye.

Figure 34:
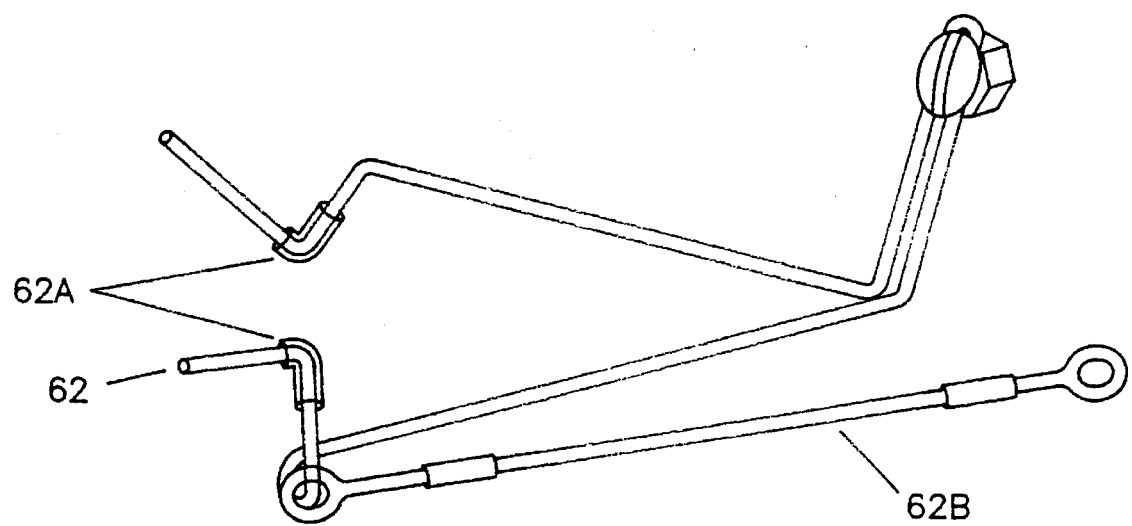
FIG. 34 shows a two wire holder with attached guy wire.

FIG. 34 shows a method to pinch two wires together to allow a hook eye to go over both wires and the hook will be held on the two wires until the stage line pulls the hook off. A guy line 62B is illustrated but is not the best directional control for releasing the hook and adds obstruction to the reel and hooks.

Figure 38:
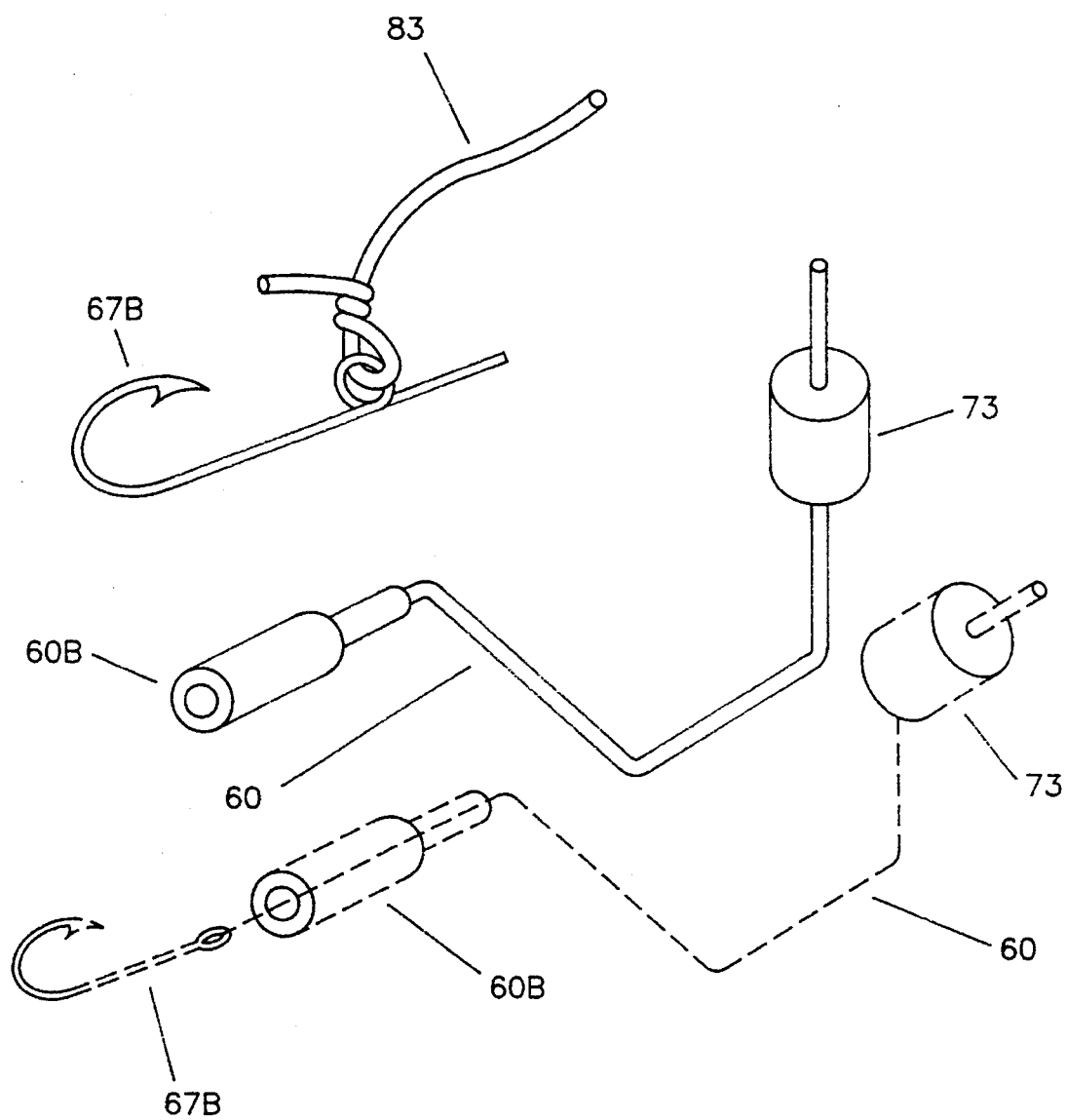

FIG. 38 simply illustrates a method running the hook holder wire 60 through rod 73 before totally bending and forming wire for construction considerations. A hook 67B has a prong extension to be placed into a tube 60B fitted to wire 60 allowing the hook to be supported firmly until cast cycle of the reel.

Figure 39:
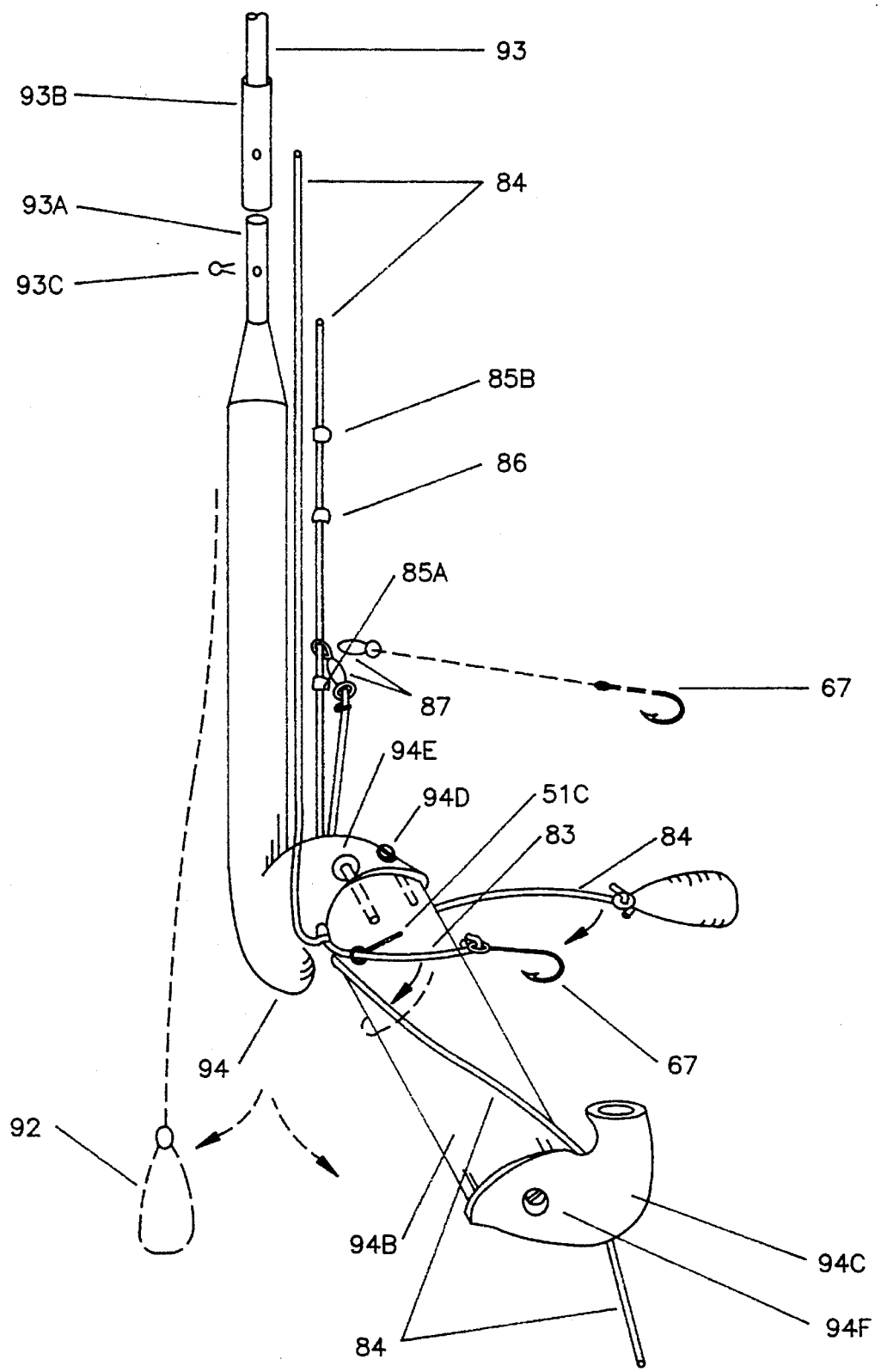
FIGS. 39, 40, and 41 show the line guide 94 of FIG. 21 in further detail.
Figure 40:
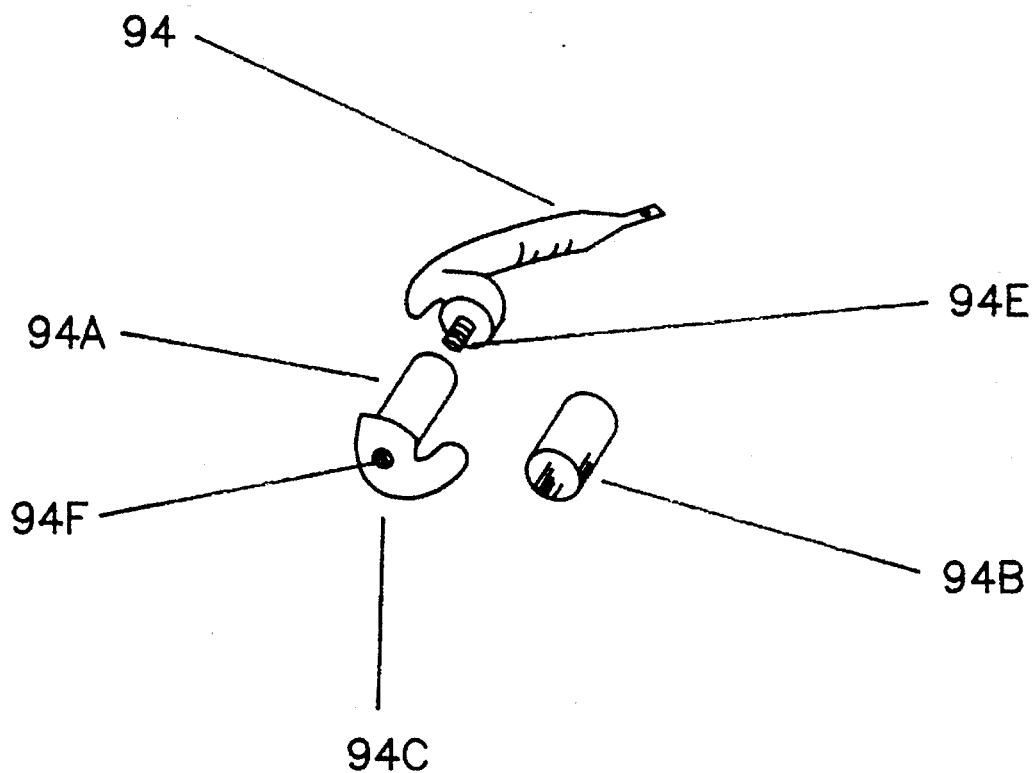

FIG. 39 illustrates guide 94 with it's communicating parts with arrows indicating reeling in and casting of the main line when using fishing pole 93.

FIG. 42 is simply one illustration of using mathematics to space the stage lines on a main line in sequence at identical spacings to meet correctly with a vacant fish hook holder. Counter clockwise and clockwise in the illustration give different space distance of stage lines. The dotted line in FIG. 42 shows just one incorrect stage line spacing. FIG. 42 points out the consideration for stage line spacing. Several wraps of the main line on a reel may precede between each stage line. Operators preference and mathematics are to be considered.

Figure 43:
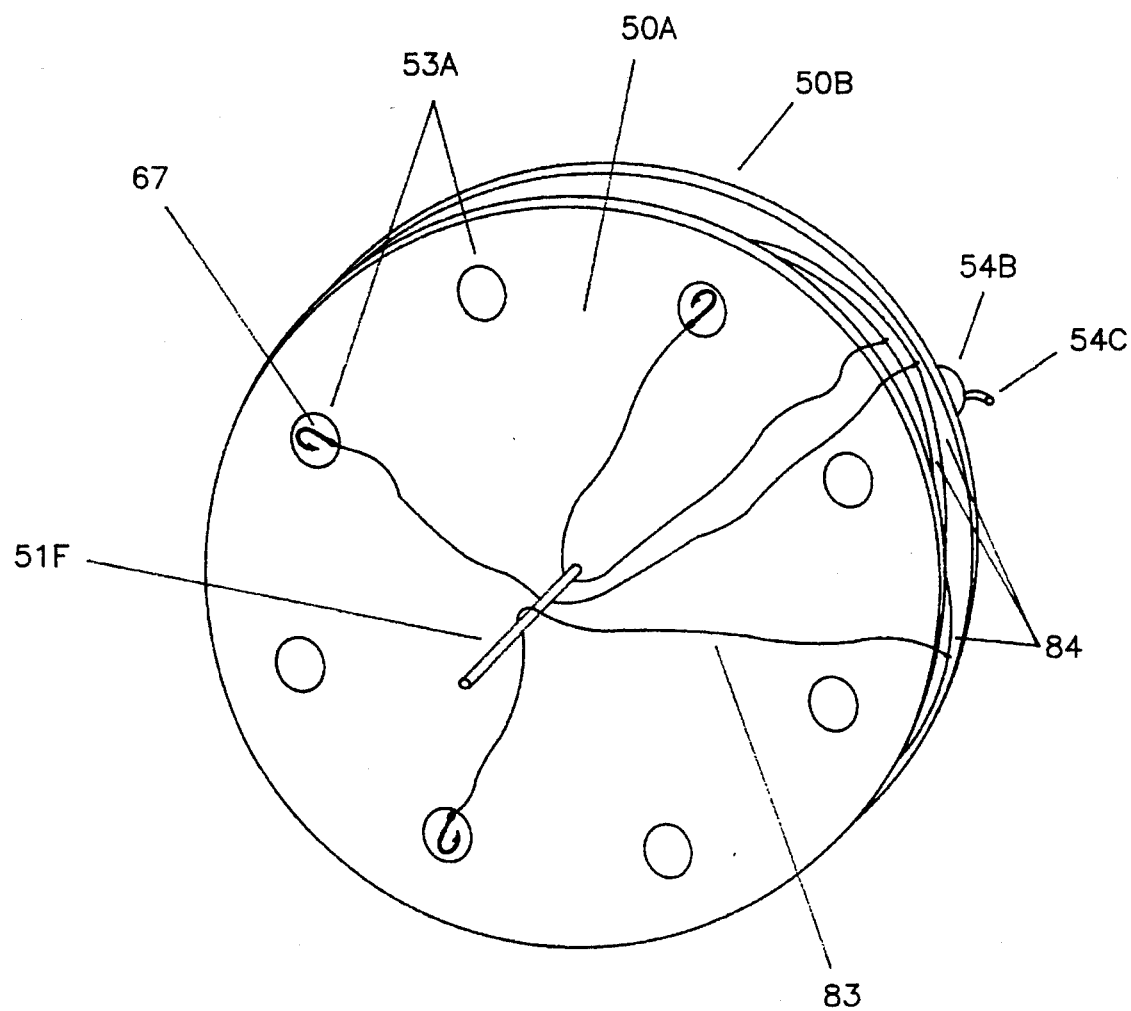
FIG. 43 shows a reel with a central neutral wire, FIGS. 43A, 43AA show details of a hook securing wire, FIGS. 43B, 43BB show a reel with hook holder utilizing the neutral wire of FIG. 43, FIGS. 44–46 illustrate an anchor attachable to the main line having fluke wires which deploy to engage a ground surface and tension tubes to keep the fluke wires collapsed while casting.

FIG. 43 illustrates a neutral wire 51F centered on a reel allowing the stage line to reach any holder for hooks the operator selects.

Figure 43A:
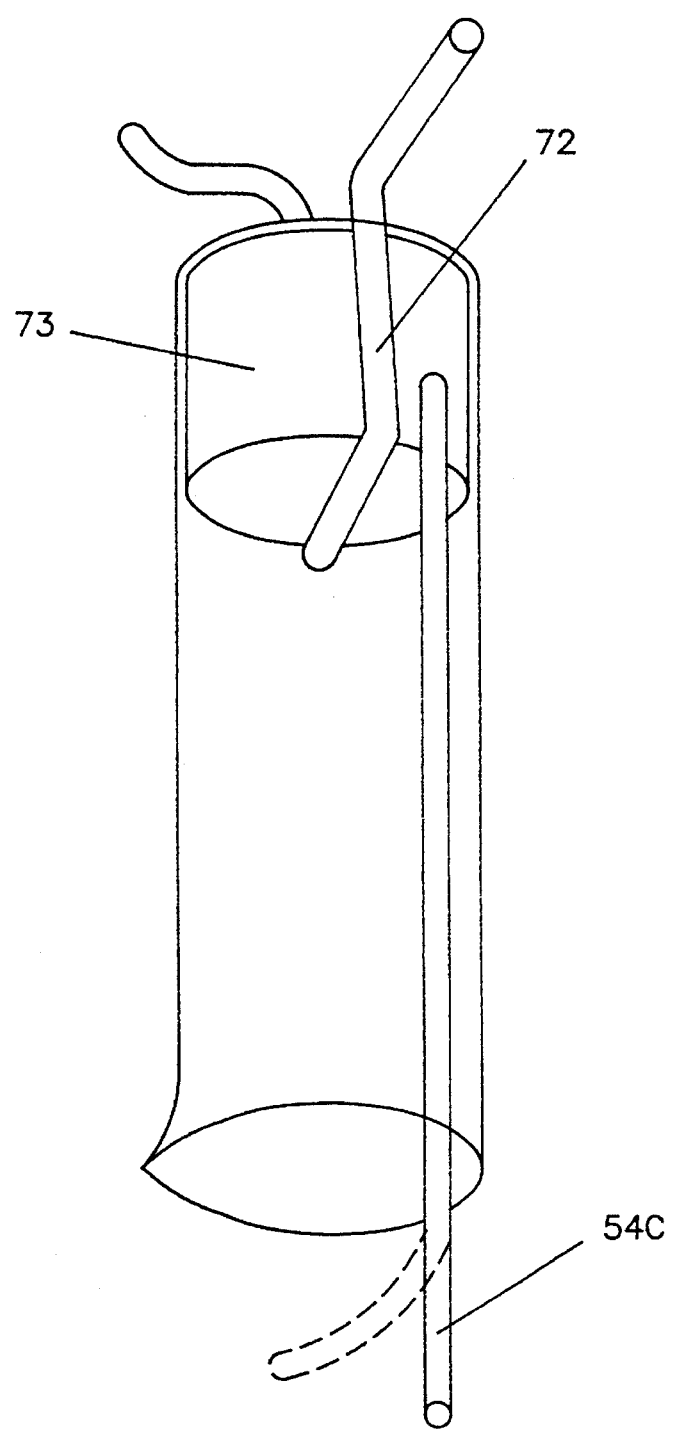
Figure 43B:
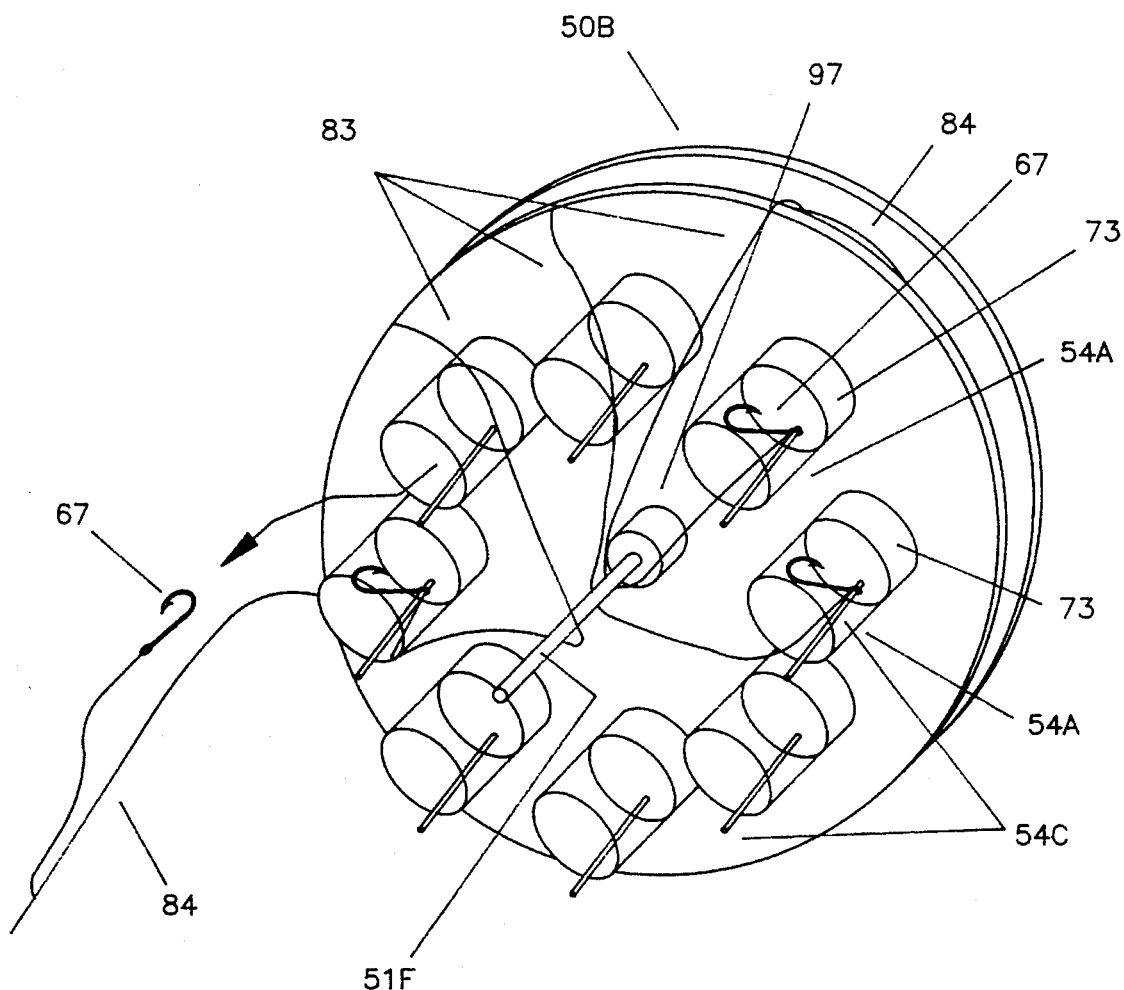
Figure 43A:
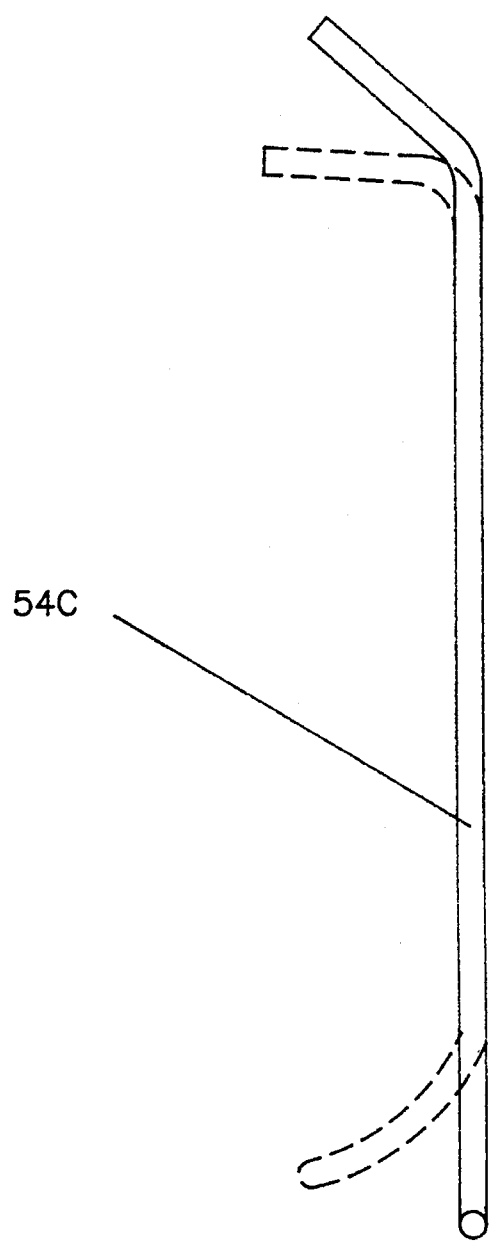
Figure 43B:
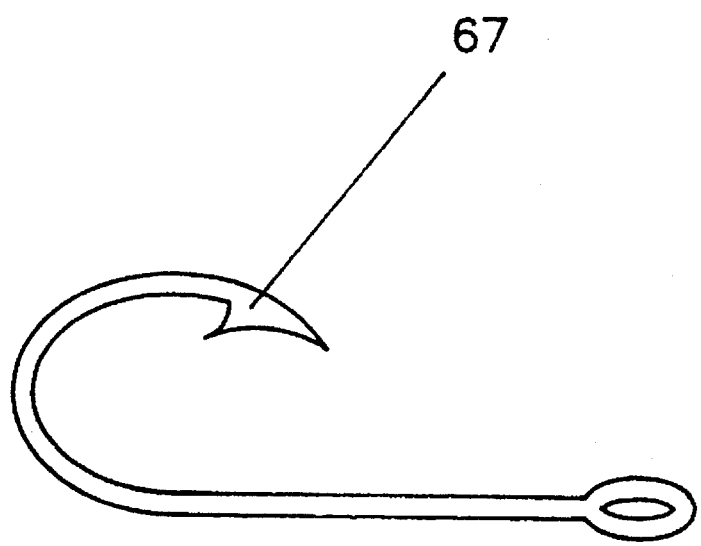

FIG. 43A points out hook securing direction wire 54C may be straight for casting of front of reel face and rotary discharge of main line parallel to reel flanges as well but a bend indicated by dotted line is most suitable for casting from reel flange 50B on the rear and over both flanges from rear to front perpendicular to flanges 50A and 50B. FIG. 43B illustrates neutral wire 51F and hook holders. Arrow shows hook leaving holders. Lacing 72 used but not shown.

Figure 12:
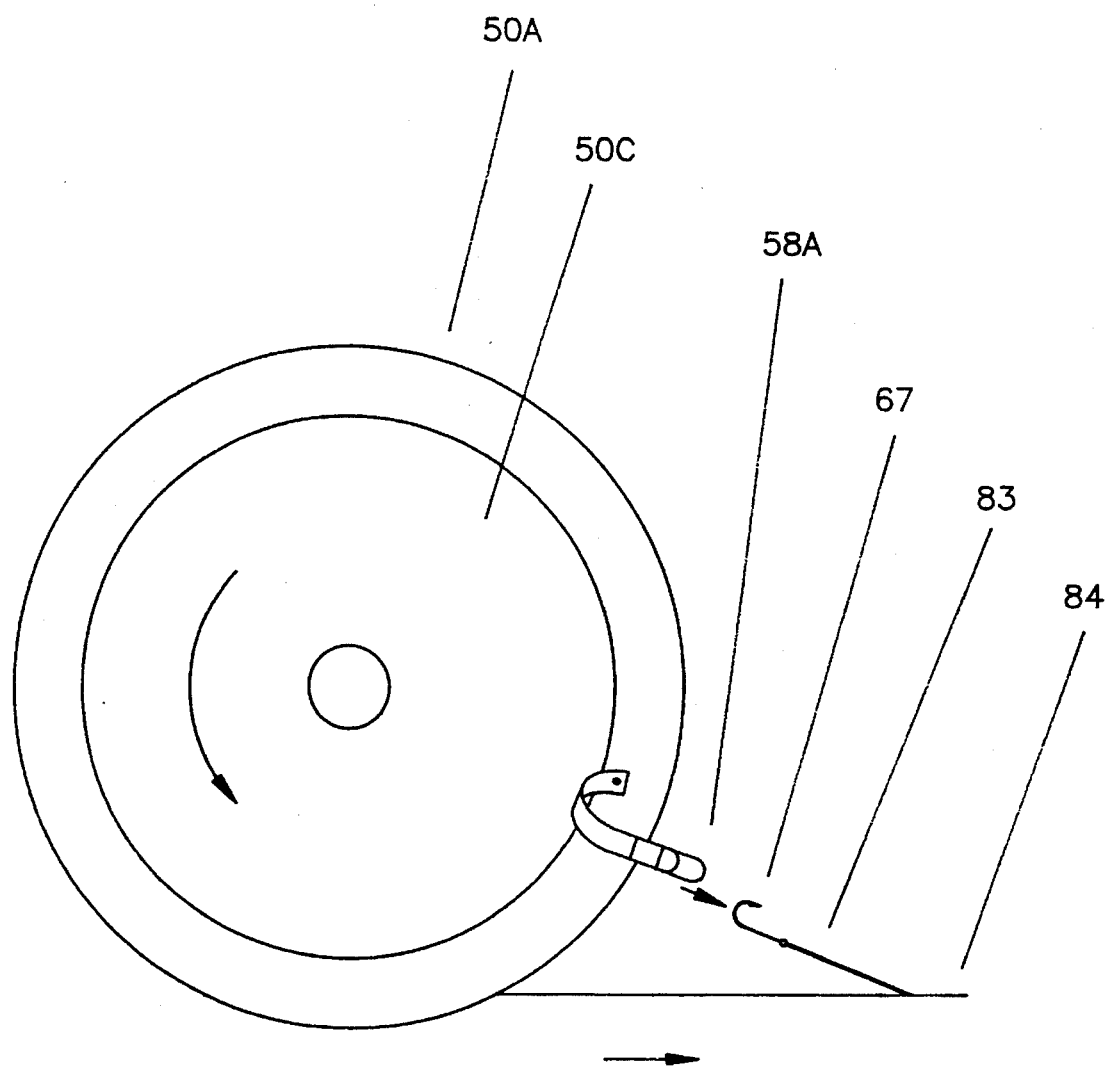
FIG. 12 shows dispensing of the stage line.

FIG. 12 illustrates a reel flange core 50C simply to point out that a reel flange carrying all fish hook holders can be placed over a reel core allowing the operator to pull off the flange with hooks and main line from the reel and replace with another loaded flange with hooks and main line to allow a commercial fisherman to fish a greater number of hooks exchanging hooks and lines as in cartridge fashion.

This invention disclosed and referred to as UNREAEL, has selective embodiments including pressure release anchor flukes 126, stage line control guides 88, 94, 121, directional control fish hook holders 53A, 53B, 54A, 54B, 55A, 55B, 56, 57, 58, 59 communicating with reel and multiple line for sport and commercial fishing rapidly with safety.

Figure 41:
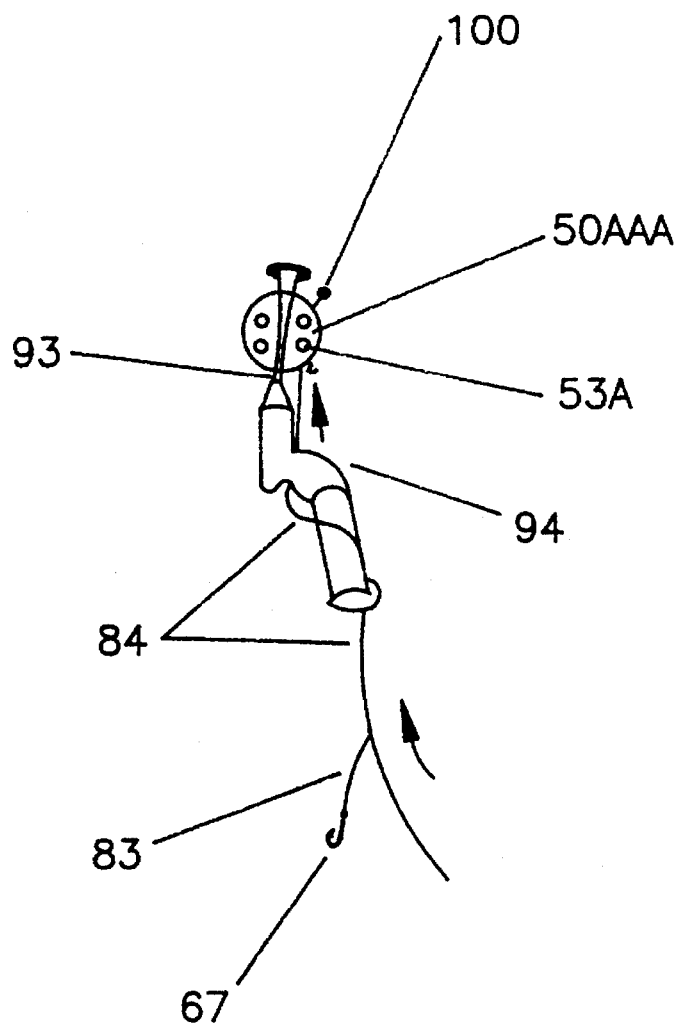

| PARTS LIST | |
|---|---|
| 50A | front reel flange twelve holder compartment |
| 50AA | front reel flange eight holder compartment FIG. 21 |
| 50AAA | main line disks FIG. 41 |
| 50B | rear reel flange twelve holder compartment |
| 50BB | reel flange eight holder compartment |
| 50C | flange reel core-optional |
| 50D | flange ruler slot |
| 51A | front trigger shield |
| 51B | rear trigger shield |
| 51C | trigger pin |
| 51CC | stage line bead |
| 51D | trigger pin chamber |
| 51E | slope degree indication dotted line |
| 51F | neutral wire FIGS. 43, 43B |
| 52A | front rotary shield |
| 52B | rear rotary shield |
| 52C | slide shield |
| 52D | shield screw |
| 53A | front hook holder compartment |
| 53B | rear hook holder compartment |
| 53C | notch in outer end of holder |
| 53E | safety key |

PARTS LIST -continued

| | | |
|---|---|---|
| 54A | front holder minus notch | |
| 54B | rear holder minus notch | |
| 54C | hook securing-directional wire in 54A and 54B | |
| 55A | front plug hook holder | |
| 55B | rear plug hook holder | |
| 55C | notch optional in 55A. Caution: not used in 55B casting. Rotary only. | |
| 56 | series plug hook holder | |
| 56C | notch dimensioned reaching to plug 74 to clear all hooks 67 | |
| 57 | ruler holder FIGS. 9–10 | |
| 57C | ruler holder mate | |
| 57D | ruler holder tape | |
| 57E | ruler holder flexible sleeve | |
| 57F | hook slot chamber | |
| 58 | dual ruler holder center dotted line | |
| 58A | front half dual ruler holder | |
| 58B | rear half dual ruler holder | |
| 58C | dual ruler holder mate FIG. 15 | |
| 58D | dual ruler holder tape | |
| 59A | ruler holder end mounted | |
| 59B | ruler holder end mounted mate | |
| 59C | ruler holder end mounted reverse extension FIG. 16 | |
| 59D | ruler holder end mounted tape | |
| 59E | ruler holder mount bracket | |
| 59F | ruler holder end mounted reverse extension mate | |
| 59G | flat plate | |
| 59H | concave ruler material extension | |
| 59L | stiff leg wire FIG. 18 | |
| 60 | insert wire hook holder FIG. 37 | |
| 60A | stop sleeve | |
| 60B | tube sleeve FIG. 38 | |
| 61 | wire holder FIG. 37 | |
| 61A | secondary wire holder | |
| 61B | tube sleeve (larger secondary wire holder mounted) | |
| 62 | spread wire double holder FIG. 33 | |
| 62A | spread wire double holder stop sleeve | |
| 62B | guy line | |
| 63 | single wire hook holder | |
| 63A | single wire hook holder stop sleeve | |
| 64 | coil spring wire hook holder | |
| 64A | coil spring wire hook holder stop sleeve | |
| 65 | coil spring wire hook wedge tube holder FIG. 33 | |
| 65A | hook wedge tube | |
| 66A | rail FIG. 29 | |
| 66B | travel hook holder FIG. 29 | |
| 66C | rubber band | |
| 66D | rubber band holder wire clip | |
| 66SH | rail slide - travel holes | |
| 67 | hook | |
| 67A | sleeve hook FIGS. 32, 36, 37 | |
| 67B | central eye hook with extension prong FIG. 38 | |
| 67C | fish lure FIG. 21 | |
| 68 | dampener bead | |
| 69 | vibration dampener line | |
| 70 | dampener button | |
| 71 | button hole | |
| 72 | elastic lacing | |
| 73 | rod | |
| 74 | plug | |
| 74C | plug rubber band - optional | |
| 74D | round plug | |
| 75 | series holder plug | |
| 76 | nut | |
| 77 | spacer | |
| 78 | bolt | |
| 78A | bolt | |
| 78B | nut | |
| 78C | rubber washer | |
| 79 | eye screw | |
| 80 | hook wire FIG. 1 | |
| 81 | rubber band | |
| 82 | eye bolt | |
| 83 | stage line | |
| 83A | elastic tube FIG. 35 | |
| 83B | bead | |
| 83C | bead | |
| 84 | main line | |
| 84A | trigger cable | |
| 84B | cable trigger | |
| 85A | main line stop | |
| 85B | main line stop | |
| 85BB | main line weight | |
| 86 | swivel slide stop | |
| 86A | stage line slide stop FIG. 42A | |
| 87 | swivel | |
| 88 | coil guide | |
| 89 | coil guide stop nut | |
| 90A | fore handle FIG. 21 | |
| 90B | aft handle | |
| 91 | breast rest | |
| 92 | anchor weight | |
| 93 | pole | |
| 93A | ferrule connector male | |
| 93B | ferrule connector female | |
| 93C | safety wire | |
| 93D | ferrule connector male - female | |
| 93E | pole directional - release base | |
| 94 | pole guide | |
| 94A | pole guide roller base (see also FIGS. 39, 40, 41) | |
| 94B | pole guide tube roller | |
| 94C | pole guide arm | |
| 94D | safety bolt - optional | |
| 94E | rear base bolt | |
| 94F | front base bolt | |
| 95 | reel mount | |
| 96A | front axle cone nut | |
| 96B | rear axle cone nut | |
| 97 | axle | |
| 98 | axle jam nut | |
| 99 | reel crank lever | |
| 100 | reel crank handle | |
| 101 | reel support stand | |
| 101A | knee brace FIG. 22 | |
| 101B | support stand foot stirrup | |
| 101C | support stand third leg | |
| 102A | butter fly rod direction - release bolt FIG. 21 | |
| 102B | butter fly reel direction - release bolt | |
| 110 | belt FIG. 24 | |
| 111 | belt sprocket hole | |
| 112A | left combination hook holder shield - drive frame | |
| 112B | right combination hook holder shield - drive frame | |
| 113 | bolt | |
| 114 | holder bracket | |
| 115 | drive sprocket | |
| 116 | power source | |
| 116A | drive axle | |
| 116B | front axle | |
| 117 | vessel mount bracket | |
| 117A | vessel mount bolt | |
| 118 | gunwale | |
| 119 | vessel mount bracket to guide strut hole | |
| 119A | guide strut to vessel mount bracket hole FIG. 26 | |
| 120 | guide strut | |
| 121 | guide (separated cross arms) FIG. 27 | |
| 122 | guide to guide strut hole | |
| 122A | guide strut to guide hole | |
| 123 | reel holder stake FIG. 28 | |
| 123A | main line reel | |
| 124 | main line stake | |
| 125 | fluke pressure trigger release anchor shank FIG. 44 | |
| 125A | rear anchor shank fluke slide sleeve stop | |
| 125B | front anchor shank fluke slide sleeve stop | |
| 125C | trigger tension tube connector eye | |
| 125D | anchor shank fluke trigger eye | |
| 125E | front anchor connector eye | |
| 126 | fluke | |
| 126A | fluke shank | |
| 127 | anchor shank fluke slide sleeve | |
| 128 | anchor shank fluke slide sleeve trigger tension tube | |
| 129 | elastic tube eye | |
| 129A | elastic tube eye bead | |
| 130 | main line shock absorber tube | |
| 131 | main line shock absorber tube safety line |

| | PARTS LIST |
|---|---|
| W | arrow rotary discharge of 53B |
| X | arrow rotary discharge of 53A |
| Y | arrow perpendicular discharge |
| Z | arrow perpendicular discharge |

I claim:

1. A multiple line fishing device comprising;

a main line and a plurality of stage lines attached thereto, and a hook device and an engaging means spaced from the hook device, attach to each of the plurality of stage lines, a support member, a main line support device attached to the support member, a plurality of hook device holders flexibly attached to said support member each for holding at least one of said hook devices, and one of said engaging means frictionally engaging each of said holders, wherein upon dispensing of the main line from the main line support device, pull from at least one of said attached stage lines causes at least one of said hook device holders to resiliently lean towards the direction of pull, and wherein release of the engaging means from the holder causes the hook device to be flipped clear of the support member as the holder reflexably returns to an initial position.

2. An apparatus for storing, retrieving and dispensing a multiple line, comprising;

a main line, a plurality of stage lines attached thereto, and a hook device attached to each of the plurality of stage lines, a reel having a flange, a plurality of tubular holders attached to the flange each for storing at least one of said hook devices, wherein upon dispensing of the main line from the reel at least one of said holders leans with respect to the reel, under tension from one of said stage lines as the main line is discharged, and wherein the holder is biased to return to an original position, and the action of the holder returning to the original position causes the at least one hook device to be flipped away from the reel.

3. The apparatus of claim 2, wherein each of said stage lines have limited slidable movement on the main line.

4. The apparatus of claim 2, further including a damping device to bring each of said holders quickly back to the original position.

5. The apparatus of claim 2, further including an engaging device attached to at least one of said stage lines which engages one of said holders to causes the holder to lean until the engaging device is release from the holder.

6. The apparatus of claim 5, wherein the engaging device is one of the group consisting of a knot, a bead, and a pin.

7. The apparatus of claim 5, wherein the tubular holder has a notch therein for receipt of the engaging device.

8. The apparatus of claim 5 wherein the engaging device is a cylindrical plug or a round ball which engages the tubular holder.

9. The apparatus of claim 8 wherein the plug or the ball is a float.

10. The apparatus of claim 8 wherein the plug or the ball is a weight.

11. A trotline apparatus for storing, discharging, and retrieving a trotline, comprising;

a trotline including a main line, a plurality of stage lines attached thereto, and a hook attached to each of the plurality of stage lines, a reel, a plurality of holders attached to said reel, the holders storing each of said hooks, each of said plurality of holders comprising an elongate strip of flexible material having a longitudinal axis and concave surface extending along the longitudinal axis, wherein upon dispensing of the main line from the reel at least one of the stage lines having a hook stored in one of said holders, causes the holder storing the hook to bend with respect to the reel, and then twist toward the direction of pull, and wherein the elongate strip holder is biased to return to an original position thereby tossing the hook away from the reel as the hook is released from the holder.

12. The apparatus of claim 11 wherein the elongate strip of flexible material has a convex surface cradling the concave surface.

13. The apparatus of claim 12 wherein each of the elongate strips extends through opposing flanges on said reel.

* * * * *